US009843823B2

(12) United States Patent
Imbruce et al.

(10) Patent No.: US 9,843,823 B2
(45) Date of Patent: Dec. 12, 2017

(54) SYSTEMS AND METHODS INVOLVING CREATION OF INFORMATION MODULES, INCLUDING SERVER, MEDIA SEARCHING, USER INTERFACE AND/OR OTHER FEATURES

(71) Applicant: YAHOO HOLDINGS, INC., Sunnyvale, CA (US)

(72) Inventors: Doug Imbruce, New York, NY (US); Owen Bossola, Brooklyn, NY (US); Rasmus Knutsson, New York, NY (US); Hakim El Hattab, New York, NY (US); Tommy Chheng, San Francisco, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 0 days.

(21) Appl. No.: 13/901,561

(22) Filed: May 23, 2013

(65) Prior Publication Data

US 2017/0164021 A1 Jun. 8, 2017

Related U.S. Application Data

(60) Provisional application No. 61/650,998, filed on May 23, 2012.

(51) Int. Cl.
*H04N 7/10* (2006.01)
*H04N 21/234* (2011.01)
(52) U.S. Cl.
CPC .............................. *H04N 21/23424* (2013.01)
(58) Field of Classification Search
CPC ................. H04N 21/27; H04N 21/278; H04N 21/44016; H04N 21/458; H04N 21/47; H04N 21/80; H04N 21/81; H04N 21/8106; H04N 21/8113; H04N 21/85; H04N 21/854; H04N 21/8541; H04N 21/8545; H04N 21/858
USPC ........ 725/32, 34, 36, 37; 715/716, 719, 723, 715/724, 725, 726
See application file for complete search history.

(56) References Cited

U.S. PATENT DOCUMENTS

| 6,108,033 | A  | 8/2000 | Ito et al. |
|---|---|---|---|
| 6,173,437 | B1 | 1/2001 | Polcyn |
| 6,271,840 | B1 | 8/2001 | Finseth et al. |
| 6,353,448 | B1 | 3/2002 | Scarborough et al. |
| 6,535,888 | B1 | 3/2003 | Vijayan et al. |

(Continued)

FOREIGN PATENT DOCUMENTS

| CN | 101262395 A | 9/2008 |
|---|---|---|
| WO | 2007064715 A2 | 6/2007 |

OTHER PUBLICATIONS

Agarwal, Amit; "How to Embed Almost Anything in your Website" (2009).

(Continued)

*Primary Examiner* — John Schnurr
(74) *Attorney, Agent, or Firm* — James J. DeCarlo; Greenberg Traurig, LLP

(57) ABSTRACT

Systems and methods consistent with the present innovations are directed to implementations involving creation, viewing, playing, sharing and/or utilization of information modules, such as mixed-media modules. Various embodiments relating to aspects of server processing, media searching, user interface and/or other features are disclosed.

20 Claims, 59 Drawing Sheets

(56) References Cited

U.S. PATENT DOCUMENTS

| | | | |
|---|---|---|---|
| 6,567,103 B1 | 5/2003 | Chaudhry | |
| 6,574,417 B1 | 6/2003 | Lin et al. | |
| 7,200,820 B1 | 4/2007 | Stephens | |
| 7,409,421 B2* | 8/2008 | Sugihara | 709/203 |
| 7,536,706 B1 | 5/2009 | Sezan et al. | |
| 7,613,731 B1 | 11/2009 | Larson | |
| 7,725,451 B2 | 5/2010 | Jing et al. | |
| 7,836,110 B1 | 11/2010 | Schoenbach et al. | |
| 7,895,193 B2 | 2/2011 | Cucerzan et al. | |
| 7,912,827 B2 | 3/2011 | Byers et al. | |
| 7,962,128 B2 | 6/2011 | Neven et al. | |
| 8,055,655 B1 | 11/2011 | He et al. | |
| 8,078,650 B2 | 12/2011 | McHugh et al. | |
| 8,131,132 B2* | 3/2012 | Klappert | 386/248 |
| 8,244,707 B2 | 8/2012 | Lin et al. | |
| 8,255,291 B1 | 8/2012 | Nair | |
| 8,352,443 B1 | 1/2013 | Polson et al. | |
| 8,549,436 B1 | 10/2013 | Capriati et al. | |
| 8,577,911 B1 | 11/2013 | Stepinski et al. | |
| 8,639,034 B2 | 1/2014 | Liu et al. | |
| 8,769,053 B2 | 7/2014 | Spitz et al. | |
| 8,782,690 B2 | 7/2014 | Briggs et al. | |
| 8,813,132 B2 | 8/2014 | Andrews, II et al. | |
| 9,147,154 B2 | 9/2015 | Wang et al. | |
| 9,183,277 B1 | 11/2015 | Kurzion et al. | |
| 2004/0059720 A1 | 3/2004 | Rodriguez | |
| 2004/0205515 A1 | 10/2004 | Socolow et al. | |
| 2005/0216859 A1 | 9/2005 | Paek et al. | |
| 2006/0064733 A1* | 3/2006 | Norton et al. | 725/135 |
| 2006/0253436 A1 | 11/2006 | Cook et al. | |
| 2007/0008322 A1 | 1/2007 | Ludwigsen | |
| 2007/0078872 A1 | 4/2007 | Cohen | |
| 2007/0101387 A1 | 5/2007 | Hua et al. | |
| 2007/0185860 A1 | 8/2007 | Lissack | |
| 2007/0203945 A1 | 8/2007 | Louw | |
| 2007/0214121 A1 | 9/2007 | Ebanks | |
| 2007/0250899 A1 | 10/2007 | Rhodes et al. | |
| 2007/0294619 A1 | 12/2007 | Krishnaswamy et al. | |
| 2008/0027928 A1 | 1/2008 | Larson | |
| 2008/0028023 A1 | 1/2008 | Locke | |
| 2008/0028037 A1 | 1/2008 | Moyer et al. | |
| 2008/0086688 A1 | 4/2008 | Chandratillake et al. | |
| 2008/0215416 A1 | 9/2008 | Ismalon | |
| 2008/0244373 A1 | 10/2008 | Morris et al. | |
| 2008/0276269 A1 | 11/2008 | Miller et al. | |
| 2009/0003800 A1 | 1/2009 | Bodin et al. | |
| 2009/0019034 A1 | 1/2009 | Franks et al. | |
| 2009/0019078 A1 | 1/2009 | Chisholm et al. | |
| 2009/0063423 A1 | 3/2009 | Kelly et al. | |
| 2009/0077037 A1 | 3/2009 | Wu et al. | |
| 2009/0092374 A1* | 4/2009 | Kulas | H04N 7/173 386/248 |
| 2009/0271842 A1 | 10/2009 | Baumhof | |
| 2009/0313260 A1 | 12/2009 | Mimatsu | |
| 2009/0327268 A1 | 12/2009 | Denney et al. | |
| 2010/0083077 A1 | 4/2010 | Paulsen et al. | |
| 2010/0146042 A1 | 6/2010 | Kruhoeffer et al. | |
| 2010/0211565 A1 | 8/2010 | Lotito | |
| 2010/0332489 A1 | 12/2010 | Benari et al. | |
| 2010/0333123 A1 | 12/2010 | Mehta | |
| 2011/0010367 A1 | 1/2011 | Jockish et al. | |
| 2011/0060756 A1 | 3/2011 | Schoenbach et al. | |
| 2011/0064387 A1 | 3/2011 | Mendeloff et al. | |
| 2011/0161308 A1 | 6/2011 | Andersen et al. | |
| 2011/0161333 A1 | 6/2011 | Langseth et al. | |
| 2011/0191321 A1 | 8/2011 | Gade et al. | |
| 2011/0196864 A1 | 8/2011 | Mason et al. | |
| 2011/0225066 A1 | 9/2011 | Carter | |
| 2011/0276555 A1 | 11/2011 | Fiero | |
| 2011/0288913 A1 | 11/2011 | Waylonis et al. | |
| 2012/0047134 A1 | 2/2012 | Hansson et al. | |
| 2012/0051668 A1 | 3/2012 | Martin et al. | |
| 2012/0059838 A1 | 3/2012 | Berntson et al. | |
| 2012/0185905 A1* | 7/2012 | Kelley | H04N 9/75 725/109 |
| 2012/0203757 A1 | 8/2012 | Ravindran | |
| 2012/0211565 A1 | 8/2012 | Colavito et al. | |
| 2012/0249870 A1 | 10/2012 | Senster | |
| 2012/0278465 A1 | 11/2012 | Johnson | |
| 2012/0323897 A1 | 12/2012 | Daher et al. | |
| 2013/0097125 A1 | 4/2013 | Marvasti et al. | |

OTHER PUBLICATIONS

Crosby, Connie; "Prezi: Shaking Off the PowerPoint Death Grip", http://www.slaw.ca/2010/10/25/prezi-shaking-off-the-powerpoint-death-grip/ (2010).

European Search Report in correspopnding EP Application No. 12859456.1 dated Jan. 7, 2016.

https://getsatisfaction.com/prezi/topics/creating links that jump to other parts of the prezi (2010).

International Search Report and Written Opinion to PCT/US2012/071095 dated May 7, 2013 (10 pages).

International Search Report (PCT/US13/45529) dated Feb. 27, 2014; 4 pages.

Limpag, Max, "Forget PowerPoint wow 'em with Prezi", http://max.impag.com/article/powerpoint-prezi-presentation (2011).

O'Neill, Megan, "7 Little Known Tricks That Will Get You More YouTube Views", http://www.adweek.com/sociatimes/get-more-youtube-views/44158 (2011).

Supplemental European Search Report (EP12857892) dated Mar. 24, 2016.

* cited by examiner

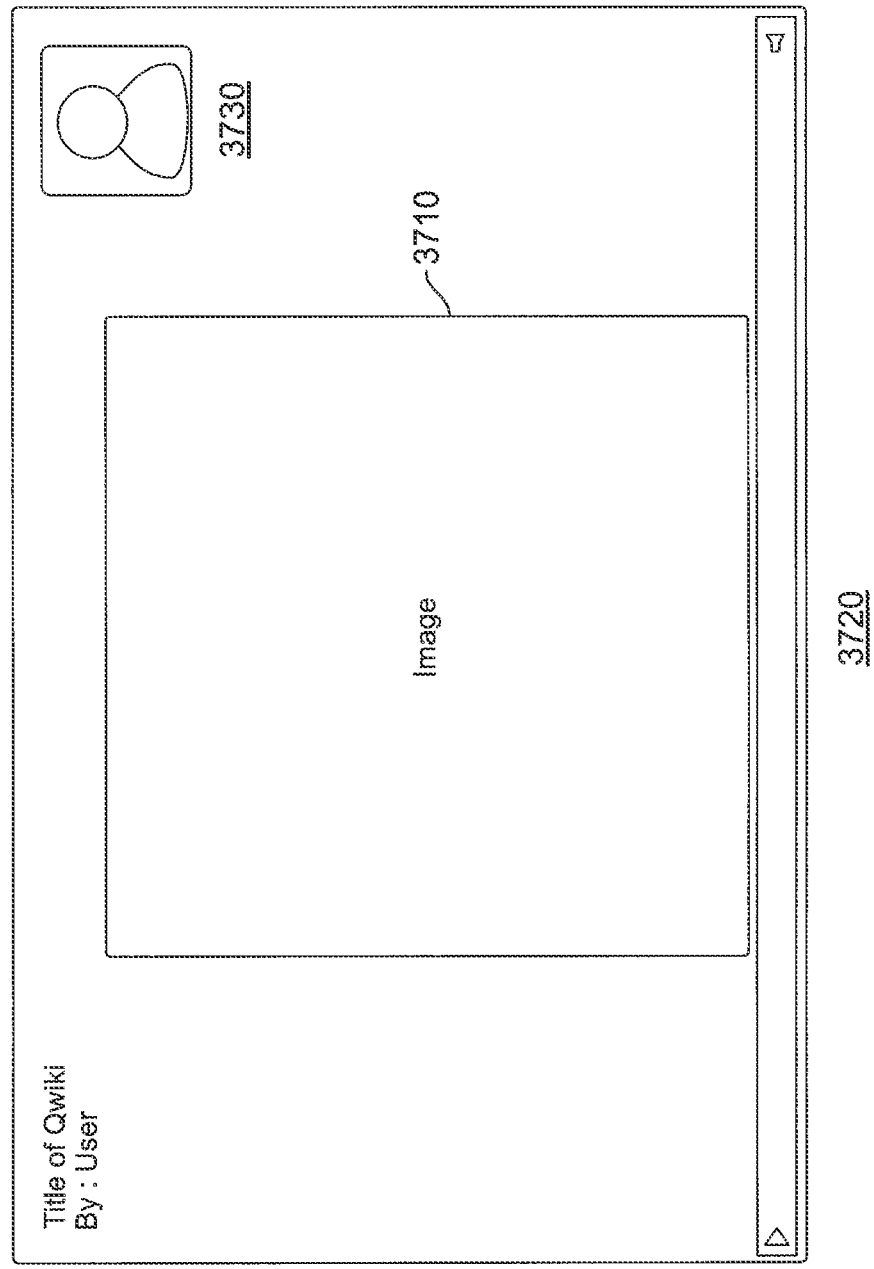

THE WORLD'S GREATEST CITIES　　　　⬇ 👁 PUBLISH

| 1 SELECT MEDIA | 2 NARRATE YOUR QWIKI | 3 SET TIMING |

Your Qwiki's Content　　　　　　　SELECTED [0] REMAINING [10]

| IMG | IMG | IMG | IMG | IMG | IMG |

3816 —

| UPLOAD |
| FROM URL |
| YAHOO! MAPS |
| FLICKR |
| TWITTER |
| YOUTUBE |
| VIMEO | http://tumbler.com/citiesworldwide　　SUBMIT

| IMG | ✚ | IMG | IMG | ✓ | IMG |
| ✓ | IMG | IMG | IMG | ✓ | ✓ |

⬅ ➡ Next　　　　　　　　DONE ADDING MEDIA

THE WORLD'S GREATEST CITIES　　　　⬇ 👁 PUBLISH

| 1 SELECT MEDIA | 2 NARRATE YOUR QWIKI | 3 SET TIMING |

EDIT PICTURE　　　　　Add Title & Caption

IMG

Magical Night in Amsterdam
Link
Caption
Credit

Set the focus area by dragging the square

Special Effects
Fit & Cover

3818

SAVE

UPLOAD / FROM / YAHOO! / FLICKR / TWITTER / YOUTUBE / VIMEO

⬅ ➡ Next　　　　　　　　DONE ADDING MEDIA

FIG. 38H

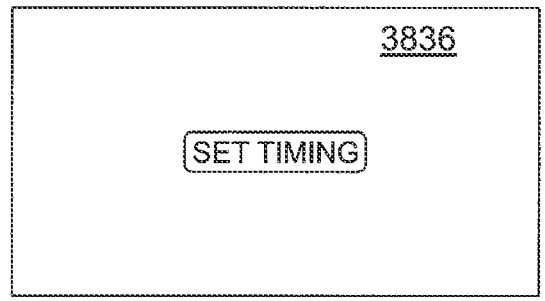
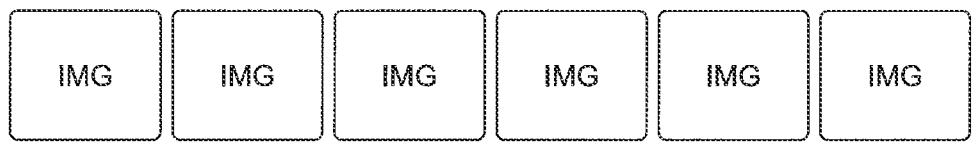
FIG. 38Q
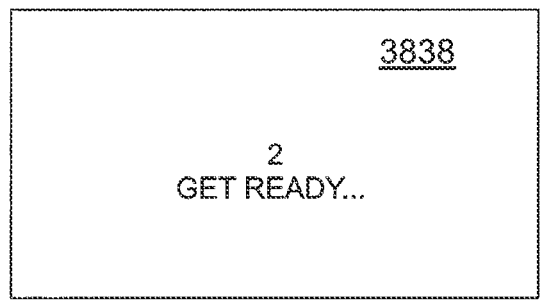
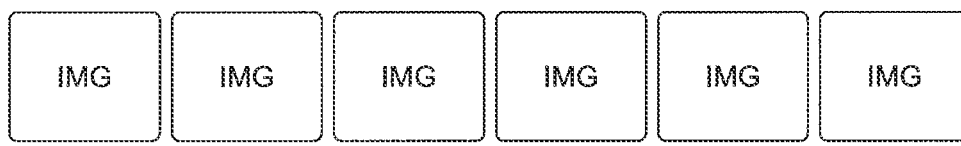
FIG. 38R

4610
Adding or selecting mixed-media content, via an interactive functionality of an interface on a device, where in the mixed-media content comprises various mixed-media elements 4620
Wherein the mixed-media elements include data obtained directly from a non-local network storage source (e.g., Facebook, Flickr, Instagram, a websearch result, dropbox, twitter, YouTube, email, or a cloud storage), 4630
Wherein the data are obtained via a call to a routine on a cloud based server and the data are not stored locally on the device, and 4640
Wherein the data are integrated into a narrative presentation that includes a plurality of image elements connected in sequence 4650
Generating an interactive playable mixed-media module

FIG. 46

SYSTEMS AND METHODS INVOLVING CREATION OF INFORMATION MODULES, INCLUDING SERVER, MEDIA SEARCHING, USER INTERFACE AND/OR OTHER FEATURES

CROSS-REFERENCE TO RELATED APPLICATIONS

This application claims benefit/priority of U.S. provisional patent application No. 61/650,998 filed 23 May 2012, which is incorporated herein by reference in entirety.

BACKGROUND

Field

Aspects of the present innovations relate to information modules, and, more particularly, to associated systems and methods, such as those involving creation of mixed-media modules.

Description of Related Information

At the moment, narrative—or playable—content on the internet primarily exists in the form of streaming video. This poses several problems for content creators. First of all, media consumers are sophisticated and recognize the difference between professionally produced video projects and amateur ones. Most consumer devices display High Definition video and most people are used to seeing that level of quality in media they consume. Therefore, a producer of online content must invest significant time and money to create video content at the level to which consumers have grown accustomed. Producing video is time-consuming, expensive and often requires specialized skills. For example, a video editor might spend hours editing just five minutes of video. Production often entails a professional production crew, on-camera talent, and equipment such as a professional lighting kit, high-end cameras, and audio gear.

The video post-production process is also time-consuming. Editing requires expensive software, a skilled editor with technical and story-telling skills, and, possibly, the hiring of a graphic designer, special effects artist and/or narrator. Editing software also utilizes a lot of computing resources, typically requiring sophisticated, expensive and fast computing/storage equipment. There is also a high learning curve when it comes to using any of these editing tools and each piece of software usually requires a large financial commitment.

Another complication with video production is that the audio tracks are often recorded and edited separately from the video tracks and the two (or more than two) must be synchronized and edited into one timeline. This can be laborious and time-consuming. Moreover, if needed, animation is costly, often proprietary, and difficult to produce. It often requires specific software in addition to the software used for editing. Video and animation files are large and cumbersome which means that a powerful computer, with a great deal of storage space, is needed. Finally, the amount of time it takes for the software to render a final product also adds to the overall time and expense. Once a video is complete it is difficult to make changes. This is a problem because, without updates, video is outdated quickly. Re-editing a video is time-consuming and complicated and there is no way to integrate "live data" or "updatable components." Video is also bandwidth-heavy when streaming on the web and does not play in an acceptable manner over a poor internet connection.

Additionally, video is a stand-alone, self-contained, linear medium. It is not interactive and it is difficult to embed a layer of meta-data which would make it interactive. For instance, it is not easy for a content producer to link on-screen content to information elsewhere on the web. While a video may contain motion graphics, still photos or animations, it cannot display PDF files, text files and links to other content in a way that is useful for the audience. Nor is it easy to create "chapters." For example, in a YouTube video a viewer cannot jump ahead to a specific chapter or section within the video. Any content that is embedded is "locked in" and is not easy to move or change. It can't contain links embedded into player for a true interactive experience. In sum, many such issues stem from the requirement that it be rendered (or re-rendered). As such, the creator of the content cannot easily link a video back to their own site so their only option is to place that information in the credits along with any other links they may wish to share.

Once a video is complete it may not reach everyone in the intended audience. For one thing, video is tough to view on mobile devices which are optimized for portability rather than processing power. Animations, in particular, are not compatible with all mobile platforms (i.e. iOS, Android, Blackberry, flash/non-flash) which means that potential audience members are excluded.

Advertising connected to video is also not ideal because it interrupts the flow of the video. Advertising in the pre-roll of a video prevents a user from getting to the content quickly, post-roll advertising is easy to ignore and if ads are inserted into the middle of content it is annoying and disruptive. One negative result of video advertising or banner ads is that it can send a viewer on a detour away from their desired content. Another option, banner or overlay ads, completely disrupt the user's experience, appear cheap, have no visual relevance and reflect poorly on the advertiser. None of these ads are related to the content or relevant to the user. As a result, the advertising mostly annoys the user, isn't helpful and doesn't have a great return on investment (ROI) for the advertiser. This is reflected by the low click-through rates on web ads.

Yet another challenge is that, without human curation, video is complicated to search and requires highly intelligent, algorithm-based content scanning systems to "tag" content as a specific category. This is time consuming, not always accurate and would be improved if there were a way for meta-data from the embedded content to be included in the content. Most systems are reliant on user input, like PageRank, which is impossible to scale in video. There is a need for a richer, searchable set of data.

As such, there is a need for systems and methods that address the above drawbacks an/or provide other beneficial functionality or advantages to parties involved with creating, viewing, sharing and/or utilizing such information modules.

OVERVIEW OF SOME ASPECTS

Systems and methods consistent with the present innovations are directed to implementations involving creation, viewing, playing, sharing and/or utilization of information modules, such as mixed-media modules. Implementations herein are directed to web-, server- and/or mobile device based tools for editing content into a rich, mixed-media capable components, or "mixed-media modules". Embodiments. In regard to content that is already edited together into such modules, other embodiments herein may be directed to features associated with using or playing such modules, e.g., to present coordinated text, images, documents, narrations and links all available in one or more, interactive screen format(s) and/or window(s). These implementations may be embedded into mobile devices and appliances, played on a webpage, or integrated into various other processing environments.

It is to be understood that both the foregoing general description and the following detailed description are exemplary and explanatory only and are not restrictive of the inventions, as described. Further features and/or variations may be provided in addition to those set forth herein. For example, the present inventions may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various implementations and features of the present inventions and, together with the description, explain aspects of innovations herein. In the drawings:

FIG. 37A is an illustration of a Mixed Media Module interface showing user ability to listen to narration of a mixed-media module according to certain aspects related to the inventions herein.

FIG. 46 is a flowchart depicting certain embodiments according to certain aspects related to the inventions herein.

DETAILED DESCRIPTION OF ILLUSTRATIVE IMPLEMENTATIONS

Figure 1:
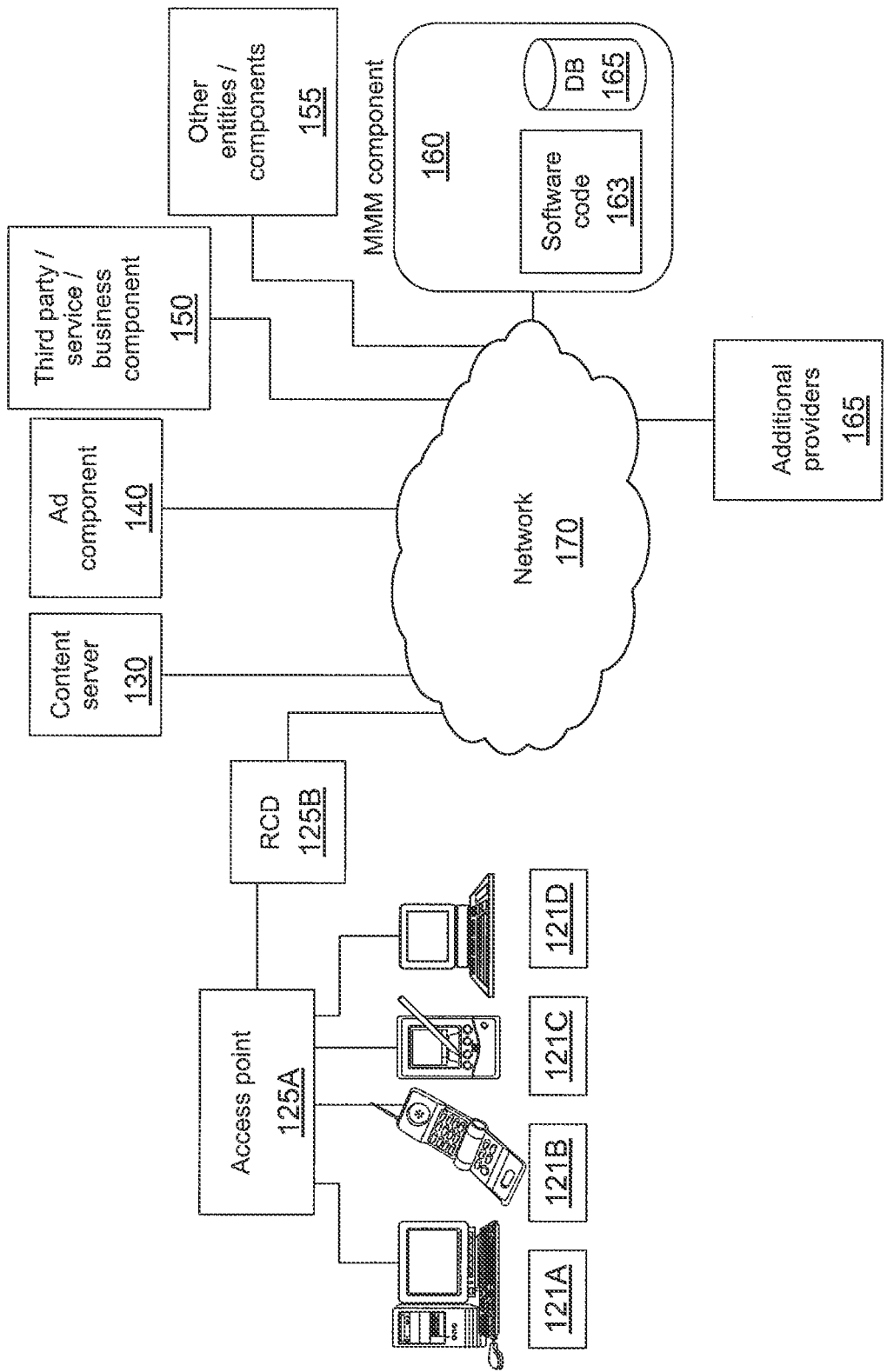
FIG. 1 is a box diagram of an illustrative web or network-based implementations consistent with certain aspects related to the innovations herein.

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Unless otherwise noted, terms are to be understood according to conventional usage by those of ordinary skill in the relevant art.

According to some implementations, systems and methods consistent with the innovations herein are directed to creation, viewing, playing, sharing and/or utilization of information modules, such as mixed-media modules. For example, aspects herein involve innovative aspects of a rich, mixed-media, interactive components, as also sometimes referred to in places herein via the 'Qwiki'™ brand component or module. In some implementations, this component or module may be an interactive narrative presentation of media and/or content and, in certain embodiments, it may feature an interactive layer configured to allow viewers to receive more detailed information from within the information module.

The following is a general description that is applicable to all embodiments. For example, one of skill in the art would recognize that features described herein can be combined and modified to suit the need of a particular use or application.

As set forth herein, mixed-media modules may comprise multiple types of media content that are organized into one or more chapters of mixed-media elements. Exemplary media content applicable for all embodiments includes but is not limited to a text element, an image element, an video element, an audio element, a document element (e.g., word, excel spread sheet, a PowerPoint-like page or presentation), a pdf document, a hyperlink element, a web page element, a pre-existing interactive playable mixed-media module, a pre-existing chapter of mixed-media elements, other media, and/or combinations thereof. In some embodiments, the media content may include an interactive webpage such as a map page that allows a user to navigate in greater details. In such embodiments, the mixed media module may be configured such that a user is able to browse/explore the content of a mixed-media module in an interactive and non-linear manner. For example, a user can explore a map or a spreadsheet in greater detail before resuming viewing the rest of the mixed-media module.

In some embodiments, a chapter of mixed-media elements comprises a cover element, a plurality of content elements. In some embodiments, a chapter of mixed-media elements further comprises a narrative element that is associated with a selected element in the chapter of mixed-media elements. In some embodiments, the narrative element may comprise only audio information. In some embodiments, the narrative element may comprise only audio and video information. In some embodiments, a chapter of mixed-media elements further comprises an interactive navigation element (e.g., the interactive navigation element can be a visual indicator that allows a user to pause the general progression of the mixed-media module and explore a certain element such as a map in detail).

In some embodiments, a mixed-media comprises multiple chapters of mixed-media elements; for example, 2 or more chapters, 3 or more chapters, 4 or more chapters, 5 or more chapters, 6 or more chapters, 7 or more chapters, 8 or more chapters, 9 or more chapters, 10 or more chapters, 15 or more chapters, 15 or more chapters, 20 or more chapters, 30 or more chapters, 40 or more chapters, or 50 or more chapters. In some embodiments, each of the multiple chapters may be contributed by the same user on a single device or on multiple devices. In some embodiments, different chapters are contributed by different users, likely on different devices. For example, multiple employees from different locations of a companies can compile individual reports (individual chapters of mixed-media elements) that can be assembled into a large mixed-media module or a collection of mixed-media modules. In such embodiments, each individual chapters of mixed-media elements can also be considered a mixed-media module. In such embodiments, each individual chapters of mixed-media elements (or individual mixed-media modules) are the media content used to assemble the large mixed-media module or collection of mixed-media modules.

In some embodiments, a mixed-media module comprises two or more types of media elements, three or more types of media elements, three or more types of media elements, four or more types of media elements, or five or more types of media elements. In some embodiments, a mixed-media module comprises image and text content, combined with audio narration. In some embodiments, a mixed-media module comprises image, video, and text content, combined with audio narration. In some embodiments, a mixed-media module comprises video and text content, combined with audio narration. In some embodiments, a mixed-media module comprises text content, or image files or other media corresponding to the text, combined with audio narration or other media types.

In some embodiments, media content is collected by a user using a local device (e.g., a camera, an audio recorder, a video recorder on a mobile device such as a cell phone). In some embodiments, a user can locate and directly upload media content to a server creating the mixed media module via network connection, without download or storage on any local device. In some embodiments, the media content is retrieved from a network-based storage source, including but not limited to Facebook, Flickr, Instagram, a web search result, Dropbox, twitter, YouTube, email, or a cloud-based storage. The network based storage source can be public accessible or authenticated (e.g., requiring a password-protected user account).

In some embodiments, the media content is stored on a local device. In some embodiments, the media content is transmitted to a remote server (e.g., a cloud-based server). In some embodiments, the media content is directly transmitted to and processed by the mixed media module server(s) from a cloud-based storage server or source.

Advantageously and applicable to all embodiments, provided herein are methods and systems using cloud-based technologies for processing mixed-media content. For example, media collection, extraction, storage, transmission and processing require a lot of memory, bandwidth and hardware capacities, i.e., usage that is often difficult for mobile devices or even other devices to perform with reasonable speed. The current methods and systems allow a user to make requests (e.g., requests for media collection, extraction, storage, transmission and processing), through one or more interactive interfaces on the local device, to a cloud-based server. The cloud-based server is equipped with the capacities for collecting, extracting, storing, transmitting and processing any type of media elements to create the mixed media modules and interact with users, such as by sending previews of the mixed media modules, in various ways that require less bandwidth and/or processing capability.

In accordance with the cloud-based technologies, a user device functions as a gateway for transmitting information to and from a cloud-based server to allow fast speed and efficiency. In such embodiments, the current methods and systems provide convenient, interactive, and user-friendly interfaces for transmitting information to and from a cloud-based server. In some embodiments, an interactive interface is provided for a user to select and access media content for further processing, where the media content is either stored locally or via network collection. In some embodiments, an interactive interface is provided for a user to arrange the processed media content in a certain sequence or order. In some embodiments, an interactive interface is provided for a user to modify the media content (e.g., applying a certain theme, style or animation scheme). In some embodiments, an interactive interface is provided for a user to provide enhancement to the media content. For example, through one or more interactive interfaces, a user can record an audio narration or a video narration for one or more selected media elements.

In some embodiments, automated and cloud-based algorithms are provided (e.g., by calling a cloud-based server) for arranging and processing the media content. In some embodiments, automated and cloud-based algorithms are provided (e.g., by calling a cloud-based server) to automatically select an audio narration for a mixed-media module; e.g., from a sound track locally stored on the user device. In some embodiments, automated and cloud-based algorithms are provided (e.g., by calling a cloud-based server) to automatically extract metadata from selected media elements and separate medial elements into groups based on the metadata.

Consequently, using the current methods and systems, a user can create sophisticated, multiple layered mixed-media modules that are previously impossible. In some embodiments, cloud-sourced reporting is made possible. For example, a user can easily assemble images and/or videos, either available on a local device or via network connection, into a presentation by creating a mixed-media module and publishing the mixed-media module via network connection. In some embodiments, text information is combined with the image and/or video information to provide a sense of traditional reporting. In some embodiments, audio narration is combined with the image and/or video information to provide a sense of traditional reporting.

FIG. 1 is a box diagram of an illustrative web or network-based implementations consistent with certain aspects related to the innovations herein. While the description of FIG. 1 shows various elements, the components of the system can be implemented through any suitable unitary or distributed combination of hardware, software and/or firmware. Referring to FIG. 1, the illustrated system may include a mixed-media module ("MMM") component 160, users at access devices 121 (e.g., one or more of access devices 121A-121D), one or more connectivity components 125A/125B, as well as possibly other unitary, connected, interconnected or distributed processing entities or components such as additional providers 165 such as network management components, content servers 130, ad components 140, service/business components 150, and other third party servers or components 155, all connected over a network 170. The mixed-media module component 160 may, in some implementations, be the web-based creation and/or playing/viewing tool (mixed-media module creator) for handling certain mixed-media module innovations herein.

According to some implementations, systems and methods associated with creation of information modules herein may be web-based tools for editing online content into a rich, mixed-media capable, interactive component referred to as a "mixed-media module." In one illustrative implementation, for example, there is provided a web-based method for creating mixed-media modules comprising providing an interface operable by a user to access a web-based information module creator engine/component(s), providing web pages and interactive functionality, via the interface, programmed to allow the user to select a plurality of types of content and drop the selected content into a narrative presentation outline to create a presentation of media, providing web pages and interactive functionality, via the interface, programmed to allow the user to edit the content and/or presentation of the content via the interface, and generating a mixed-media module via integration of the selected content into a playable presentation of the content. Further, the playable mixed-media module may be configured such that the mixed-media module comprises of a plurality of image media elements connected in sequence as well as two or more types of media content selected from text, hyperlink, image, audio, document and video.

With respect to media thereby assembled into such modules, other embodiments herein are directed to "Player" implementations configured to present coordinated text, images, documents, narrations and links all available in one or more, interactive screen format(s) and/or window(s). These Player implementations may be embedded into mobile devices and appliances, played on a webpage, or integrated into various other processing environments. In one illustrative implementation, for example, there is provided a web-based method for utilizing mixed-media modules, comprising providing an interface operable a user to access a web-based information module utilizing engine/component(s), providing web pages and interactive functionality, via the interface, programmed to allow the user to view the information module playing over a web-based interface as a playable presentation, and providing web pages and interactive functionality, via the interface, programmed to allow the user to interact with the mixed-media module and/or associated content. Here, again, the mixed-media module may comprises of a plurality of image media elements connected in sequence as well as two or more types of media content selected from text, hyperlink, image, audio, document and video. Further implementations may be configured such that the user may interact with the mixed-media module and/or associated content configured to provide access to at least one of additional third party information, sites, content, applications and/or other multimedia.

Systems and methods of mixed-media module creation and playing give online content producers tools to create a professional looking presentation without the time and expense of video. Implementations allow "media editing in the cloud," but innovations herein also go beyond straightforward web or cloud advantages. Authors of information modules herein can create an audio-visual presentation by compiling multimedia content (photos, videos, documents, maps, etc), from their devices or across the web, into a creator application ("Creator") available via the web or downloaded onto their device. Here, for example, the author can "drag and drop" the desired content into the Creator and build a "playable" presentation, as explained in more detail below. That presentation may be viewed much like video and may include a linear story line, but it is improves upon video technology because the audience is not required to experience the module in a linear fashion. The technology is innovative for content producers because—unlike video—they do not merely create a finite, linear presentation. The Creator allows an author to create a limitless and updatable, searchable story within the compact, module or component.

For example, an author may edit a module that plays for three minutes from start to finish, but contains thirty minutes of searchable content.

In some implementations, once a mixed-media module has been created, the Player may derive a layer of interactivity from individual pieces of content which are linked to their original sources on the web. This means that a viewer can either watch a mixed-media module in a linear format or they can self-select a path through the content by clicking on hyperlinks within the Qwiki. The viewer is able to explore the information that is of the most interest to them, in greater detail, and in their preferred format (i.e. text, photos, or video). Further, according to some systems and methods herein, Creator/Player implementations may innovative over existing systems due to the information density and mixed-media/multimedia capabilities of the mixed-media module component(s).

Further integrations of such components with search results also involve creation of new ad units (and thereby, in some implementations, new sources of revenue) inside of the mixed-media interactive summary, as explained further below.

Consistent with certain implementations, another way systems and methods herein may depart from the traditional media experiences, especially from online video, is that the end user does not have to experience the mixed-media module in a linear fashion. The user can choose their path through the content with various functionality, such as clicking on hyperlinks within the mixed-media module, via navigation functionality/gestures, and the like. This allows the end-user to explore the information that is of the most interest to them, in greater detail and in their preferred format, e.g., text, photos, video, etc.

In addition to the display of related media/links in a new window on the same page, further implementations provide functionality to display associated content on the same page by instantly modifying it or the contents around it. Here, for example, this new integrated content may be displayed without triggering new tabs.

Especially in view of the issued with traditional video content noted above, systems and methods herein are an improvement on other rich media such as online video technology because they use less bandwidth, are easily customizable, flexible, incorporate interactive video, images, text and other types of media.

In still other exemplary embodiments herein, mixed-media module integrated implementations can incorporate interactive images, text and other types of media. Further, given such implementations operate without large-bandwidth video transmissions especially rendered video content for audiovisual/multimedia experience, systems and methods herein provide improved functionality between mixed media and mobile devices, thus allowing for quicker loads and consumption of less bandwidth during utilization.

Referring now to FIGS. 2-7, implementations herein with mixed-media module integrations involving video can yield improved/higher quality on mobile devices, consistent with aspects of the innovations herein. Such implementations may be web-based or downloadable applications downloaded to the mobile device. In one illustrative implementation, for example, there is provided a method for providing a downloadable application for creating mixed-media modules, the method comprising providing an executable application for download to a user device, the executable application configured for providing an interface operable by a user to execute an information module creator engine/component(s), providing interactive functionality, via the interface, to allow the user to select a plurality of types of content and drop the selected content into a narrative presentation outline to create a presentation of media, providing interactive functionality, via the interface, to allow the user to edit the content and/or presentation of the content via the interface, and generating a mixed-media module via integration of the selected content into a playable presentation of the content configured for low-bandwidth and/or non-rendered utilization to facilitate display on a mobile device.

Additionally, given the flexible and non-rendered nature of the mixed-media modules, streaming and picture quality can be easily optimized for specific mobile devices. Further, such implementations allow ease of interactions by providing a standard universal layer for interactivity. In other embodiments, systems and methods herein may include features and implementations involving interactive and coordinated hyperlinks for deeper exploration of the content within the embedded media—this feature of coordinating links/content inside of the mixed-media module interactive summary allow new attribution and monetization capabilities by content creators and other entities involved with handling the underlying module(s).

Here, it should be noted that a "mobile device" can be any kind of smartphone, tablet computer, laptop, notebook, or any kind of similar device. These devices are typically touch screen enabled and retain internet connectivity through either a shorter range radio such as those used in WiFi technologies, or through cellular telephone connections, or both. The device may connect to the internet in any fashion.

Figure 2:
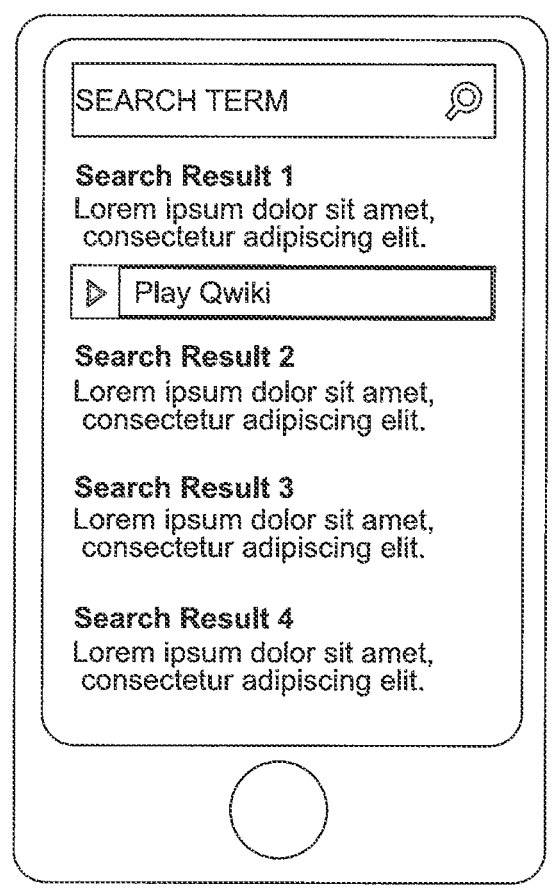
FIG. 2 is an exemplary screenshot showing an illustrative mobile device display including a search engine results page with integrated mixed-media component consistent with certain aspects related to the innovations herein.

FIG. 2 depicts an illustrative web page involving a mixed-media module implementation, formatted for a mobile smartphone or tablet computer, consistent with aspects of the innovations herein. As shown, for example, an illustrative "Play Qwiki module" icon is shown directly beneath an associated piece of identifying textual information, here, a search result in a search result screen.

Figure 3:
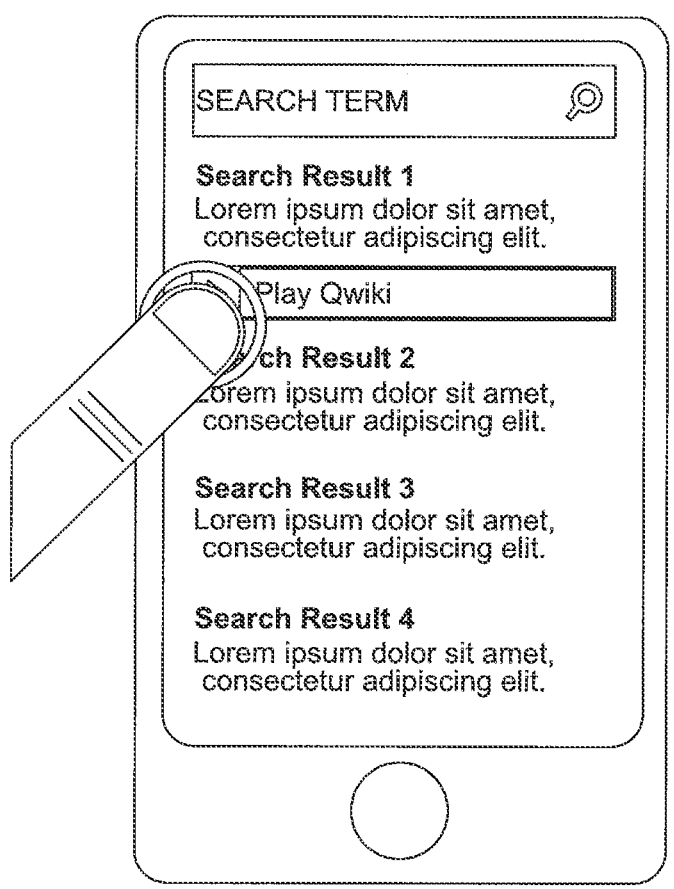
FIG. 3 is an illustration of an exemplary search engine results page showing user action with a mobile device display search results page consistent with certain aspects related to the innovations herein.

FIG. 3 is an illustration of the web page of FIG. 2 showing the integration of touch-enable functionality consistent with aspects of the innovations herein. In FIG. 3, a user is shown tapping the "Play Qwiki module" icon using their finger. Touch enabled screens allow such interaction with a stylus or other such device as well, while such features may be navigated with various cursor-based functionality, as well.

Figure 4:
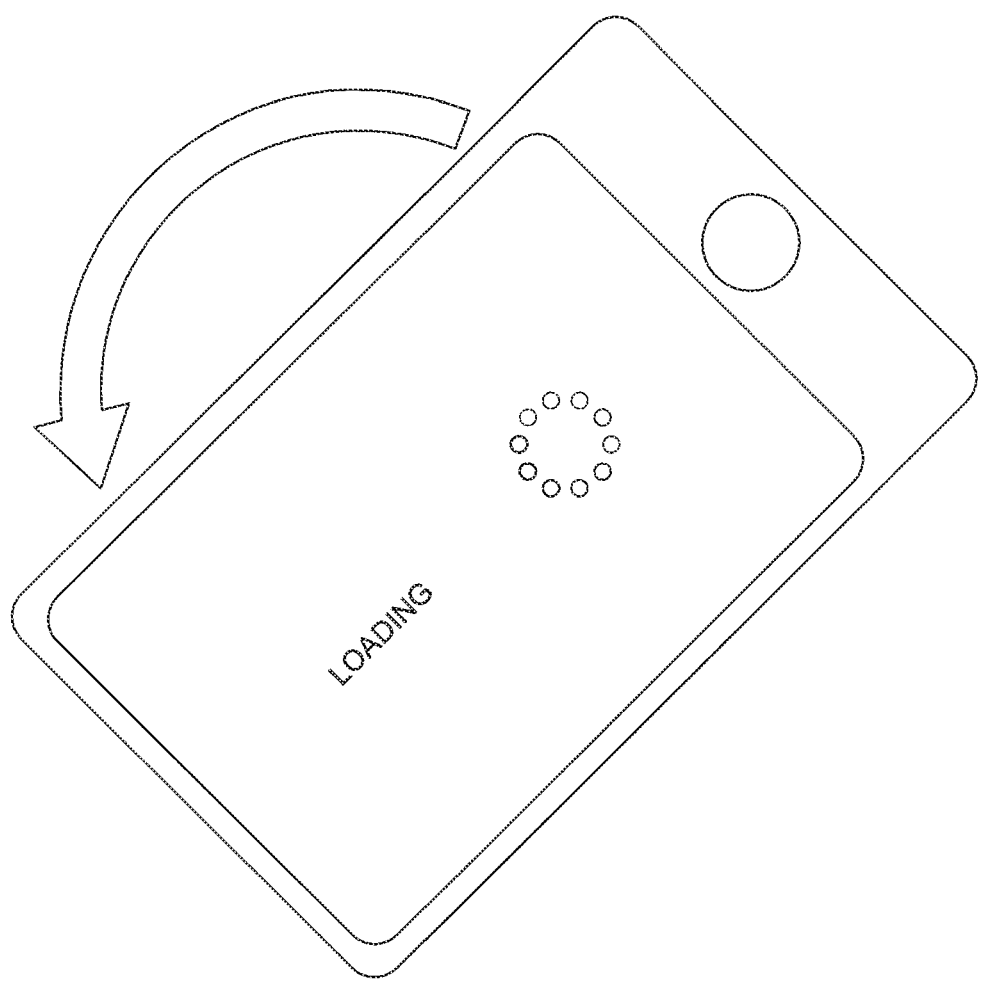
FIG. 4 is an exemplary screenshot illustrating further mobile device display functionality consistent with certain aspects related to the innovations herein.

FIG. 4 is an illustration of exemplary mobile device display and functionality consistent with aspects of the innovations herein. In the example of FIG. 4, the mobile smartphone may be rotated to initiate a specified function associated with mixed-media module creation and/or playing, or to transition between landscape display and portrait display, among other functions.

Figure 5:
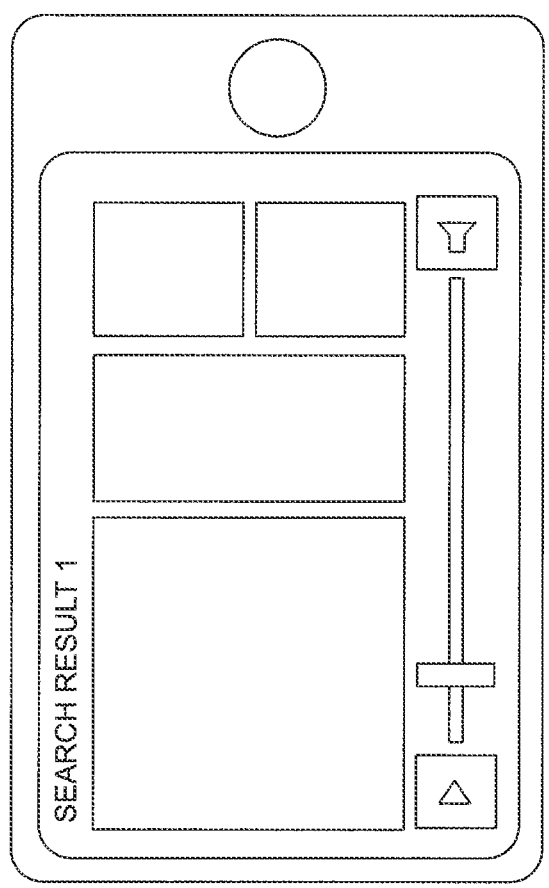
FIG. 5 is an exemplary screenshot illustrating mobile device display of a search results content such as a mixed-media module consistent with certain aspects related to the innovations herein.
Figure 6:
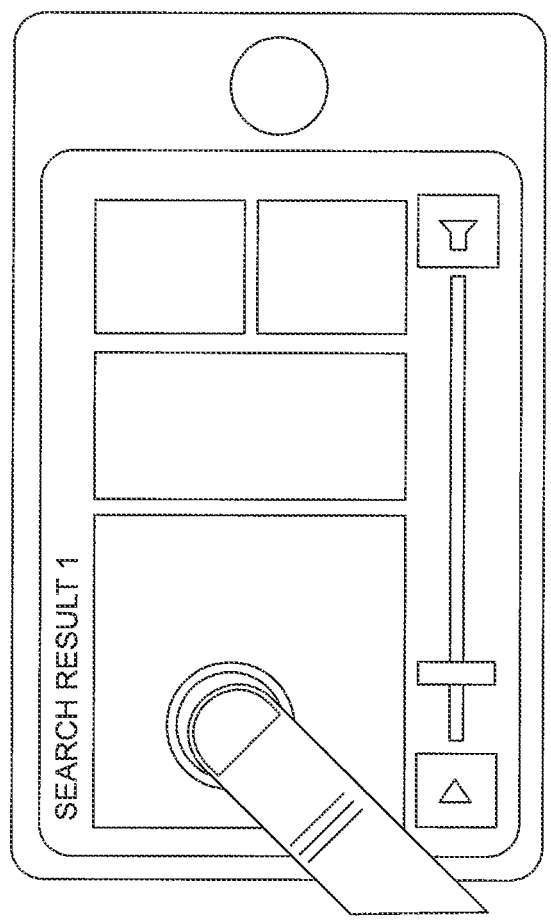
FIG. 6 is an exemplary screenshot of an illustrative mobile device display showing user interaction with a mixed-media module from the search results consistent with certain aspects related to the innovations herein.

FIG. 5 is an exemplary screenshot showing mobile device display of an illustrative mixed-media module consistent with certain aspects related to the innovations herein. FIG. 6 is an exemplary screenshot of an illustrative mobile device display showing user interaction with a mixed-media module from the web page consistent with certain aspects related to the innovations herein.

FIG. 6 shows a user interacting with a portion of the mixed-media module, here tapping the particular media or object with respect to which additional content (details, information, etc) or further functionality is desired. As set forth elsewhere herein, associated servers or engines may be configured to interoperate with such action in a variety of ways.

Figure 7:
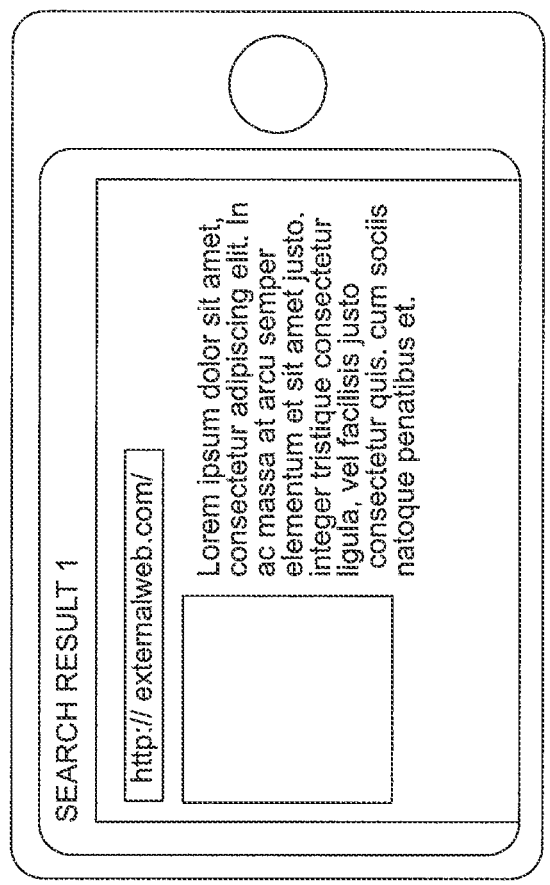
FIG. 7 is an exemplary screenshot of a mobile device display showing an illustrative result of a user interaction consistent with certain aspects related to the innovations herein.

FIG. 7 is an exemplary screenshot of a mobile device display showing an illustrative result of a user interaction consistent with certain aspects related to the innovations herein. Here, this example shows an illustrative re-direct associated with the tapped object to a particular web page. The result shows a multimedia text and image or video within the web page.

Turning to some more general aspects, an illustrative multimedia presentation herein may be configured as an interactive system of mixed-media/interactive content with clickable components. These mixed-media modules may also provide visual relevancy—the multimedia nature of such interactive component provides more in-depth detail of a topic than text alone.

In accordance with aspects of the present innovations, mixed-media module interactive summaries as integrated herein are lightweight—they use less bandwidth than pure video and are a rich, interactive, multi-media experience. Viewing such a mixed-media module is faster and easier than video alone because they are interactive and have more discrete sets of contents that can easily be traversed beyond a simple play bar associated with most traditional video. Mixed-media modules herein also contain more information (meta-data) than video because of its multitude of components (mixed media), interactive nature and because of being configured to be interactive with users/viewers.

According to certain aspects, creator implementations allow an author to create interactive, meta-data rich, playable content for the web. These implementations are intuitive to use, thus demand only a low-learning curve. The creator is touch-enabled, such as via gestures (see below) for mobile devices and the interface is "drag and drop" for ease of use, as explained further below.

Easy coordination and timing of the audio and video tracks are other innovative features of the Creator. This includes a "talking head" narrator who can be filmed on a laptop or mobile phone camera. Because it is simple to time a "talking head" or narrator's voice with a visual, mixed-media presentation and there is no need to edit it in a complicated video timeline. Additionally, there are custom filters for the creation of special effects and graphics which are simple to use. The drag-and-drop editing that makes the Creator easy to use also means that it is simple to grab photos and images from a mobile device or online photo sharing site. Another advantage to the Creator is that is can be used collaboratively, especially implementations stored in the cloud. Implementations are also easy to update and change at any point because the content isn't "locked in" (rendered) like video. In essence, an online content producer can create a professional looking presentation without the time and expense of video.

Unlike traditional video production (mixed-media modules herein are not video), the interactive component requires no lengthy production process or rendering time. It's much lighter weight than video because it uses up five times less bandwidth. The individual elements within a module are not hosted on the server of an author, instead the preview may be stored on local servers for guaranteed availability. The images and files may be linked to the original source. The Creator allows an author to link to content in its original location which solves storage problems and possibly helps preserve the owners copyright protection. The Creator also offers an animation platform that includes a custom graphics tool with no rendering issues as with traditional video. The processing of the animation is also off-loaded to device playing back the module which means precious bandwidth is preserved—this is especially valuable when playing on mobile devices.

Content creators can add depth to the narrative presentation in a way that is not possible with video. The module can be viewed as a linear story, but the embedded and coordinated links mean that the audience can self-select its path through the module. For example, there is currently no method for including hyperlinks with online video. The producer of a video cannot link to a partner site, get credit for referring customers to an ecommerce site or, simply, strengthen their content with references via hyperlinks. "Chaptering" is another technology that enhances the experience of creating and viewing a mixed-media module. The author can divide a Qwiki into chapters—something that is not easily possible with streaming video—and give the audience the ability to easily jump around and navigate through the content. The Creator gives an author the tools to do all of these things via editor tools, explained below.

The "choose your own adventure" style of viewing a module herein also means that advertising can be more sophisticated with such products. The path a viewer chooses through the hyperlinks can determine the type of advertising they see because it builds a consumption profile. Advertising can also be targeted more effectively as the author may have control over the types of advertising viewed by their audience. An ad suggestion engine may enhance the advertising experience for both the author and the audience. Ads in the modules herein are like the ads in a magazine—selected by the author or publisher to fit the audience and the adjacent content. The added context for these ads may result in a higher CPM for advertisers who will pay higher rates for better results and more targeted viewers. Also, the advertising can be integrated seamlessly without interrupting the viewing experience.

The Creator also potentially creates a new revenue stream for an author. If the author embeds a link to a site—perhaps a product that they recommend—and that click-through results in a sale, the author could get a sales commission or credit for that sale. These innovations make it much easier for an author to create a referral and get credit for that referral. This could work with all types of e-commerce ranging from catalogs to travel sites.

Another advantage to systems and methods herein is their cross-platform capabilities. Because the present implementations work across platforms it will result in the wider consumption of information on sites that contain a module. It has auto-resize for different screens and internet connections—it doesn't simply rely on compression—which results in a product that is more easily viewed. Mobile device users, in particular, will find it easier to view modules herein.

Qwiki's can include, but are not limited to, PDFs, images, video, documents, text, and other web pages. This becomes content based meta-data, not merely "tags." The Qwiki Creator is a vast improvement over online video because it "levels the playing field" when it comes to the creation of playable media. The Creator opens the door to almost anyone who wants to create playable, narrative content online without expensive equipment and steep learning curves. A low barrier to entry (i.e. time, money, skill-set) means that anyone with a story to tell and internet access—regardless of their resources—now has an authoring tool for multimedia communication. The Creator also provides better opportunities for SEO and the implementation of meta-data on a website which is useful for anyone wishing to bolster their online presence in a way that is rich and engaging.

Figure 8:
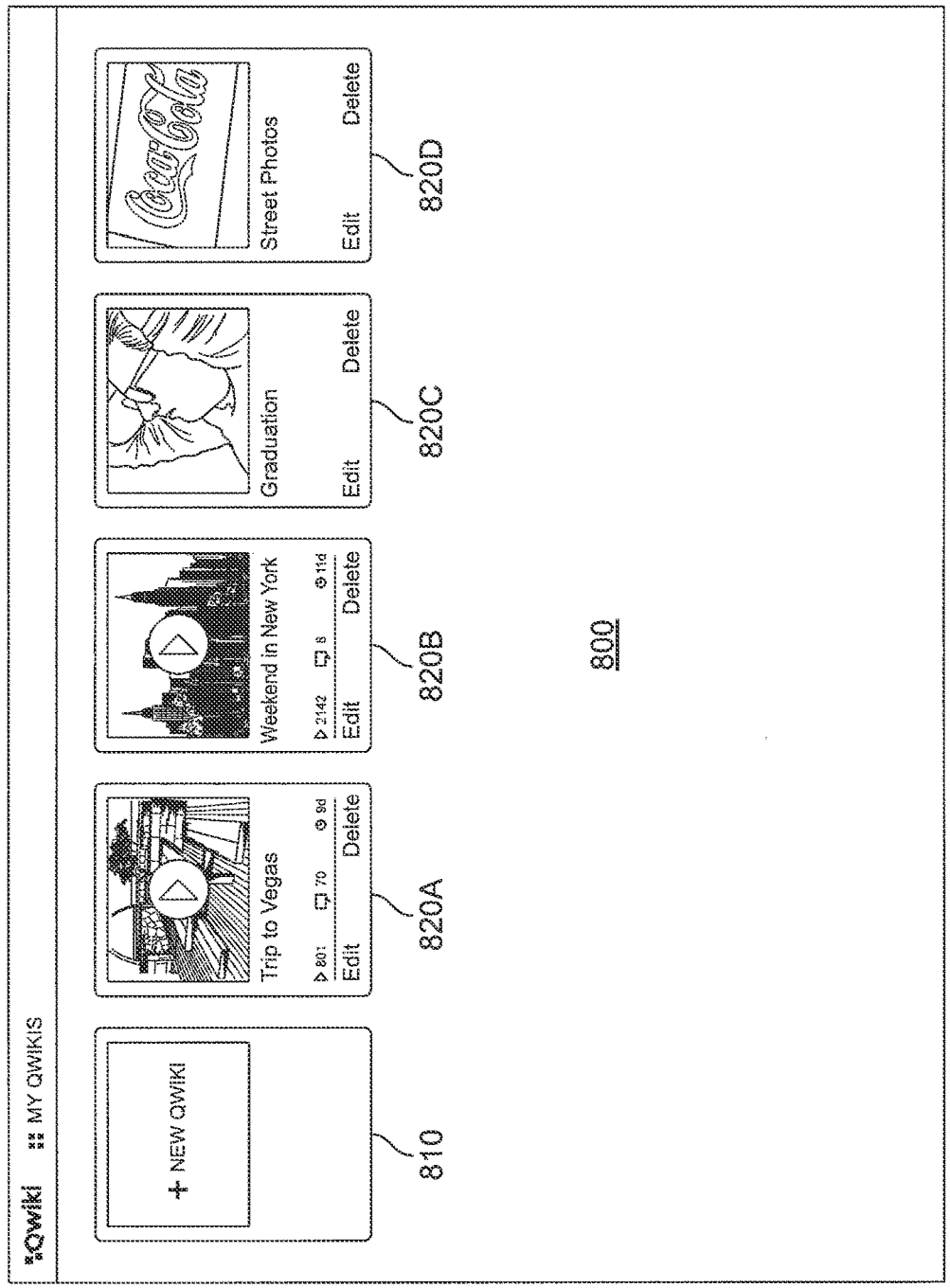
FIG. 8 is an illustration of a Mixed-Media Module creator dashboard consistent with certain aspects related to the innovations herein.

FIG. 8 is an illustration of a Mixed-Media Module creator dashboard consistent with certain aspects related to the innovations herein. Referring to FIG. 8, the dashboard 800 may comprise icons (options) such as creating a new Mixed-Media Module 810, and a list of existing Mixed-Media Modules 820A, 820B, 820C, 820D, among other items and options set forth below.

Figure 9:
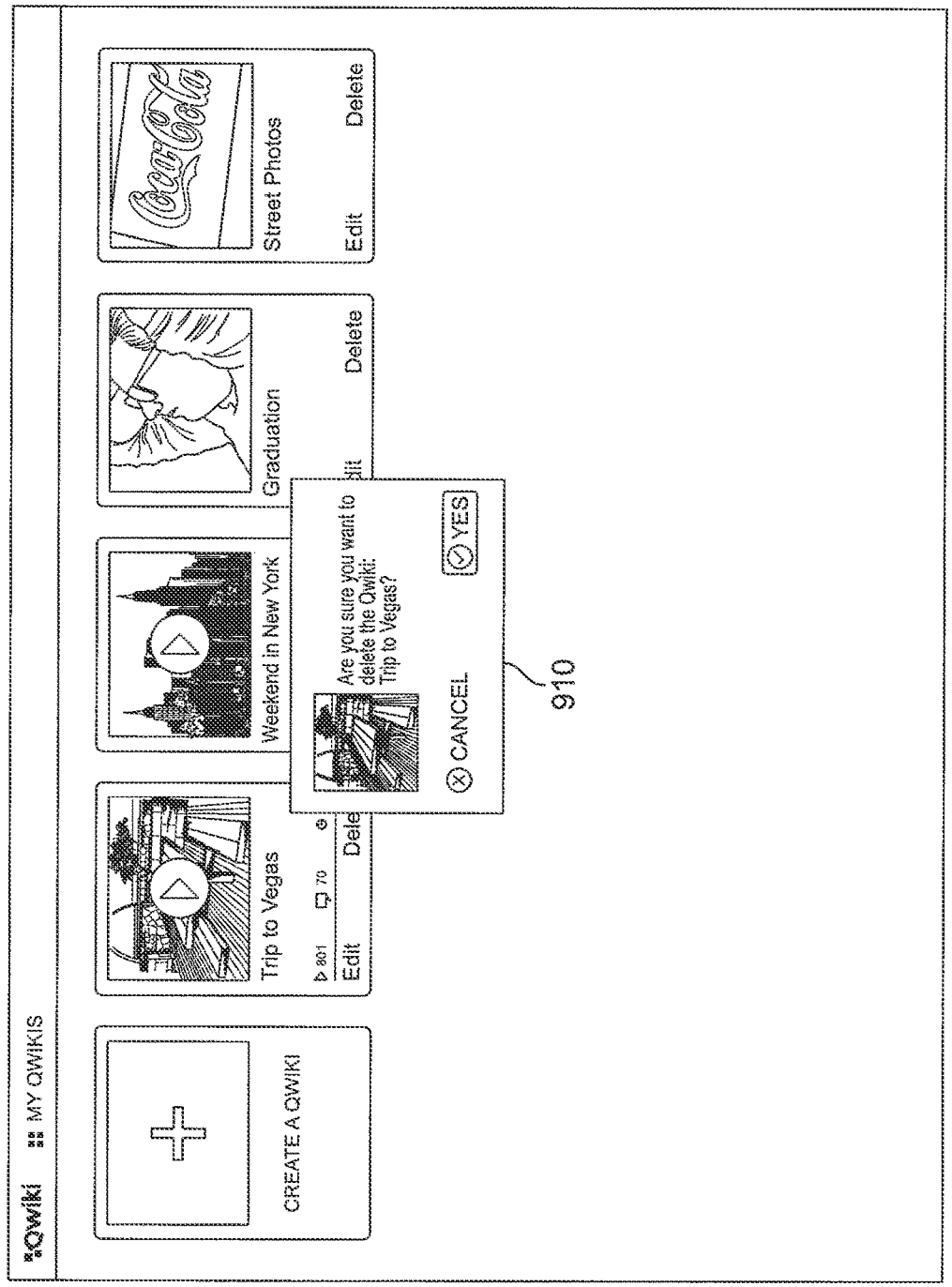
FIG. 9 is an illustration of a Mixed-Media Module creator showing aspects of removing a module consistent with certain aspects related to the innovations herein.

FIG. 9 is an illustration of a Mixed-Media Module creator showing aspects of removing a module consistent with certain aspects related to the innovations herein. Referring to FIG. 9, users are able to remove Mixed-Media Modules by clicking a delete button. This, for example, could prompt a notification 910 for the user to confirm deletion of a Mixed-Media Module.

Figure 10:
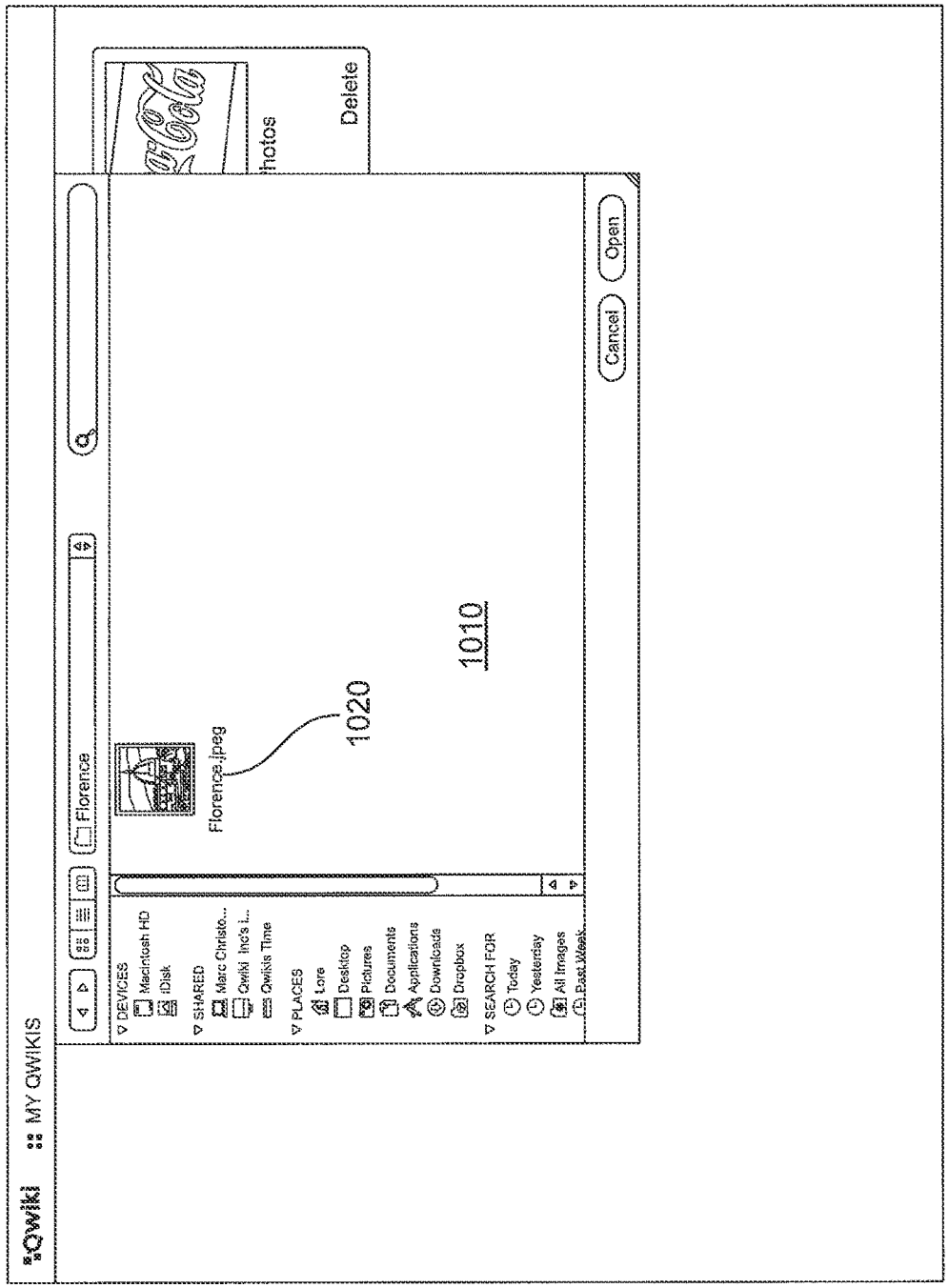
FIG. 10 is an illustration of a Mixed-Media Module creator showing aspects of creating a module consistent with certain aspects related to the innovations herein.

FIG. 10 is an illustration of a Mixed-Media Module creator showing aspects of creating a module consistent with certain aspects related to the innovations herein. Referring to FIG. 10 the module is created via the navigation window 1010 that allows a user to organize and manage the Mixed-Media Module files 1020.

Figure 11:
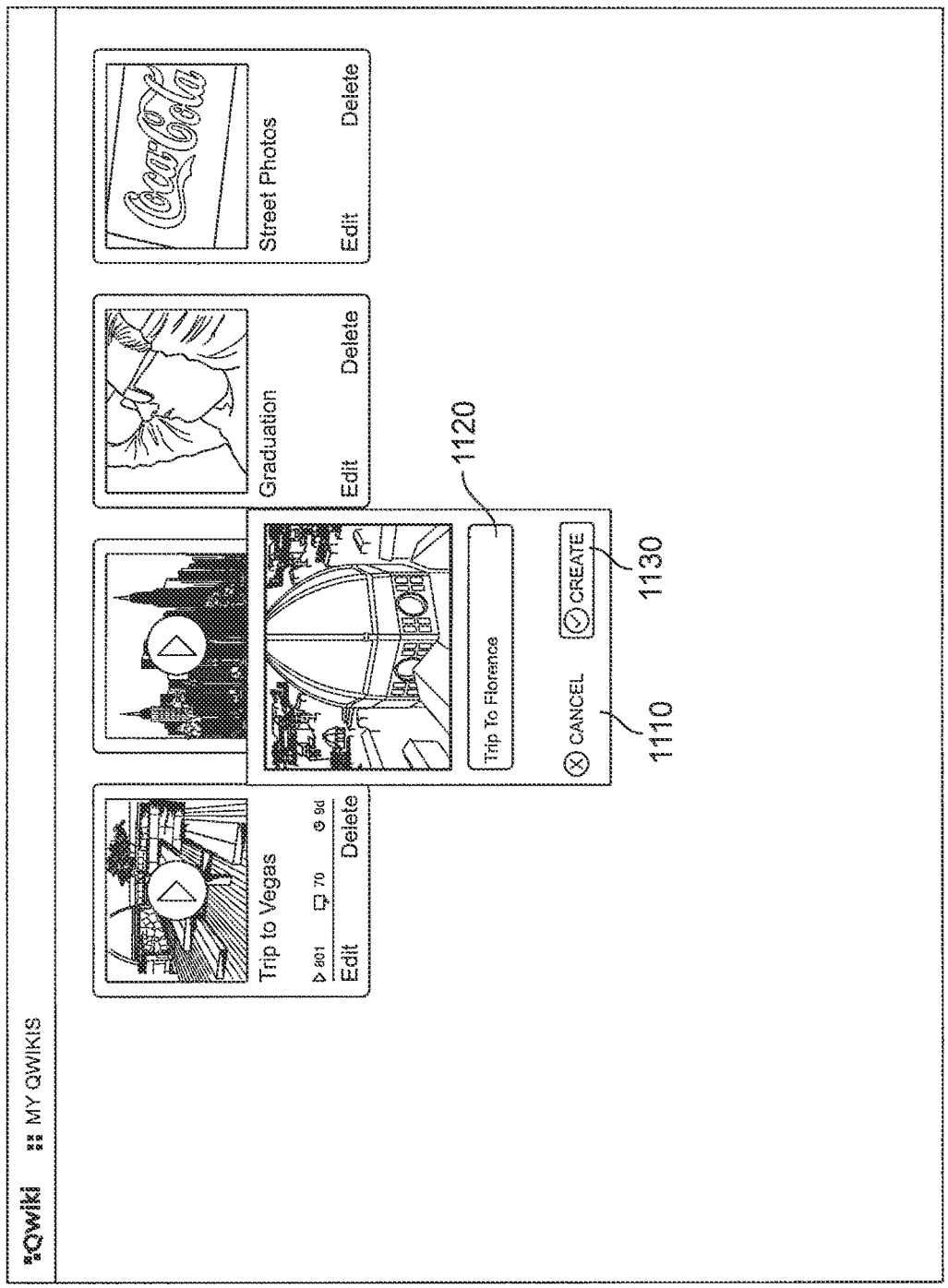
FIG. 11 is another illustration of a Mixed-Media Module creator showing aspects of creating a module consistent with certain aspects related to the innovations herein.

FIG. 11 is another illustration of a Mixed-Media Module creator showing aspects of creating a module consistent with certain aspects related to the innovations herein. Referring to FIG. 11, once the file is selected, the Mixed-Media Module could show an icon 1110 with a place to name the file 1120 and select "create" button 1130. This, for example, could launch the creation of the Mixed-Media Module substance.

Figure 12:
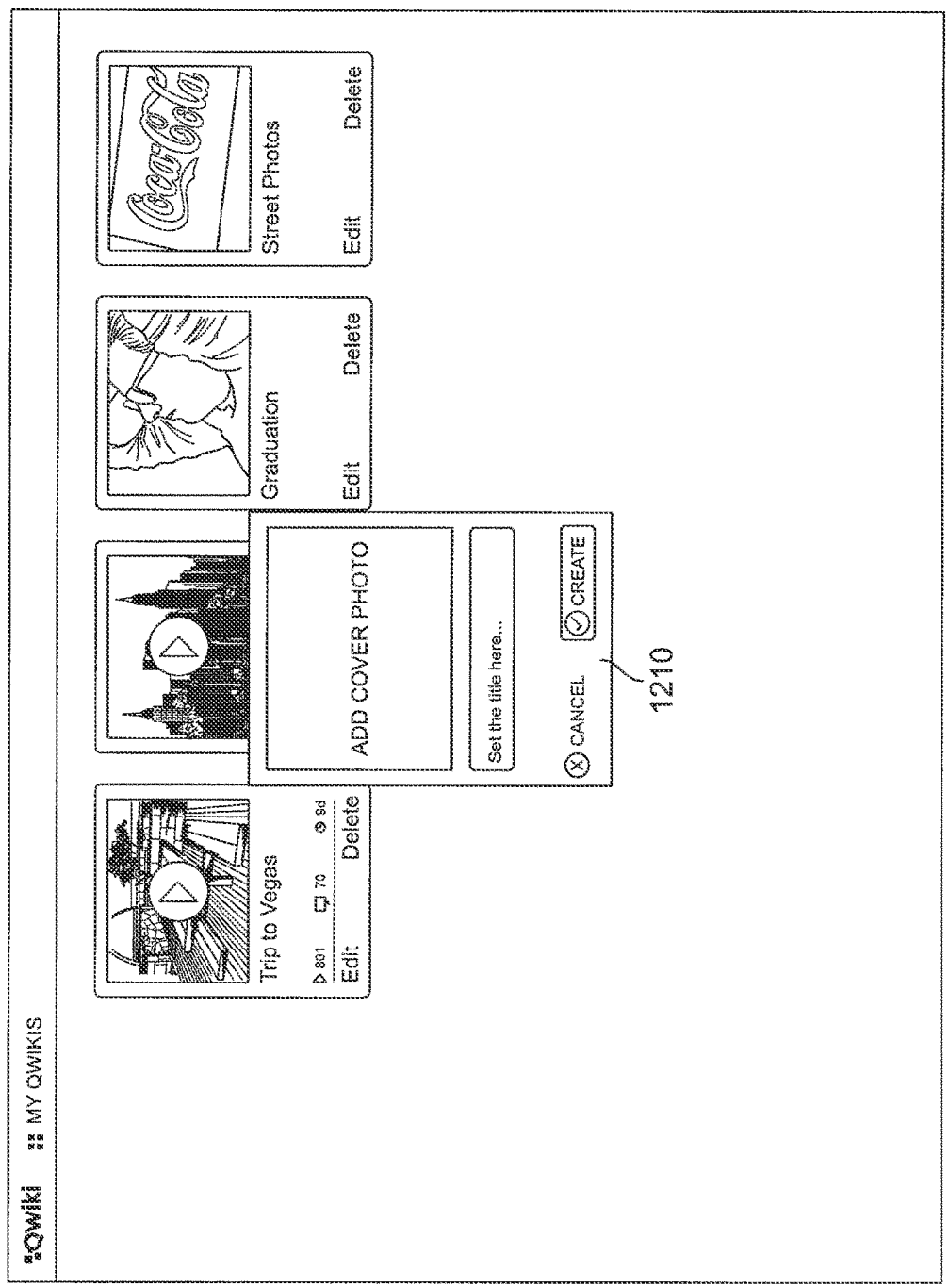
FIG. 12 is another illustration of a Mixed-Media Module creator showing aspects of creating a module consistent with certain aspects related to the innovations herein.

FIG. 12 is another illustration of a Mixed-Media Module creator showing aspects of creating a module consistent with certain aspects related to the innovations herein. Referring to FIG. 12, the user can add a cover photo and set the title, 1210 to the Mixed-Media Module.

Figure 13:
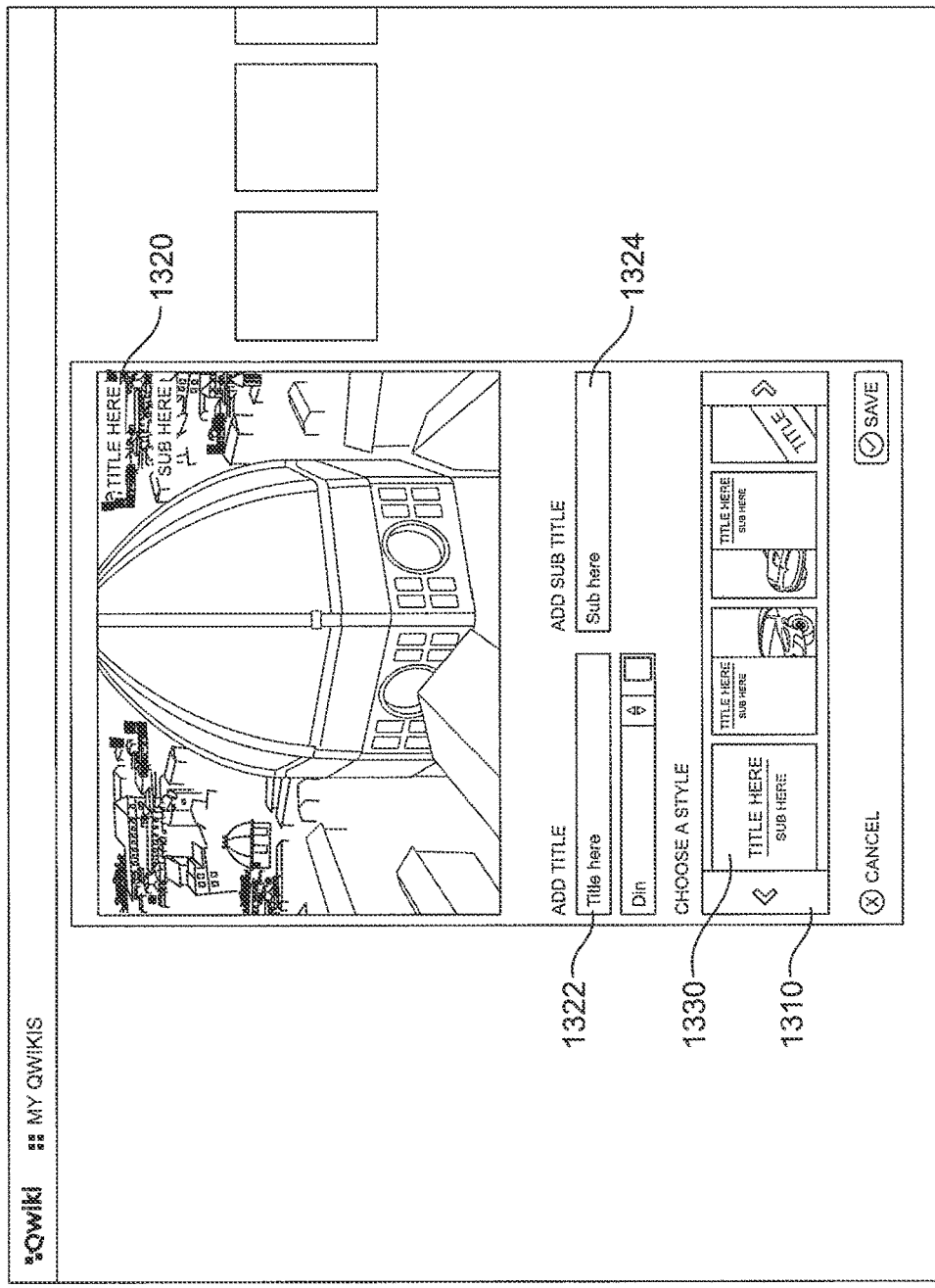
FIG. 13 is another illustration of a Mixed-Media Module creator showing aspects of creating a title card consistent with certain aspects related to the innovations herein.

FIG. 13 is another illustration of a Mixed-Media Module creator showing aspects of creating a title card consistent with certain aspects related to the innovations herein. Referring to FIG. 13, the Mixed-Media Module creation window 1310, allows users to edit different portions of the module. The title section 1320 reflects the title 1322 and subtitle 1324 entry boxes. Further, the style selection bar 1330 could allow users to pick a style for the Mixed-Media Module.

Figure 14:
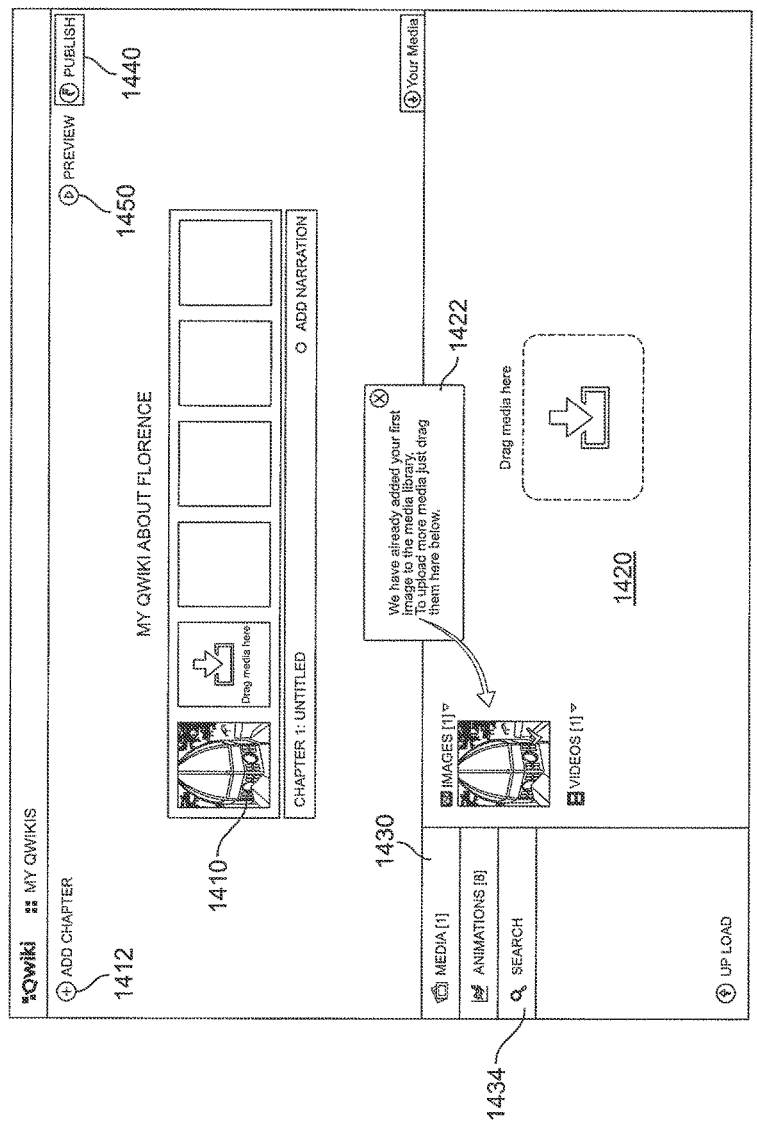
FIG. 14 is another illustration of a Mixed-Media Module creator showing aspects of creating a media library for the first time consistent with certain aspects related to the innovations herein.

FIG. 14 is another illustration of a Mixed-Media Module creator showing aspects of creating a media library for the first time consistent with certain aspects related to the innovations herein. Referring to FIG. 14, the media timeline section 1410 can reflect the order of the media that is organized from the general media selection area 1420 in the library. The system can notify the user, as in this example, that the image selected has been added to the library, through a notification bubble 1422. Any media files can be dragged and dropped into this media selection area 1420 for use in the Mixed-Media Module.

Continuing with FIG. 14, the chapters can be added to via an add chapter button 1412 to designate different subtopics in the Mixed-Media Module creator. Further, the general media selection area of the library 1420 shows the different media files that are to be arranged in the timeline above 1410. Once completed, the user can select the "publish" 1440 or "preview" 1450 buttons in this example, to see their Module play. Also, the updates bar 1430 shows how many media files, animation files, and other files have been associated with this Mixed-Media Module. There is also a search button 1434 that allows users to search through files to decide to drag them to the general media selection section 1420.

Figure 15:
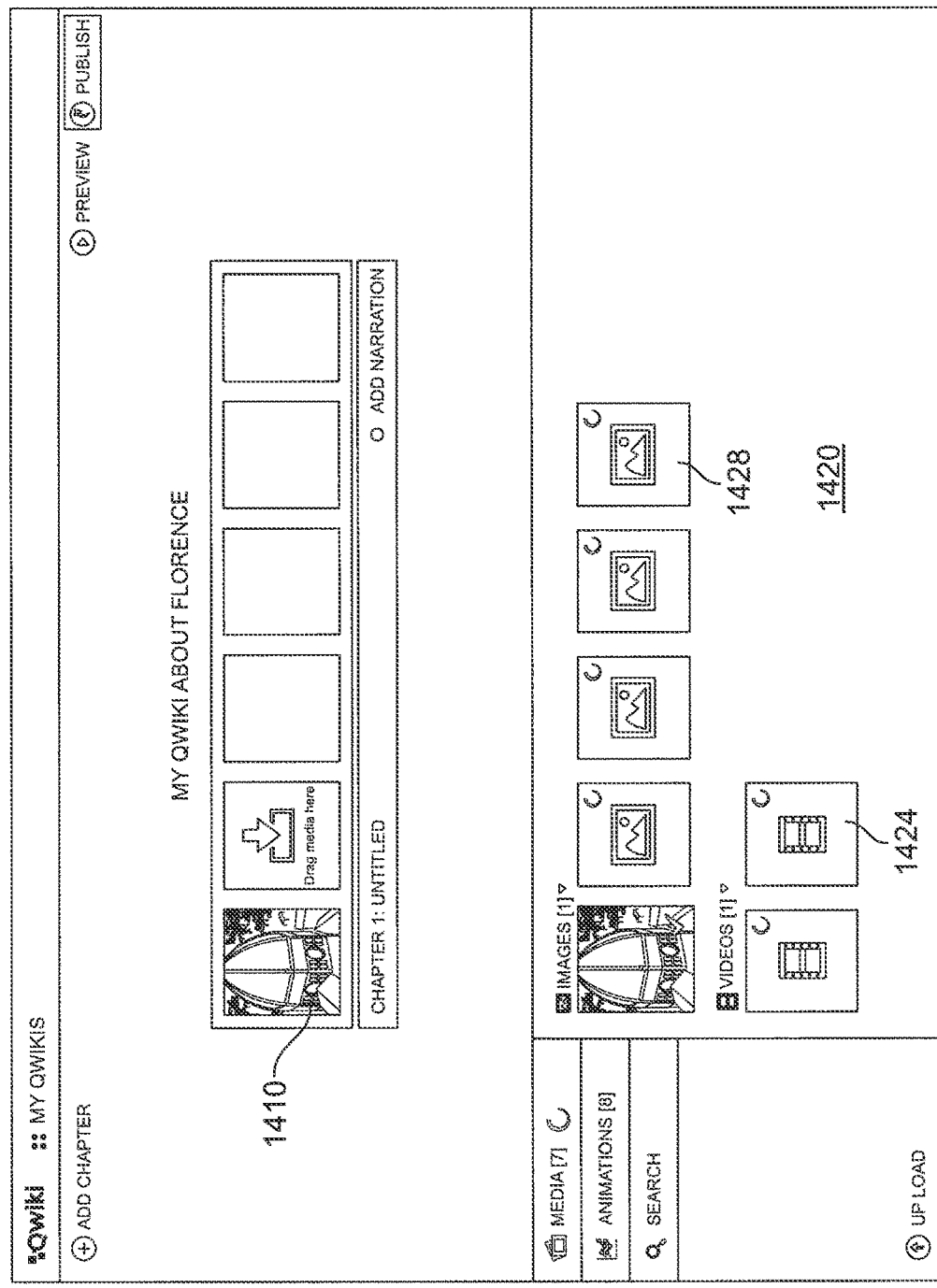
FIG. 15 is another illustration of a Mixed-Media Module creator showing aspects of media library uploading implementations consistent with certain aspects related to the innovations herein.

FIG. 15 is another illustration of a Mixed-Media Module creator showing aspects of media library uploading implementations consistent with certain aspects related to the innovations herein.

Referring to FIG. 15, the timeline 1410 reflects what media has been included by the user. The video 1528 and images 1524 are shown in this example, in the general media selection section library 1420. The files are shown in a "loading" mode, as they are uploaded to the system, with an icon instead of the preview of media.

Figure 16:
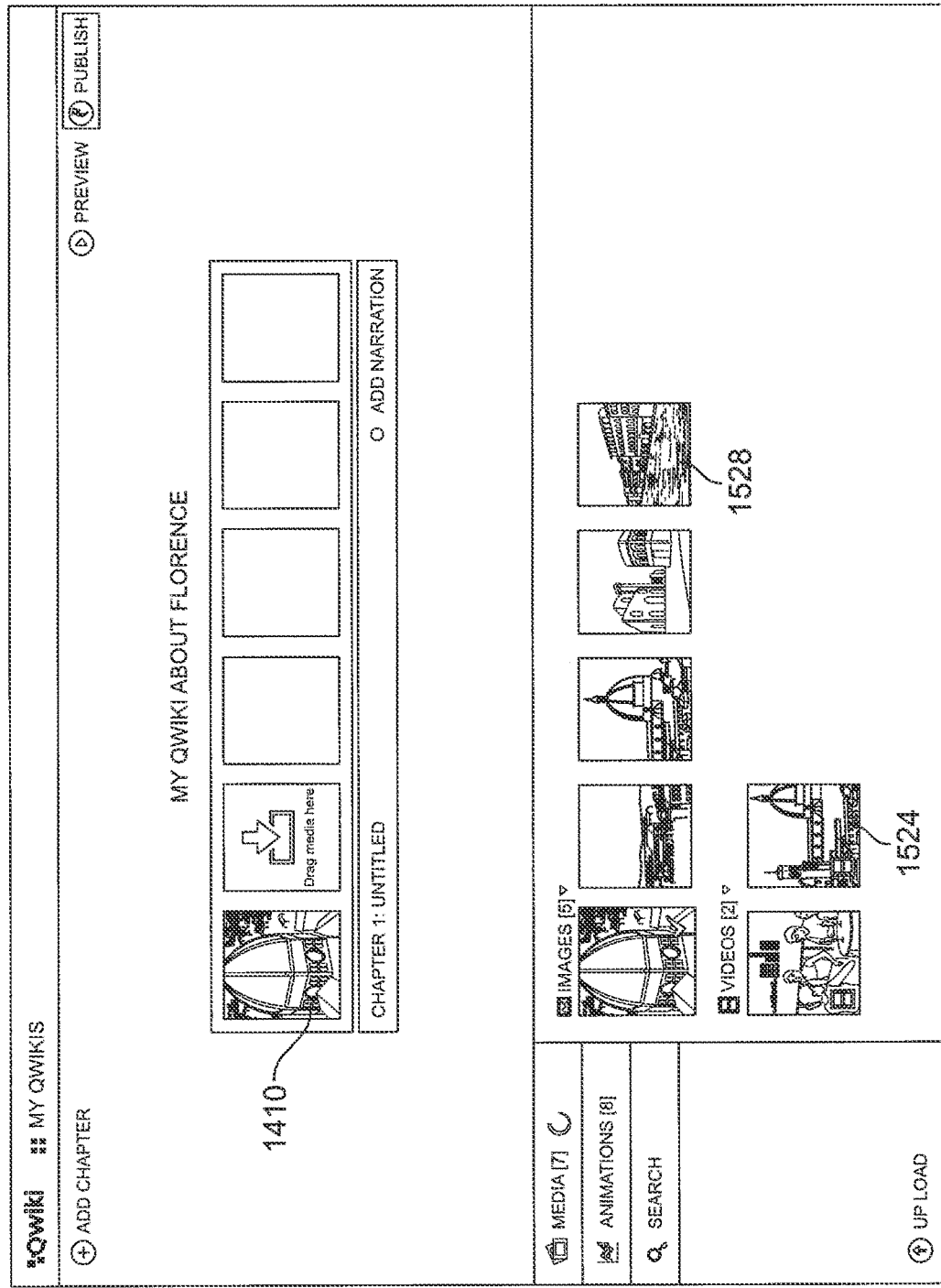
FIG. 16 is another illustration of a Mixed-Media Module creator showing aspects of example media library implementations, where the library is full, consistent with certain aspects related to the innovations herein.

FIG. 16 is another illustration of a Mixed-Media Module creator showing aspects of example media library implementations, where the library is full, consistent with certain aspects related to the innovations herein. Referring to FIG. 16, the files, once loaded, are shown in the video bar 1524 and images bar 1528. These files, in this example, are shown with a preview of the media in their icon, after they have fully loaded and are ready for implementation into the Mixed-Media Module timeline.

Figure 17:
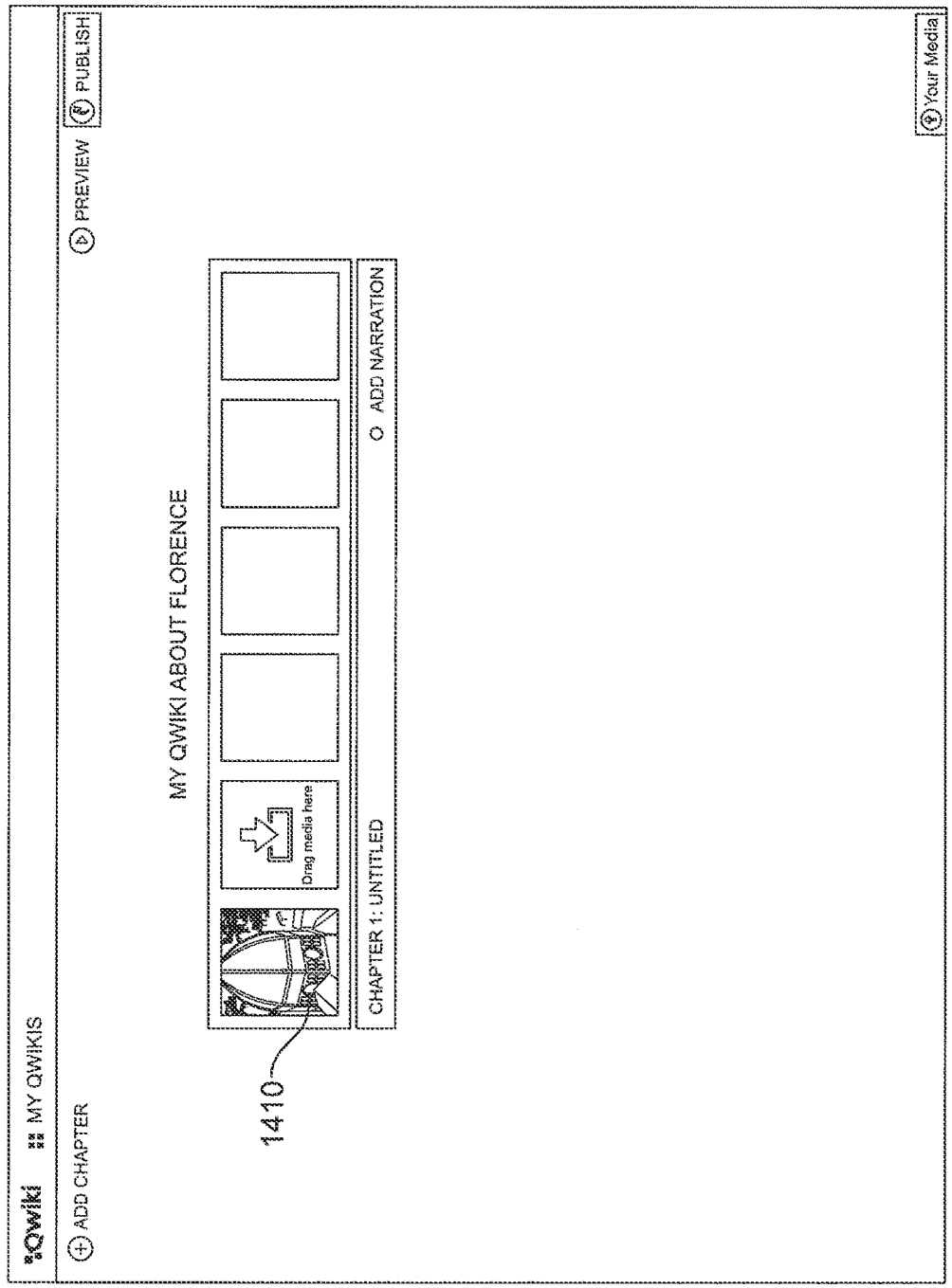
FIG. 17 is another illustration of a Mixed-Media Module creator showing aspects of example media library implementations, where the library is off, consistent with certain aspects related to the innovations herein.

FIG. 17 is another illustration of a Mixed-Media Module creator showing aspects of example media library implementations, where the library is off, consistent with certain aspects related to the innovations herein. Referring to FIG. 17, the library is not shown in this example display. The media timeline section 1410 is shown without the other files, not loaded.

Figure 18:
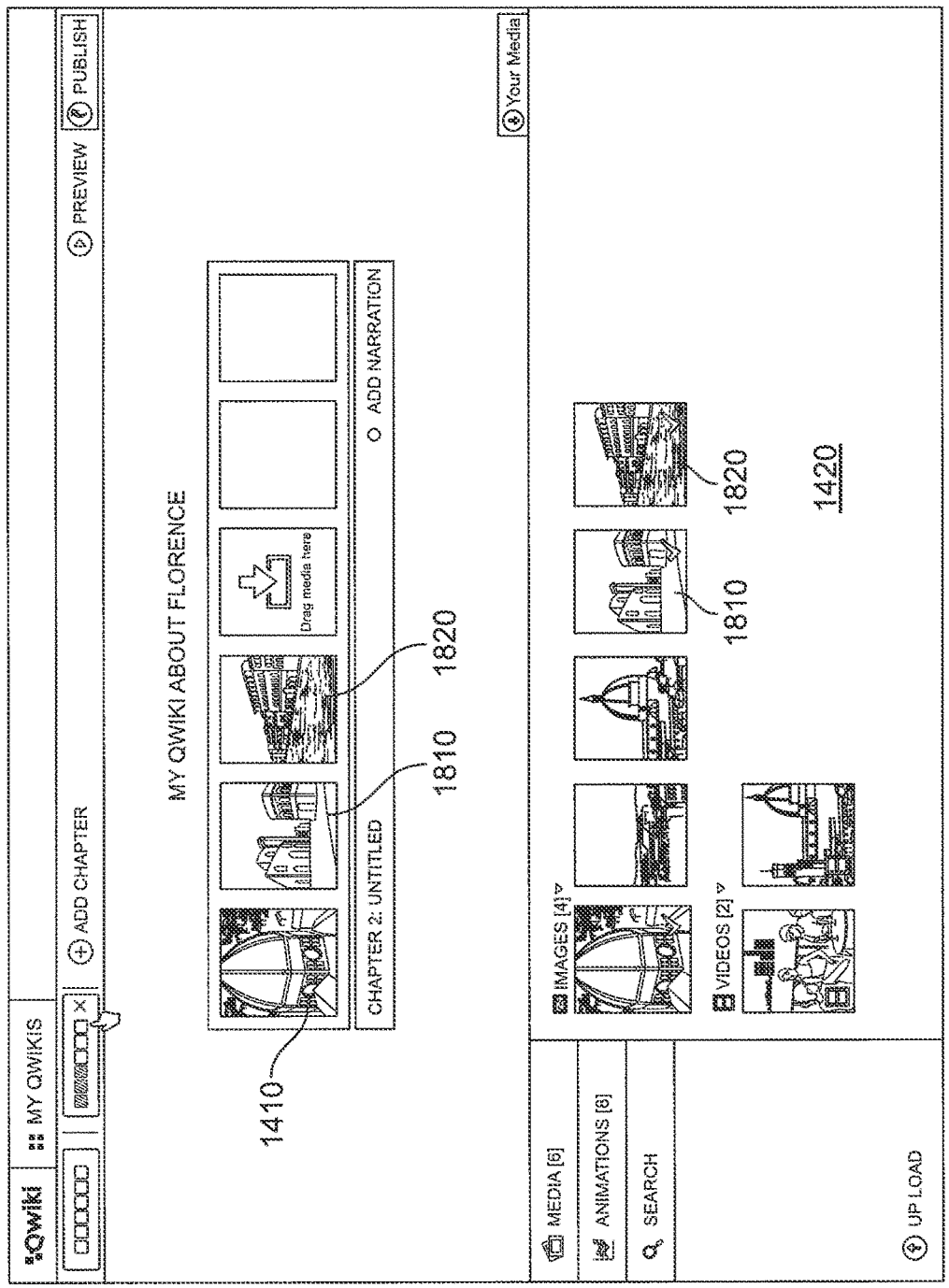
FIG. 18 is another illustration of a Mixed-Media Module creator showing aspects of example chapter 2 hover implementations consistent with certain aspects related to the innovations herein.

FIG. 18 is another illustration of a Mixed-Media Module creator showing aspects of example chapter 2 hover implementations consistent with certain aspects related to the innovations herein. Referring to FIG. 18, the library again shows that files loaded into the general selection section 1420, are included in the Mixed-Media Module and those that are not. For example, the image 1810 happens to be loaded into the timeline 1410. So is image 1820. Therefore, they are reflected both in the timeline 1410 and in the general selection area 1420 but there, with a check mark or other indication, acknowledging that it is included in the final presentation.

Figure 19:
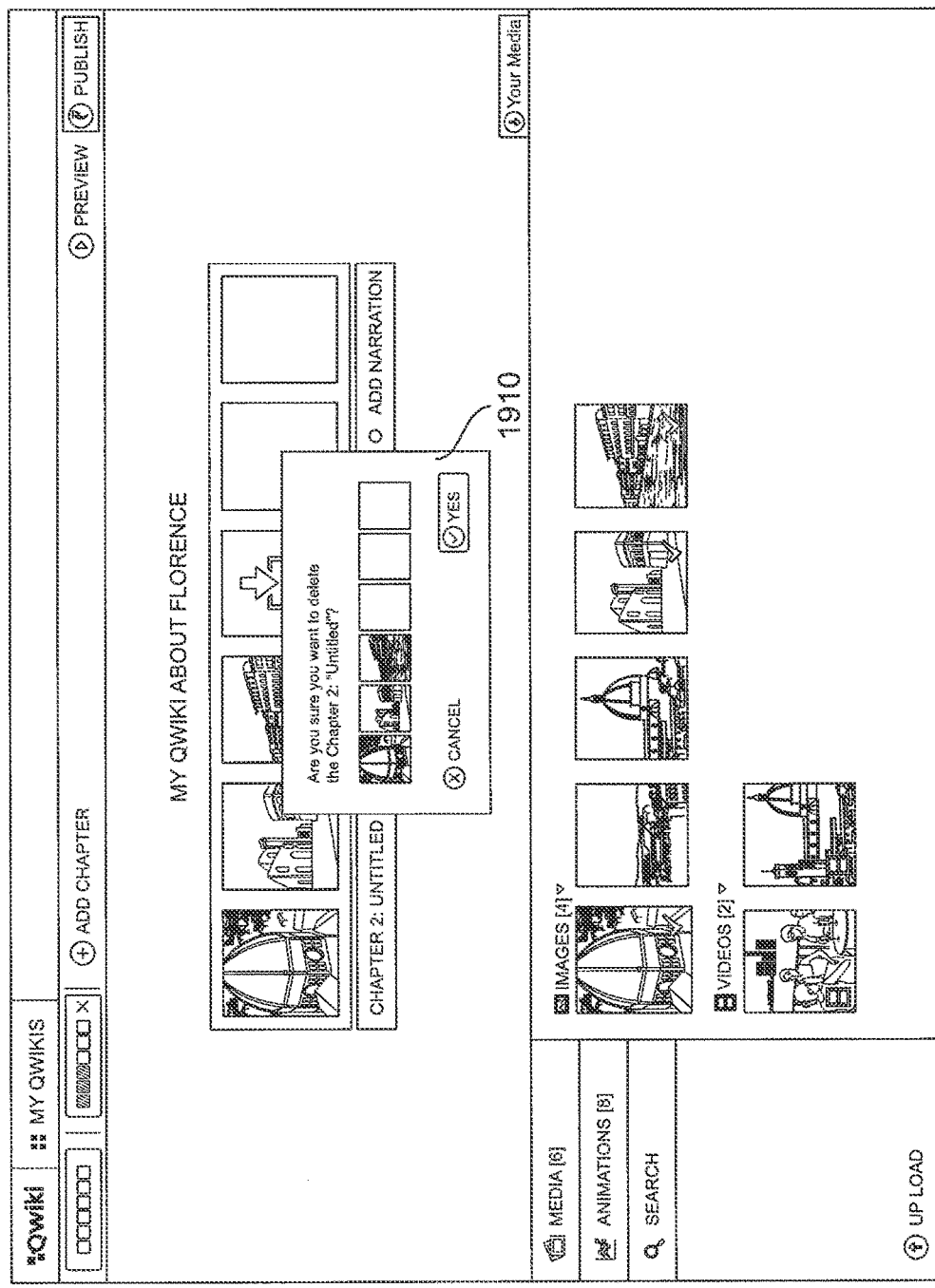
FIG. 19 is another illustration of a Mixed-Media Module creator showing aspects of example remove chapter implementations consistent with certain aspects related to the innovations herein.

FIG. 19 is another illustration of a Mixed-Media Module creator showing aspects of example remove chapter implementations consistent with certain aspects related to the innovations herein. Referring to FIG. 19, the user is able to remove a chapter if so desired. A prompt 1910 can be displayed to ensure that the user knows what they are attempting to delete, and to confirm or cancel that deletion.

Figure 20:
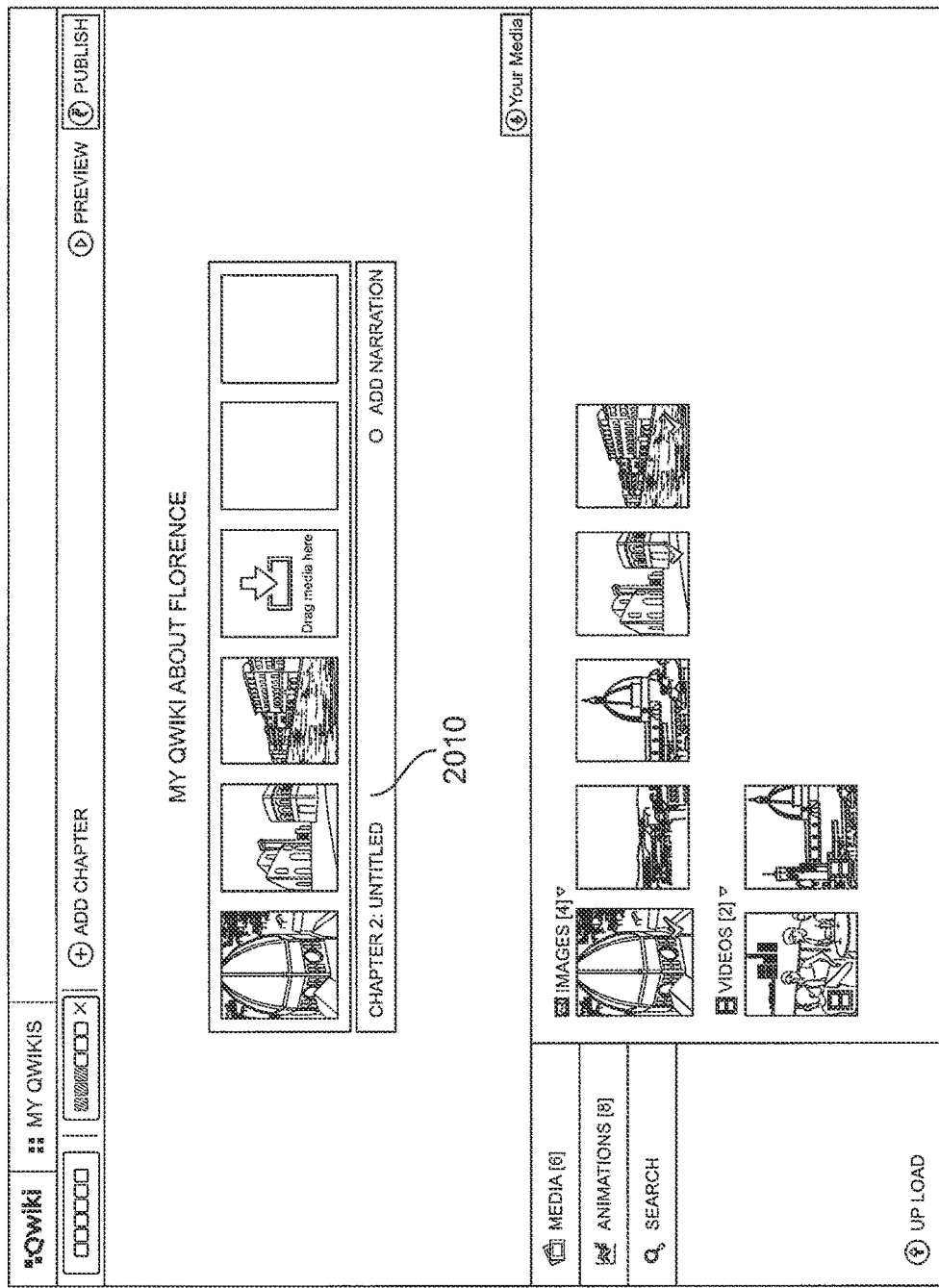
FIG. 20 is another illustration of a Mixed-Media Module creator showing aspects of example chapter 2 implementations consistent with certain aspects related to the innovations herein.

FIG. 20 is another illustration of a Mixed-Media Module creator showing aspects of example chapter 2 implementations consistent with certain aspects related to the innovations herein. Referring to FIG. 20, the Mixed-Media Module can include multiple chapters. In FIG. 20, a second chapter is shown and indicated in the chapter selection bar 2010.

Figure 21:
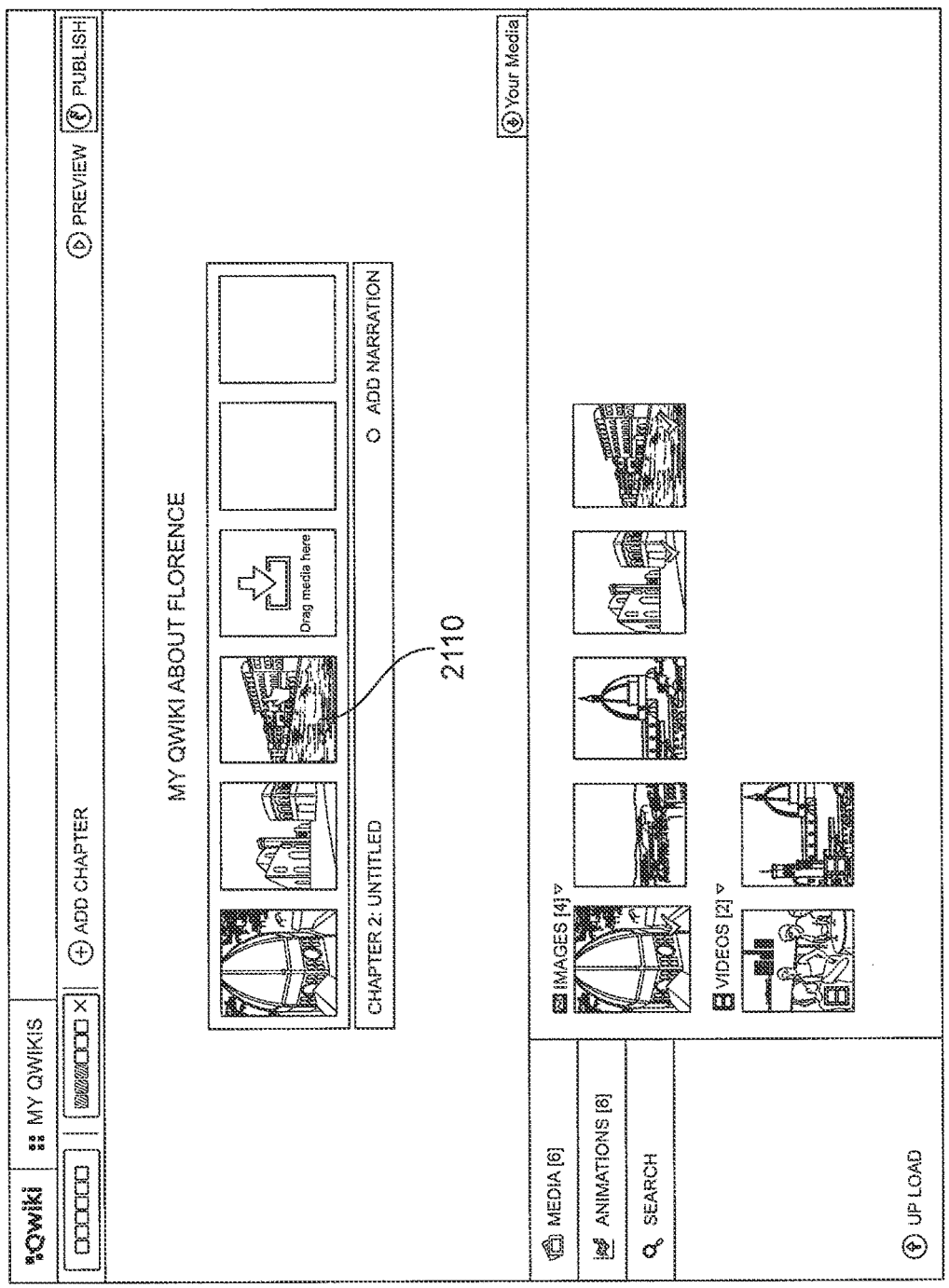
FIG. 21 is another illustration of a Mixed-Media Module creator showing aspects of example element mouse hover implementations consistent with certain aspects related to the innovations herein.

FIG. 21 is another illustration of a Mixed-Media Module creator showing aspects of example element mouse hover implementations consistent with certain aspects related to the innovations herein. Referring to FIG. 21, the user can hover the mouse or pointer or tap selector over a portion of the timeline 2110 and that portion can be selected.

Figure 22:
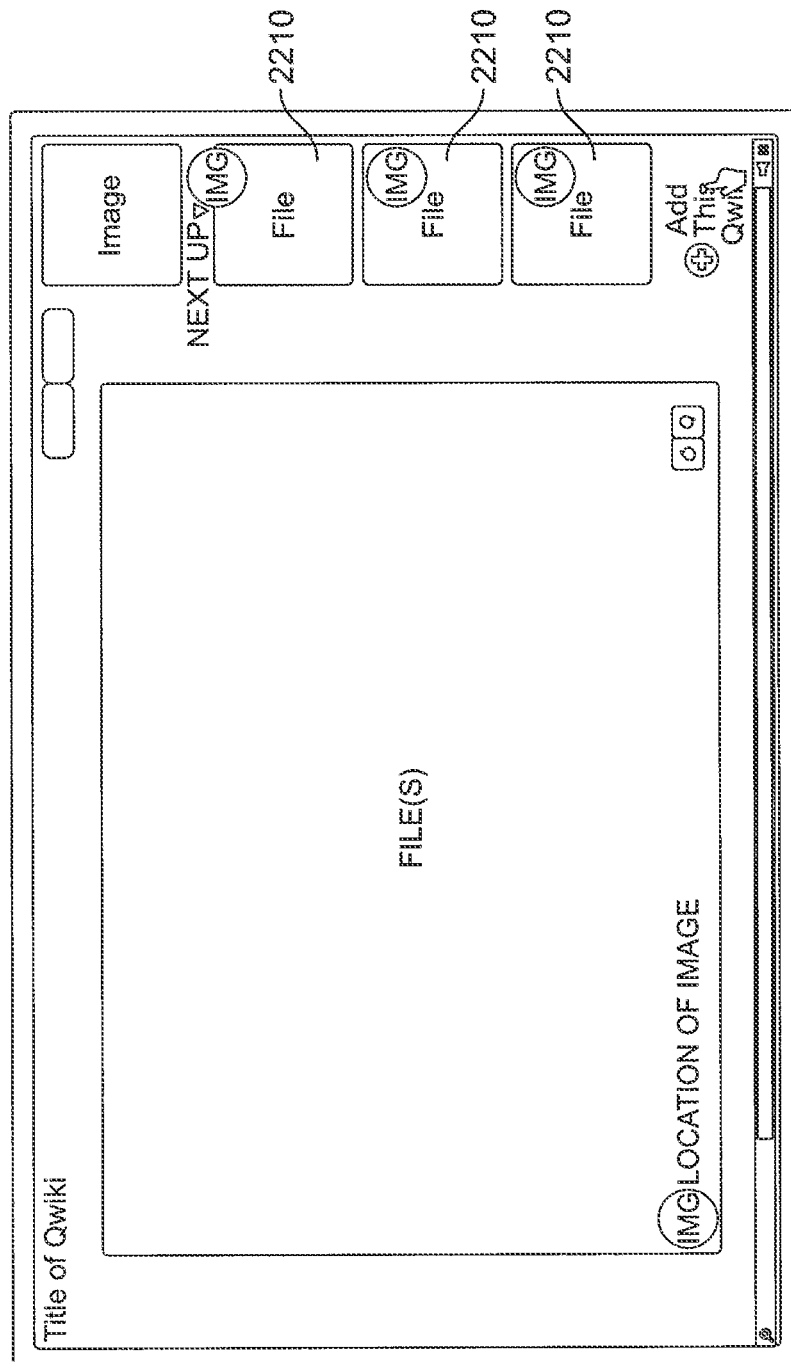
FIG. 22 is an illustration of a Mixed Media Module interface showing user ability to add new media to a timeline according to certain aspects related to the inventions herein.

FIG. 22 is an illustration of a Mixed-Media Module creator interface showing user ability to add new media, such as files 2210, which may include images, to a timeline according to certain aspects related to the inventions herein. The files 2210 are shown as icons on the right of the example screenshot screen. Window 2220 depicts a larger view of the current media file that is being viewed. Module 2230 allows a user to move to a next media element (e.g., those shown as 2210). Module 2240 allows a user to add new media content to the interface. The interface depicted in FIG. 22 is similar in function to the interface depicted in FIG. 21, but provides a larger viewer to allow better review of the media elements before they are arranged in a sequence and assembled into a chapter in a mixed-media module. In some embodiments, the larger view module 2220 also displays information that is related to the current media file that is being viewed. For example, 2250 indicates the location of an image, likely extracted from metadata associated with the particular image.

Figure 23:
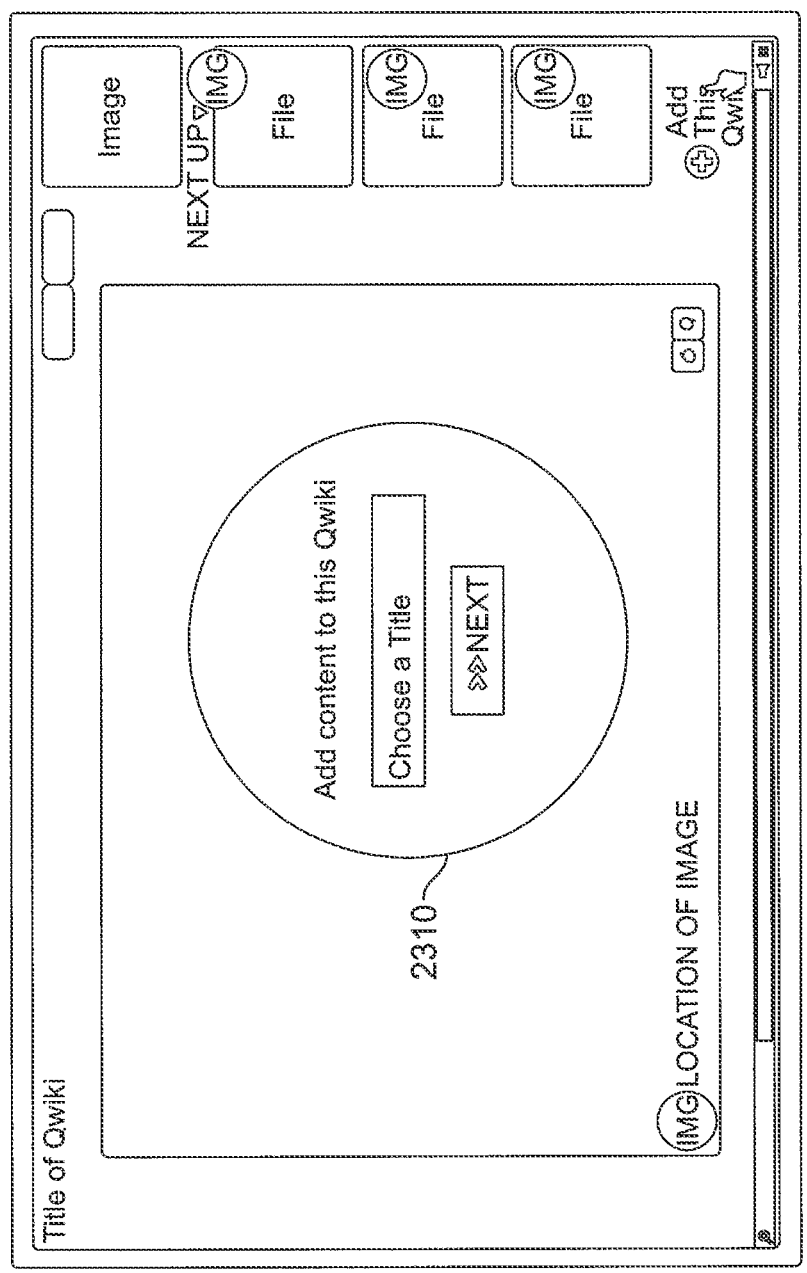
FIG. 23 is an illustration of a Mixed Media Module interface showing user ability to set title copying diagrams for a timeline according to certain aspects related to the inventions herein.

FIG. 23 is an illustration of a Mixed-Media Module creator interface showing user ability to set title copying diagrams for a timeline according to certain aspects related to the inventions herein. Referring to FIG. 23, the user in this example, can "Choose a Title" 2310 using the text box shown. This interface is a further expansion of the one depicted in FIG. 22. For example, in the current interface, a user can add a title to the current media element.

Figure 24:
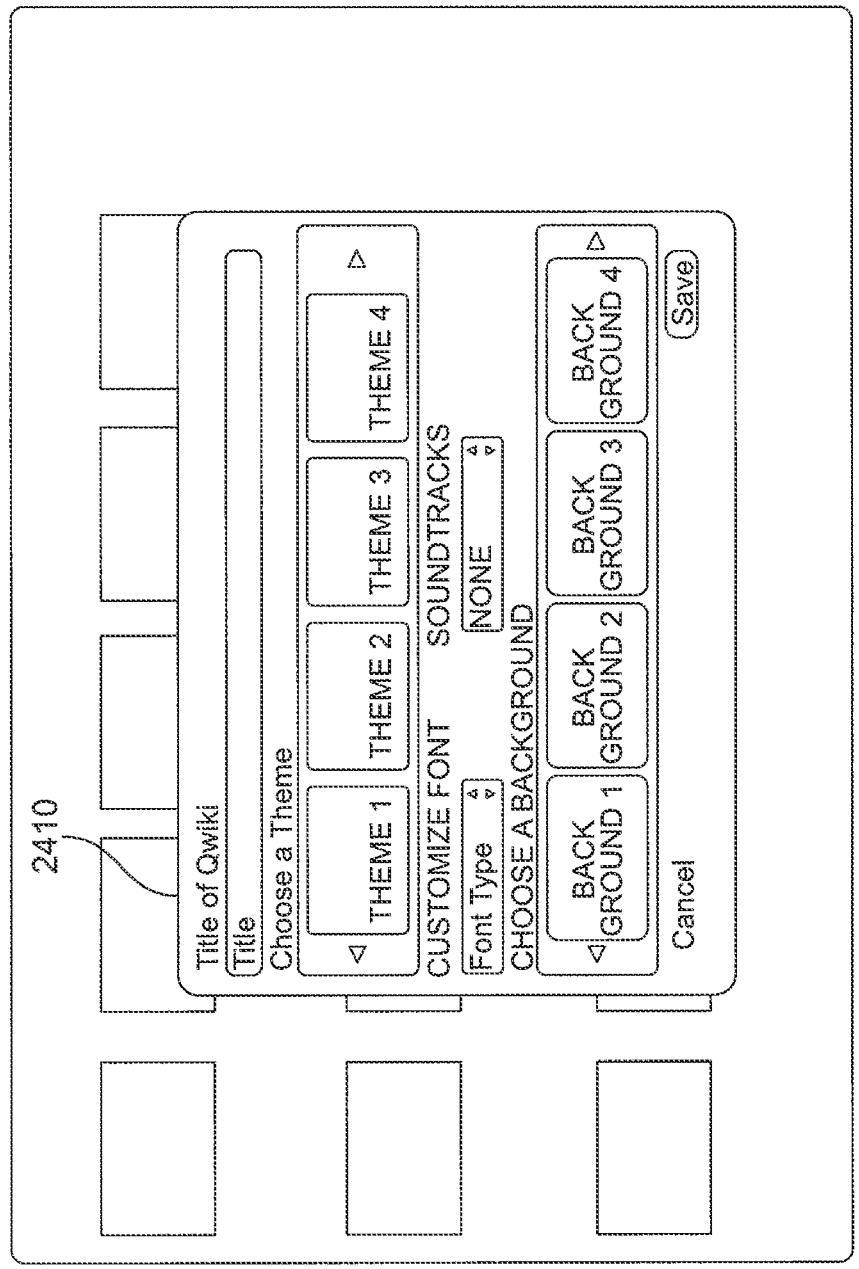
FIG. 24 is another illustration of a Mixed Media Module interface showing user ability to theme aspects such as theme, font, soundtrack and titles of a timeline according to certain aspects related to the inventions herein.
Figure 25:
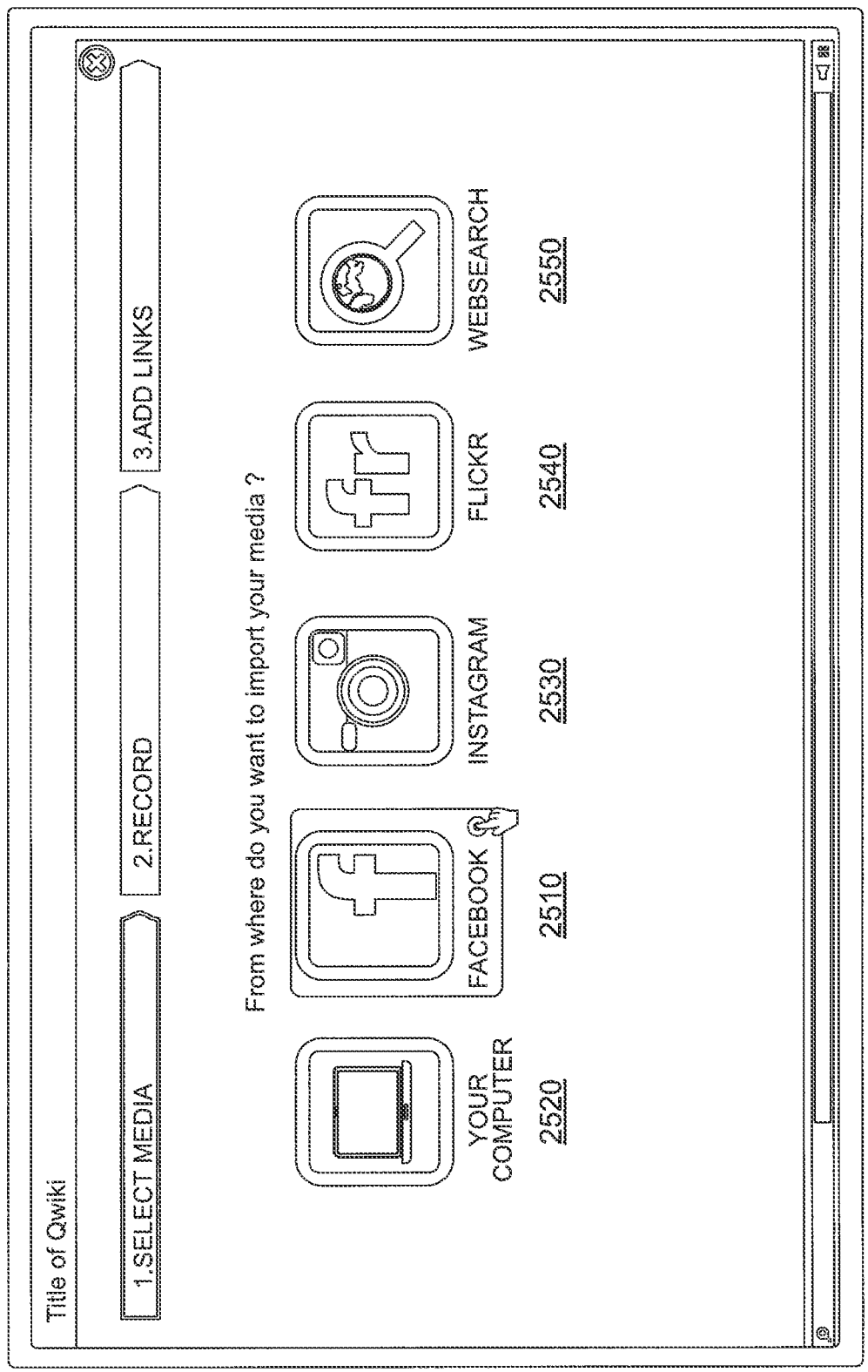
FIG. 25 is an illustration of a Mixed Media Module interface showing user ability to select location of media to import into the new media element according to certain aspects related to the inventions herein.

FIG. 24 is another illustration of a Mixed-Media Module creator interface showing user functionality to add theme aspects such as theme, font, soundtrack and titles of a timeline according to certain aspects related to the inventions herein. Referring to FIG. 24, these theme aspects can be selected for this project as needed. New interface 2410 is a further expansion of the one depicted in FIG. 23. For example, the interface can be accessed by pressing the "Next" button on 2310. The new interface 2410 allows a user to select a theme, customize the font, or select a background for the current media element. The user can choose to save or discard the selection or changes made. Referring now to FIG. 25 is an illustration of a Mixed-Media Module creator interface showing GUI functionality to select location of media to import into the new media element according to certain aspects related to the inventions herein. In this example, the user is selecting to load media files from a third party website, Facebook, 2510. The example shows that the user can select files from "your computer" 2520, or other third party webpages such as "Instagram" 2530, also "Flickr" 2540, and "Web Search" 2550. Any third party website could also be used for media file uploads also any kind of memory including detachable memory, cloud memory, or hard drive. The memory includes a direct download to one or more servers creating the mixed media module(s) so as to avoid accessing as well as downloading/saving to a local device and the associated bottlenecks and drawbacks thereof. The GUI/interface may be configured such that the user may select a source and browse media files from the selected source. In some implementations, the user may also select a source and perform a search of media files in the selected source. In one example, a user may search YouTube for a video. If the video is found and selected by the user, it may be stored in a database on a server associated with the Qwiki system without downloading and saving on any local device, so that viewing mixed-media content using the video will neither require communication with a YouTube server every time the content is to be viewed or downloading of the video file nor access communication with the local device. In some embodiments, selected media content is transmitted directly from a network-based storage source (e.g., a third party website or a cloud-based server) to a cloud-based Mixed-Media Module server for processing. In some embodiments, information concerning the selected media content is partially transmitted to a user device; e.g., a lower resolution icon or representation of the selected media content. User manipulation of the icon or representation is then transmitted back to the cloud-based server for further processing or storage. In some embodiments, the cloud-based server is host to numerous algorithms for collecting, extracting, storing, transmitting and processing any type of media elements. In some embodiments, the cloud-based server is equipped with the hardware and software capacities for collecting, extracting, storing, transmitting and processing any type of media elements.

Figure 26:
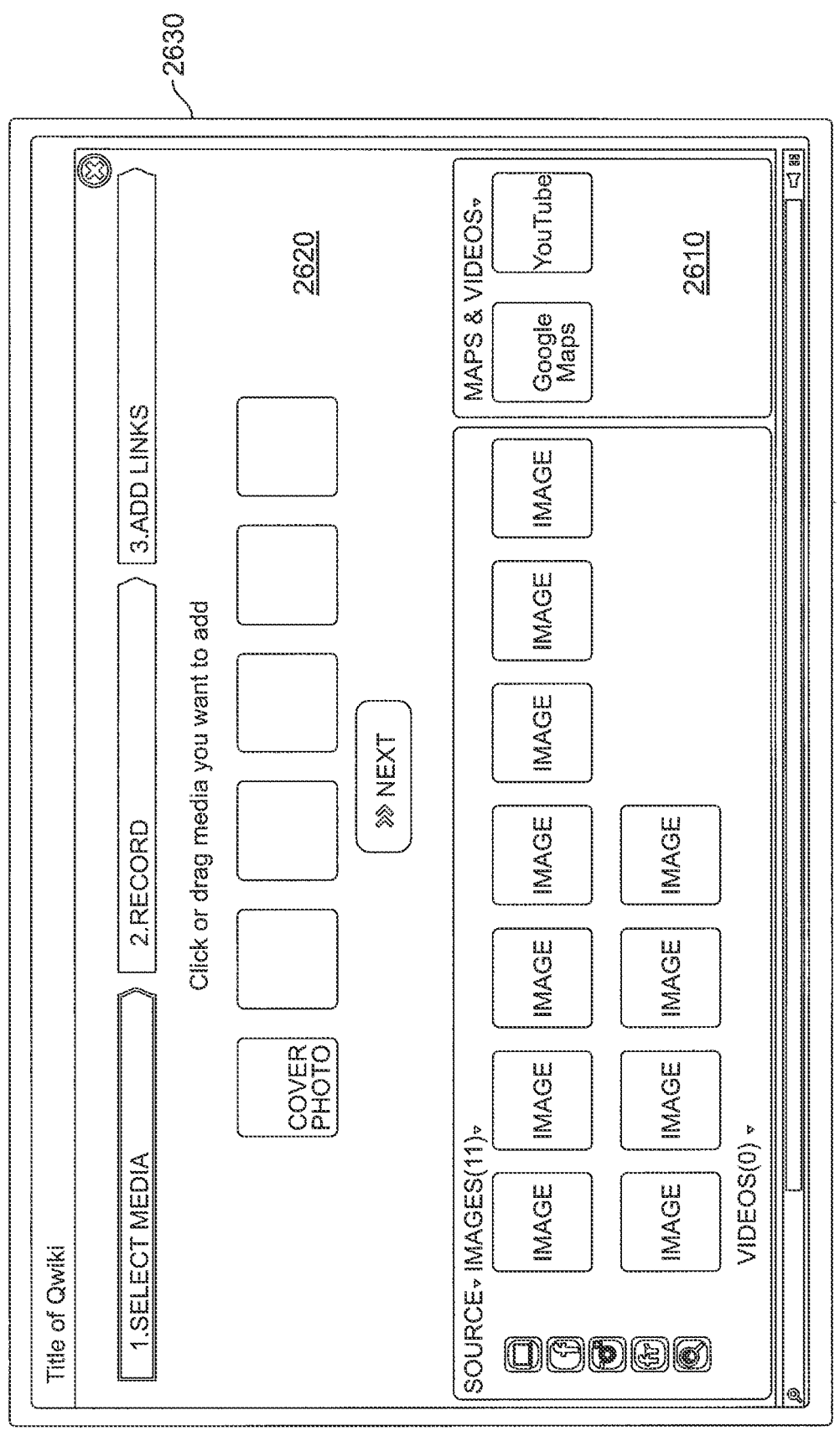
FIG. 26 is an illustration of a Mixed Media Module interface showing user ability to select media source from the source previously chosen according to certain aspects related to the inventions herein, showing user ability to select media to add by dragging and dropping mixed media elements into the timeline arranged in a sequence according to certain aspects related to the inventions herein.

FIG. 26 is an illustration of a Mixed-Media Module creator interface showing user ability to select media source from the source previously chosen according to certain aspects related to the inventions herein. Thus, the files from FIG. 25 can be analyzed on this screen. The interface of FIG. 26 offers a window (2610) for listing files available at a storage source (e.g., in a Facebook or Youtube account). The media files can be selected and moved (e.g., by dragging and dropping the desired file) into window 2620. Toolbar 2630 provides a plurality of functionality tabs. For example, media selection is achieved under the tab "Select Media." Further processing of the selected media elements can be achieved under the "Record" and/or "Add Links" tab. For example, one can record a narration for a selected media element. One can also add an executable link (e.g., a url) to a selected media element.

Figure 27:
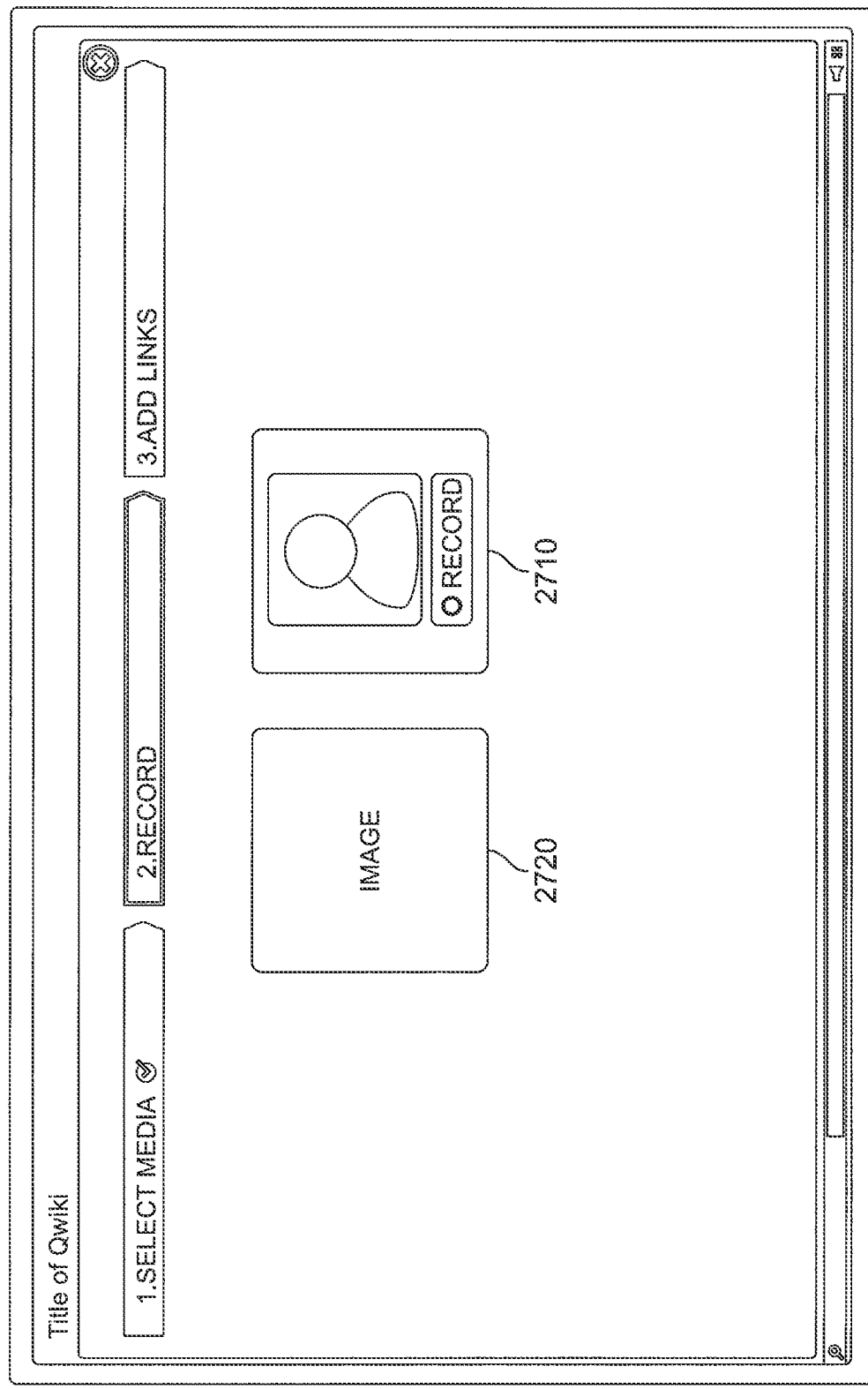
FIG. 27 is another illustration of a Mixed Media Module interface showing user ability to record narration for an element according to certain aspects related to the inventions herein.

FIG. 27 is another illustration of a Mixed-Media Module creator interface showing user ability to record narration for an element to insert according to certain aspects related to the inventions herein. In the exemplary functionality shown in FIG. 27, a "Record" icon is shown 2710 along with the Image 2720 upon which the narration recorded will be shown. In this way, users can coordinate what narration goes with which media files for playback. In some embodiments, a user can start the recording by pressing the Record icon. In some embodiments, a blinking light or pulse is provided to indicate the actual beginning of the recording so that the user can record at a particular time point.

Figure 28:
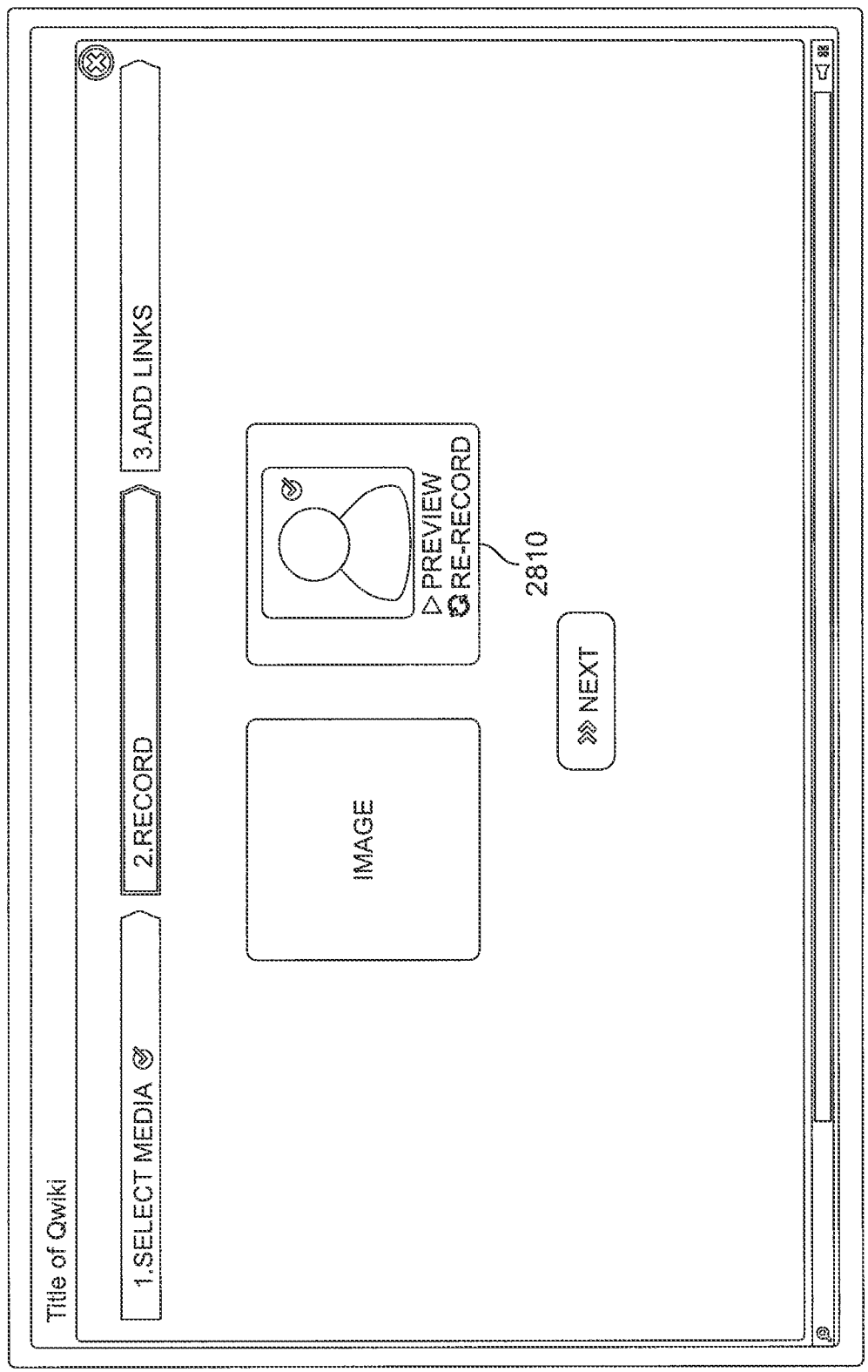
FIG. 28 is an illustration of a Mixed Media Module interface showing notification that media recording is complete and how a user can preview or re-record narration according to certain aspects related to the inventions herein.

FIG. 28 is an illustration of a Mixed-Media Module creator interface showing notification that media recording is complete and how a user can preview or re-record narration according to certain aspects related to the inventions herein. Here, the icon "Preview and Re-Record" 2810 allows users to edit the narration audio for the portion of the project. This editing is available to users here.

Figure 29:
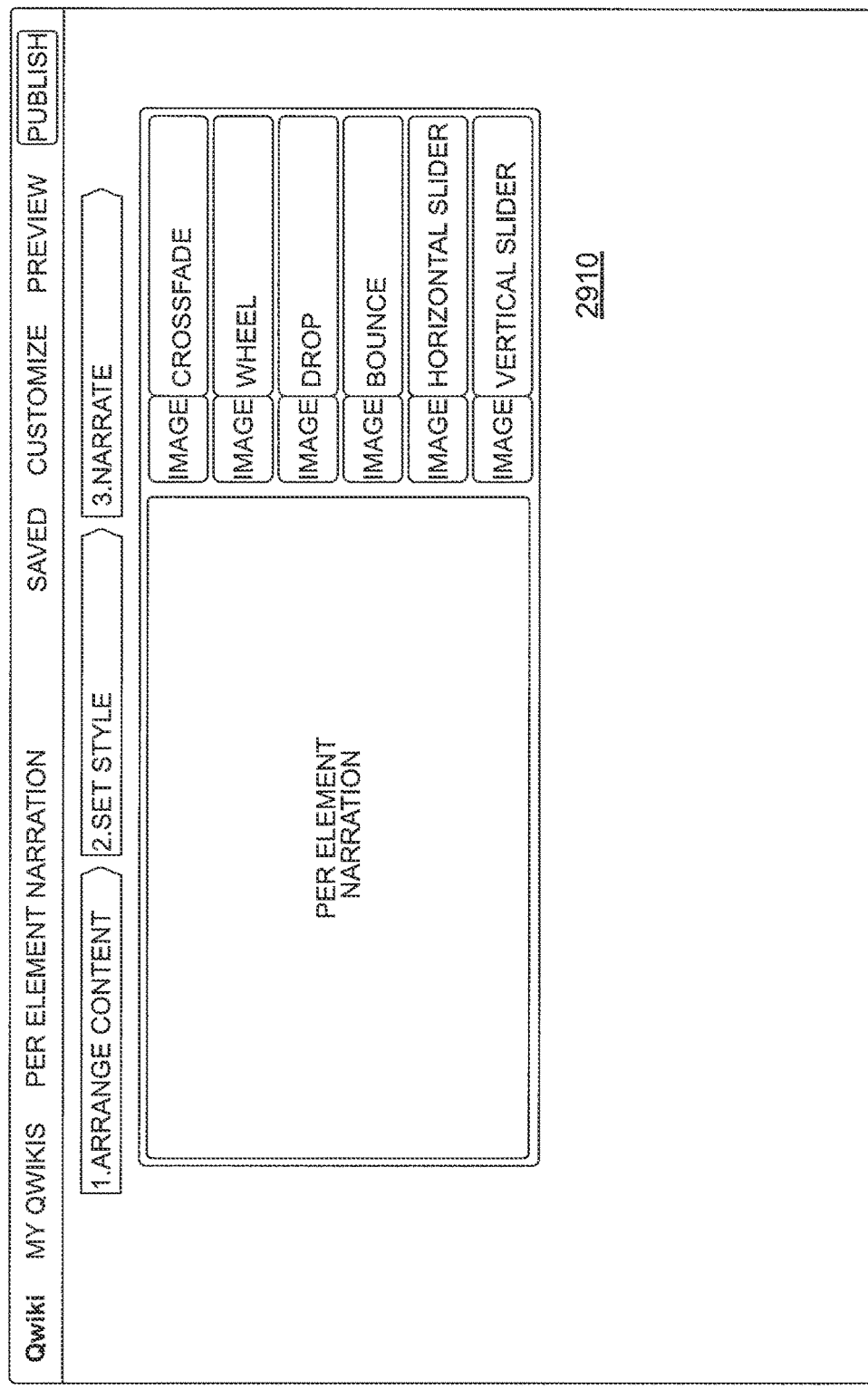
FIG. 29 is an illustration of a Mixed Media Module interface showing visualization style and chapter style selection to change the look and feel of a timeline according to certain aspects related to the inventions herein.

FIG. 29 is an illustration of a Mixed-Media Module creator interface showing visualization style and chapter style selection to change the look and feel of a timeline according to certain aspects related to the inventions herein. In this example, "crossfade," "wheel," "drop," "bounce," "horizontal slider," and "vertical slider, 2910 options are available to the user to select for visualization edits.

Figure 30:
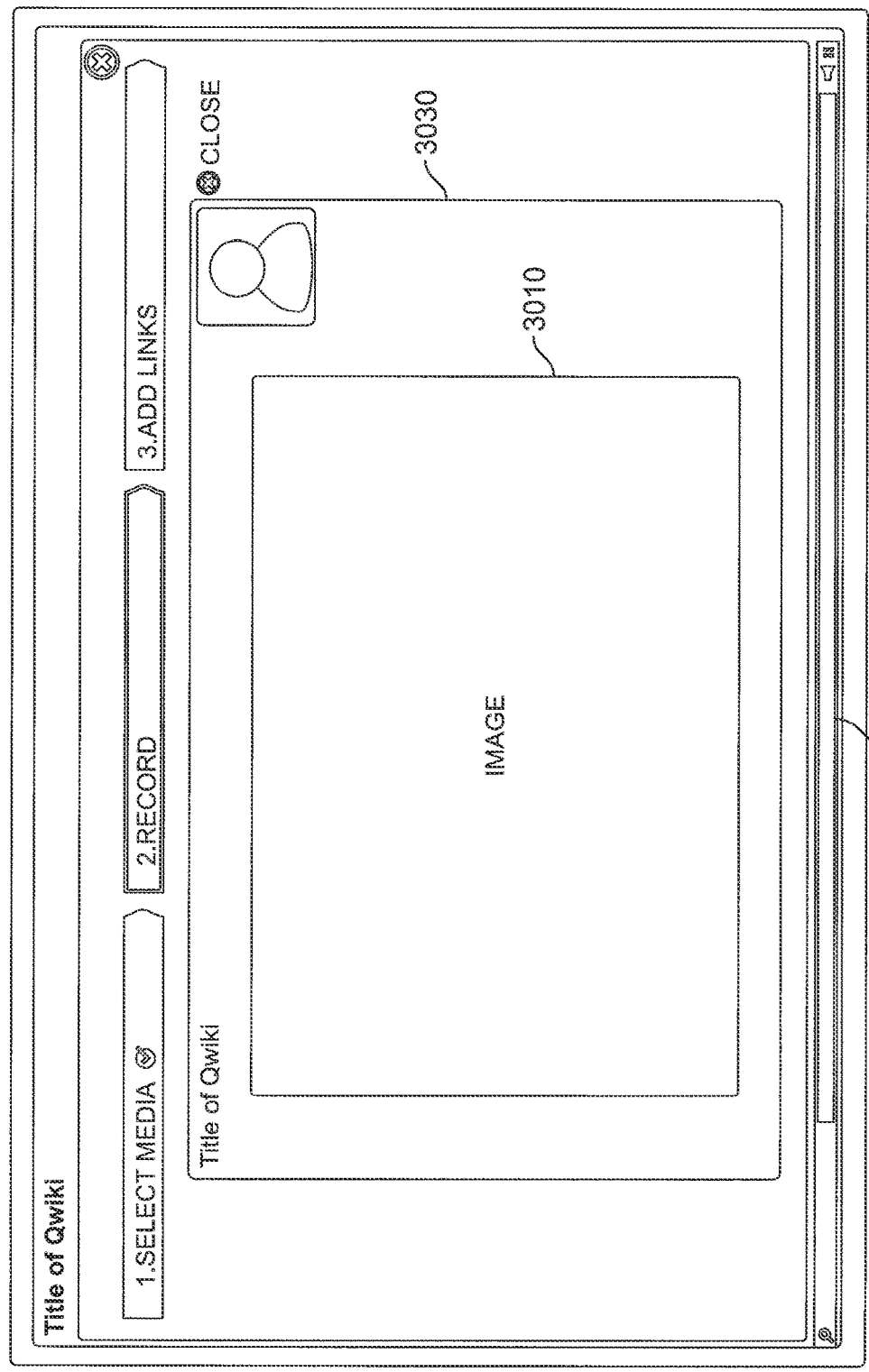
FIG. 30 is another illustration of a Mixed Media Module interface showing a preview according to certain aspects related to the inventions herein.

FIG. 30 is another illustration of a Mixed-Media Module creator interface showing a preview an audio narration according to certain aspects related to the inventions herein. In the preview interface, a large display window 3010 shows the image/video while a horizontal bar 3020 controls the preview progress. Because audio narration is coordinated in timing with selected media elements (e.g., synchronized), bar 3020 also controls the progress of the audio narration simultaneously. A small window 3030 depicts an icon or image that is associated with the audio narration; for example, a photo or avatar of a narrator or an image or cover art of a music album. In some embodiments, the icon or image on window 3030 changes as the audio narration progresses, for example, changing from one narrator to another narrator, or changing from a narrator or an image of an album cover art.

Figure 31:
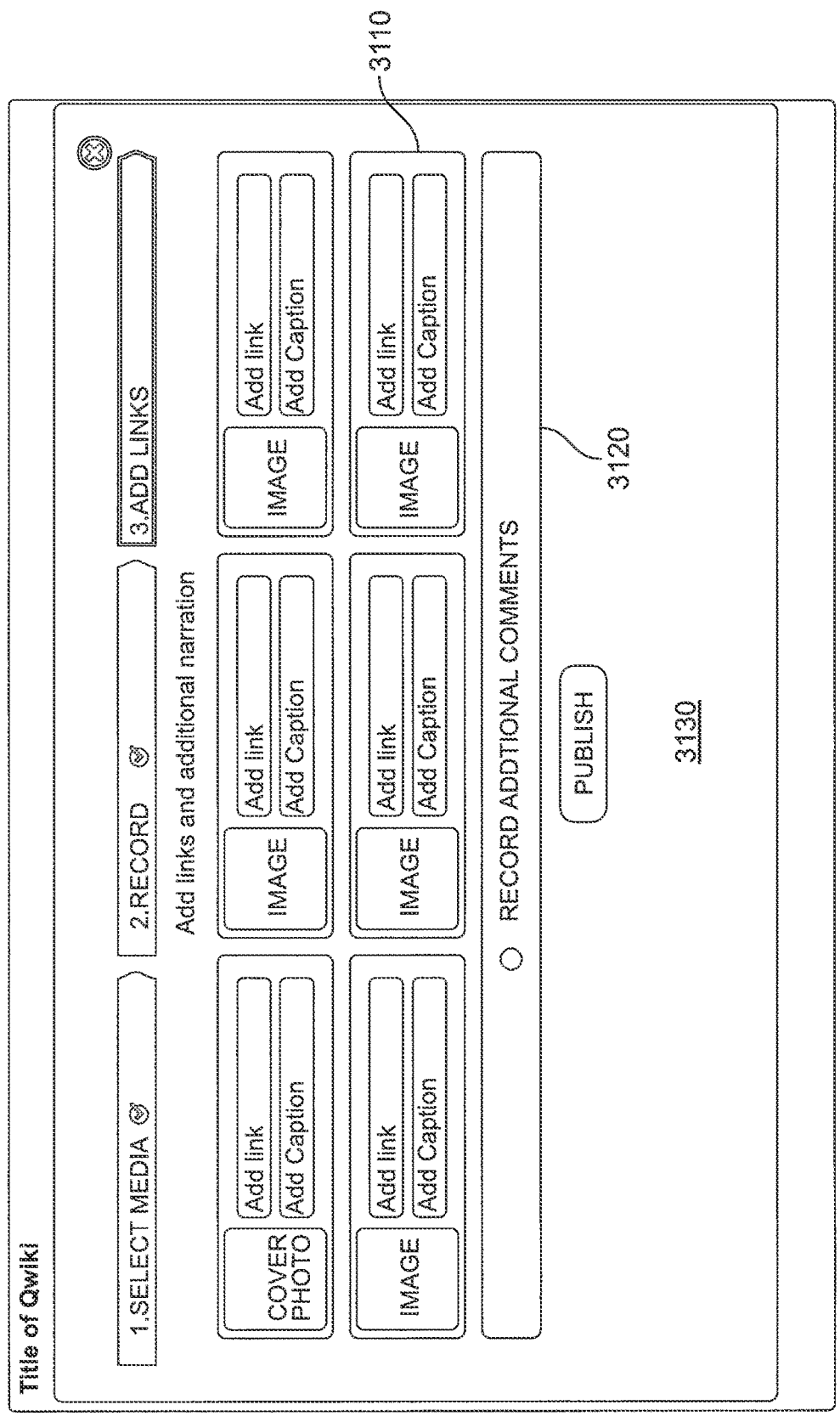
FIG. 31 is an illustration of a Mixed Media Module interface showing user ability to add links including meta data to media elements, including singer interactions, in certain aspects related to the inventions herein.

FIG. 31 is an illustration of a Mixed-Media Module creator interface showing user ability to add links including meta data to media elements, including singer interactions, in certain aspects related to the inventions herein. The "add a link" and "add caption" text boxes allow users to input information for the portions of the media module. New interface in FIG. 31 is a further expansion of the one depicted in FIG. 30. For example, the interface can be accessed by pressing the "Add Link" Tab at 3030. The interface 3110 allows a user to select and add links or description to a media element from an array of media elements. The user can record additional comment using 3120 and publish an assembled mixed-media module using 3130.

Figure 32:
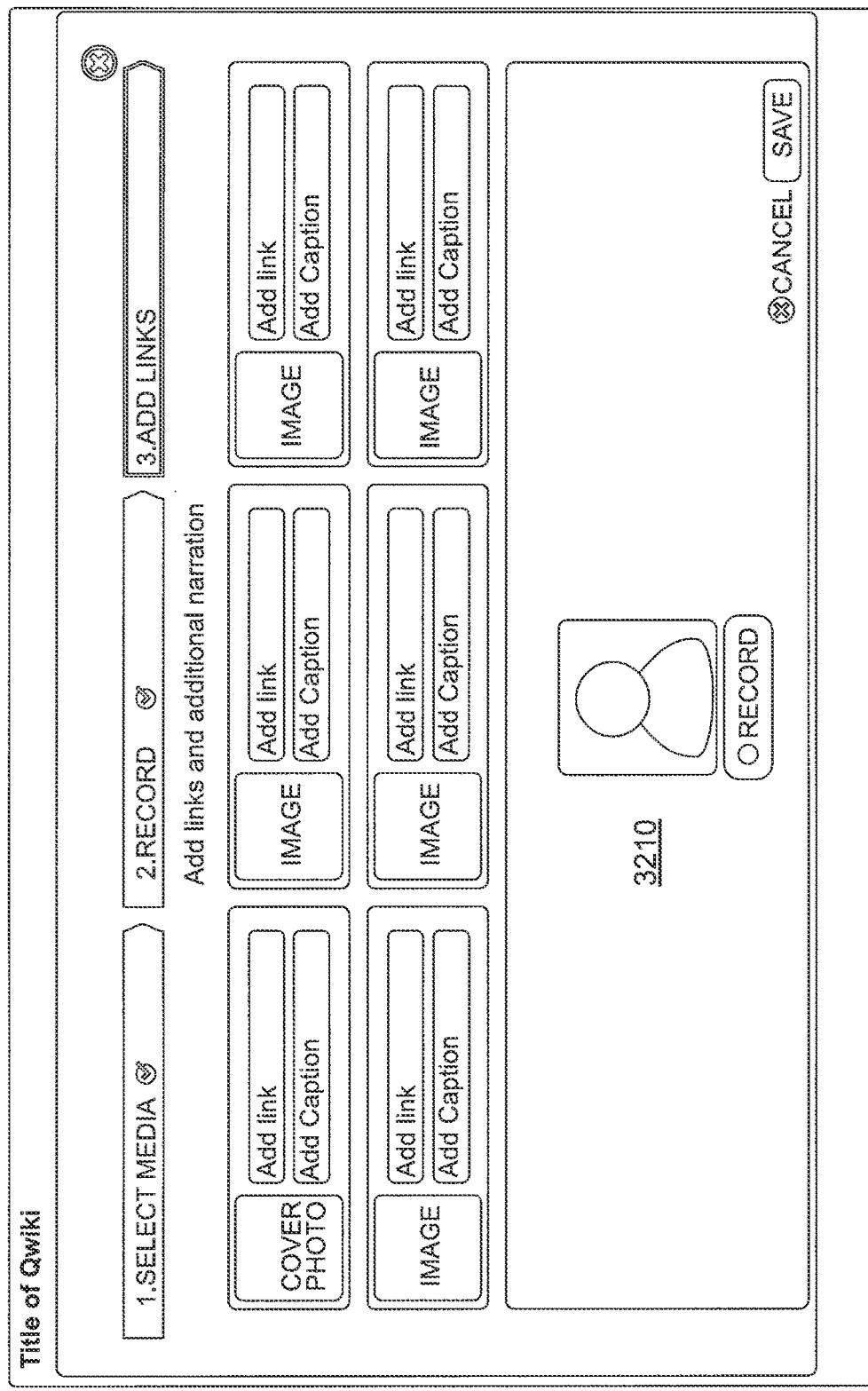
FIG. 32 is an illustration of a Mixed Media Module interface showing user ability to record additional narrative before publishing for media elements in certain aspects related to the inventions herein.

FIG. 32 is an illustration of a Mixed-Media Module creator interface showing user ability to record additional narrative before publishing for media elements in certain aspects related to the inventions herein. The "record" icon 3210 shows up here again, to allow more narration recording. New interface in FIG. 32 is a further expansion of the one depicted in FIG. 31. For example, if the "record additional comment" button 3120 is pressed, the record icon 3210 appears and allows a user to record additional comments. In some embodiments, a blinking light appears on the record icon allowing the user to time the recording. In some embodiments, a text message will appear to warn the user of the impeding recording process. In some embodiments, the user can initiate the recording process by pressing the "record" icon.

Figure 33:
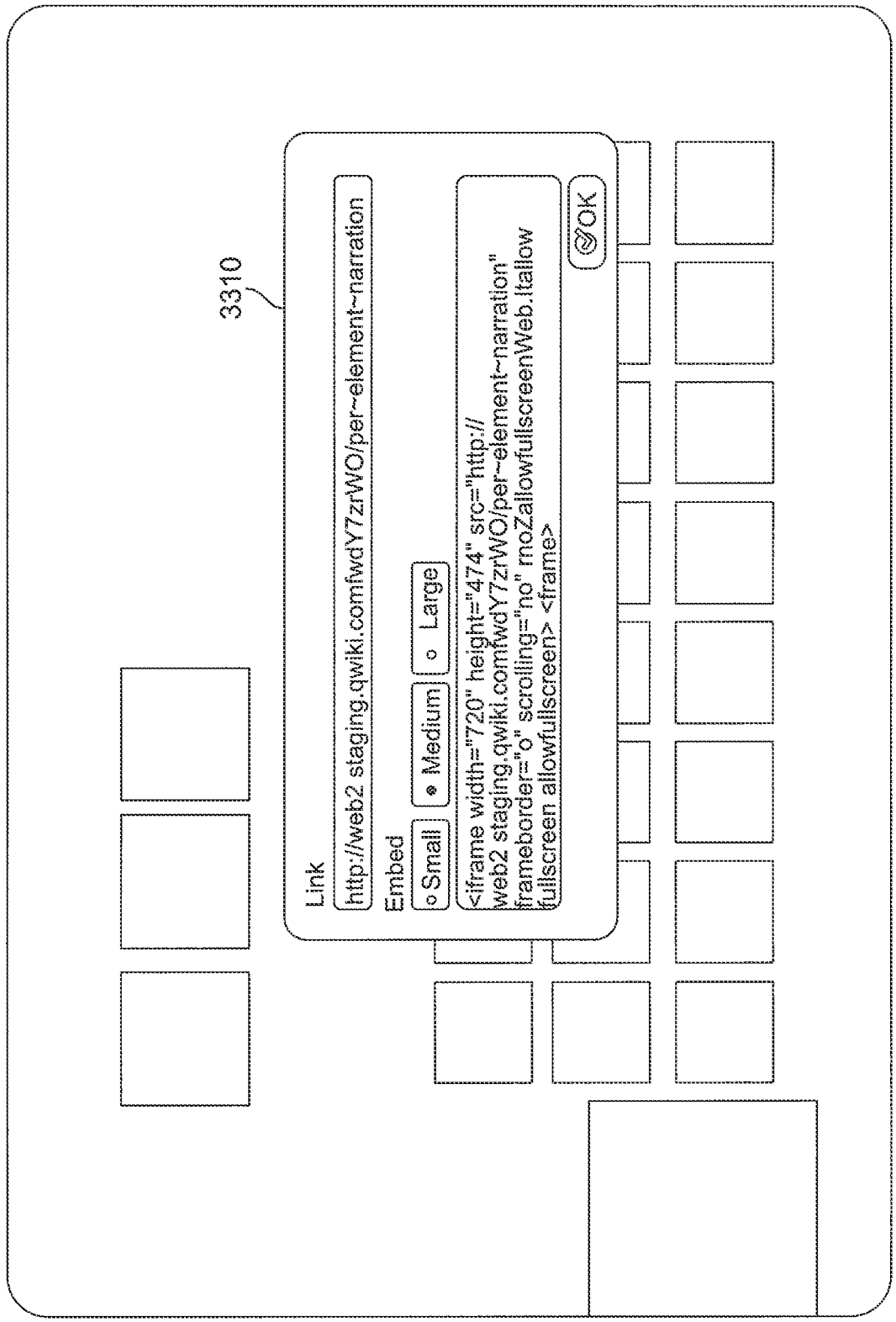
FIG. 33 is an illustration of a Mixed Media Module interface showing user ability to publish the media module including the ability to embed it on another site or service with unique code and URL according to certain aspects related to the inventions herein.

FIG. 33 is an illustration of a Mixed-Media Module creator interface showing user ability to publish the media module including the ability to embed it on another site or service with unique code and URL according to certain aspects related to the inventions herein. In this example screenshot, users can enter a link in the "link" text box and also the "embed" text box in order to link and embed the module into other web pages or files. The interactive playable mixed-media module is published by generating a link to the interactive playable mixed-media module and may be published in a plurality of sizes or embedded in one of a plurality of selectable sizes, as illustrated in 3310 in FIG. 33. The interactive playable mixed-media module may be published by embedding the interactive playable mixed-media module on another site. The interactive playable mixed-media module is published by generating embed code.

Figure 34:
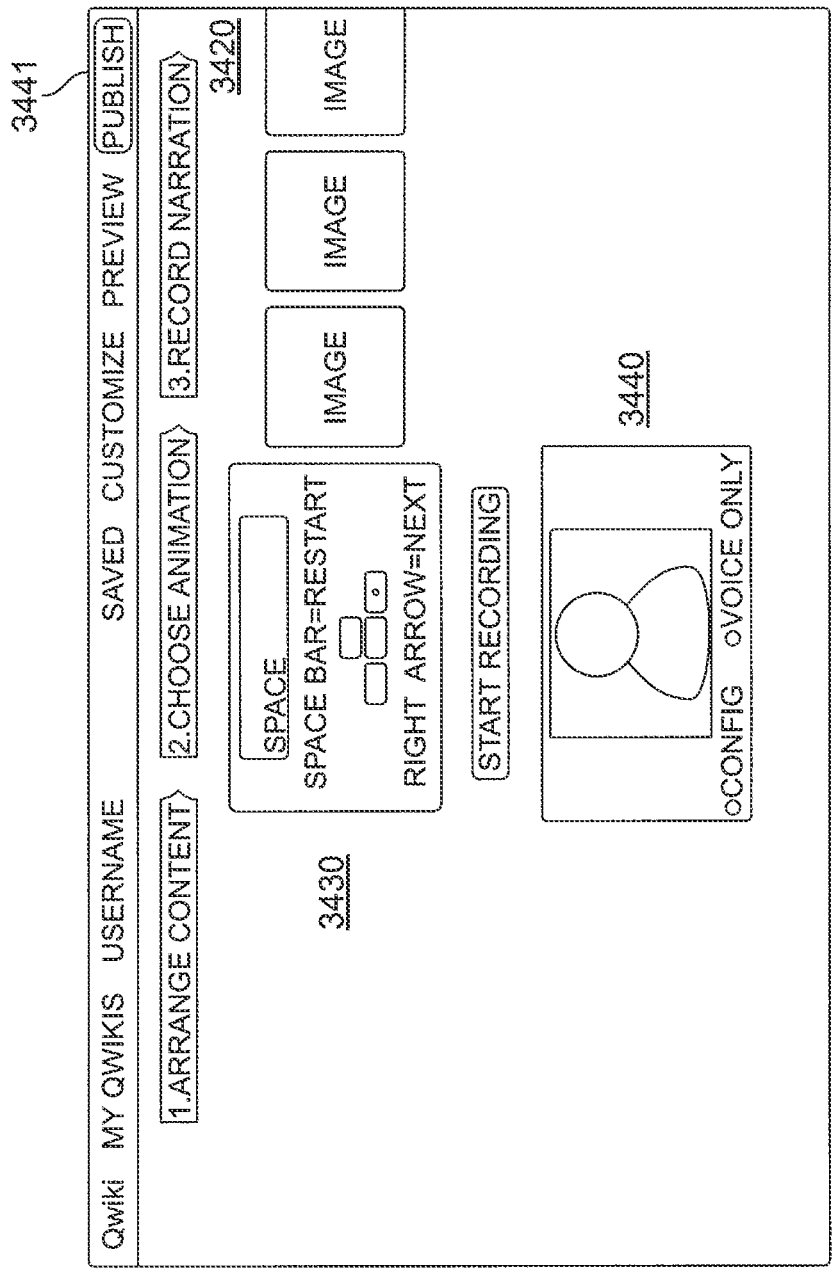
FIG. 34 is an illustration of a Mixed Media Module interface showing user ability to record audio over media elements according to certain aspects related to the inventions herein.

FIG. 34 is an illustration of a Mixed-Media Module creator interface showing user ability to record audio over media elements according to certain aspects related to the inventions herein. The interface further illustrates a process for organizing and creating a mixed-media module. Numerous functionalities can be accessed via the toolbar menu 3410; e.g., a user can elect to customize, preview, publish or save a working mixed-media module file. Within a given functionality, a sub-menu 3420 provides more options; for example, a user can arrange media content, choose animation schemes, or record narration. A sub-window 3430 (e.g., a current media element window) allows a user to easily browse through media elements during processing; for example, the sub-window has buttons that allow a user to go forward to the next media element or return to a prior media element. In some embodiments, keys on an actual keyboard or virtual keyboard (e.g., a digital keyboard displayed on a mobile device) can be used to allow a user to easily browse through media elements; for example, the up, down, left, right arrow keys and the space bar can be utilized. In some embodiments, motions on a touch screen can be used to achieve the same effects; for example, a swipe motion to the left allows a user to move to the next media element while a swipe motion to the right allows a user to return to a previous media element. A record icon 3440 is also provided to permit addition of an audio narration.

Figure 35:
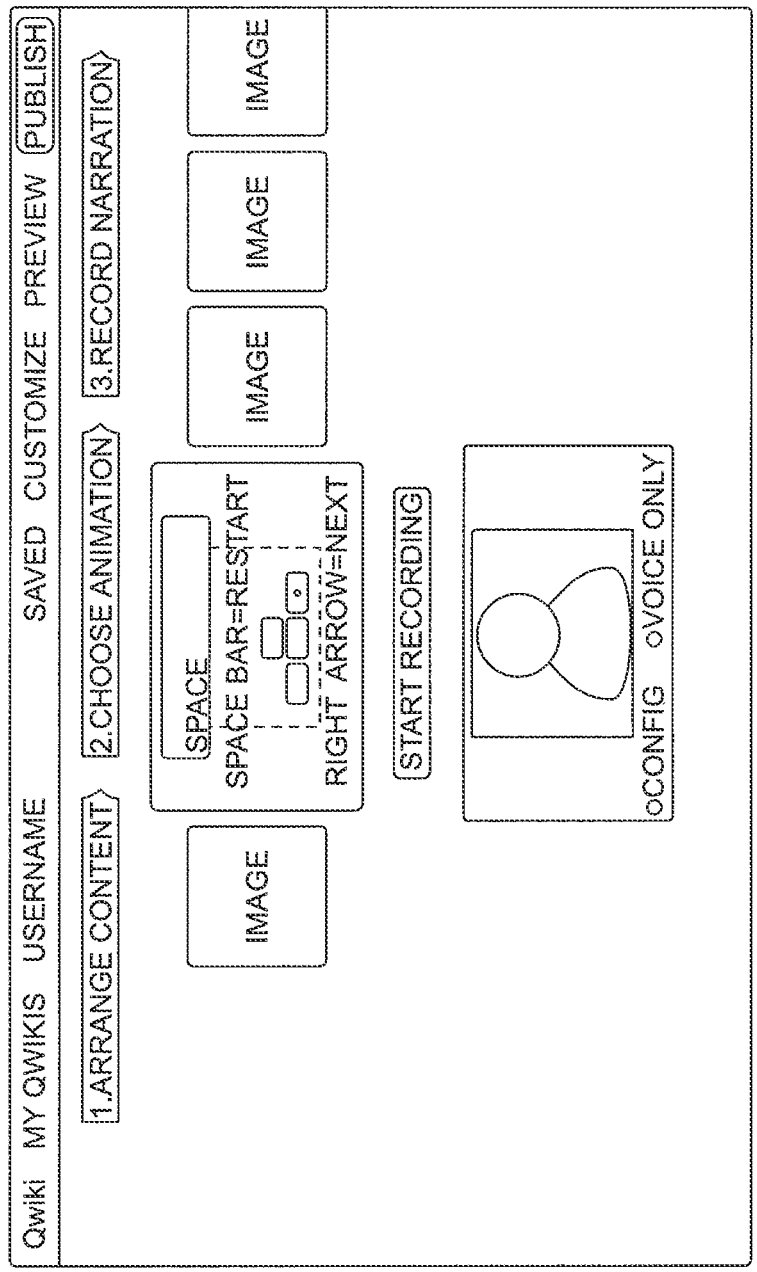
FIG. 35 is an illustration of a Mixed Media Module interface and a sub-interface showing user ability to narrate individual elements in sequence according to certain aspects related to the inventions herein.

FIG. 35 is an illustration of a Mixed-Media Module creator interface showing user ability to narrate individual elements in sequence according to certain aspects related to the inventions herein. FIG. 35 illustrates a process related to the one depicted in FIG. 34, in which the current media element window is no longer at the first media file in the sequence.

Figure 36:
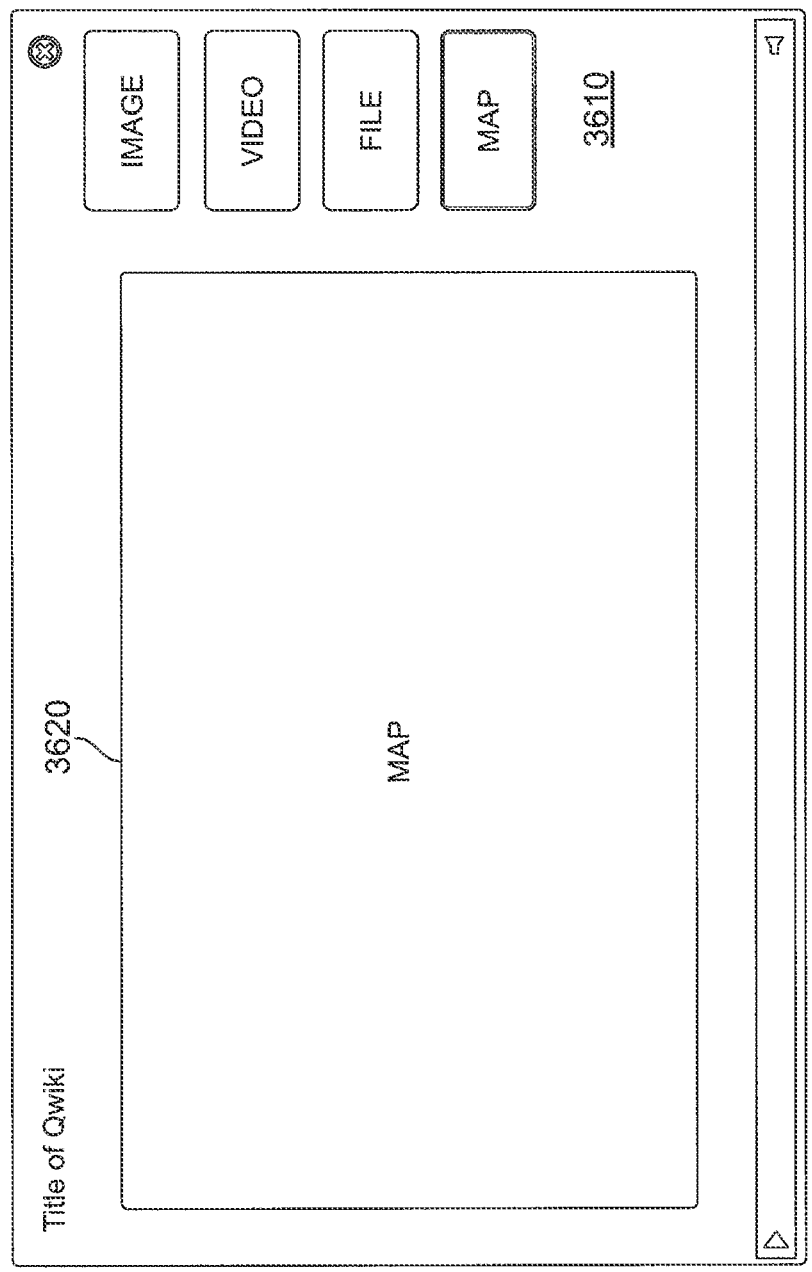
FIG. 36 is an illustration of a Mixed Media Module interface showing user ability to interact with the mixed media including images, video, modules, and maps according to certain aspects related to the inventions herein.

FIG. 36 is an illustration of a Mixed-Media Module creator interface showing user ability to interact with the mixed-media including images, video, modules, and maps according to certain aspects related to the inventions herein. For example, a map provides depth and allows a user to interactively explore the mixed-media module in a non-linear manner. When prompted (e.g., FIG. 37B), a user can view and move the map to look for the needed information.

FIG. 37A illustrates a Mixed-Media Module creator interface showing user ability to preview a mixed-media module. In the preview interface, a large display window 3710 shows the image/video while a horizontal bar 3720 controls the preview progress. Because audio narration is coordinated in timing with selected media elements (e.g., synchronized), bar 3720 also controls the progress of the audio narration simultaneously. A small window 3730 depicts an icon or image that is associated with the audio narration; for example, a photo or avatar of a narrator or an image or cover art of a music album. In some embodiments, the icon or image on window 3730 changes as the audio narration progresses, for example, changing from one narrator to another narrator, or changing from a narrator or an image of an album cover art.

Figure 37B:
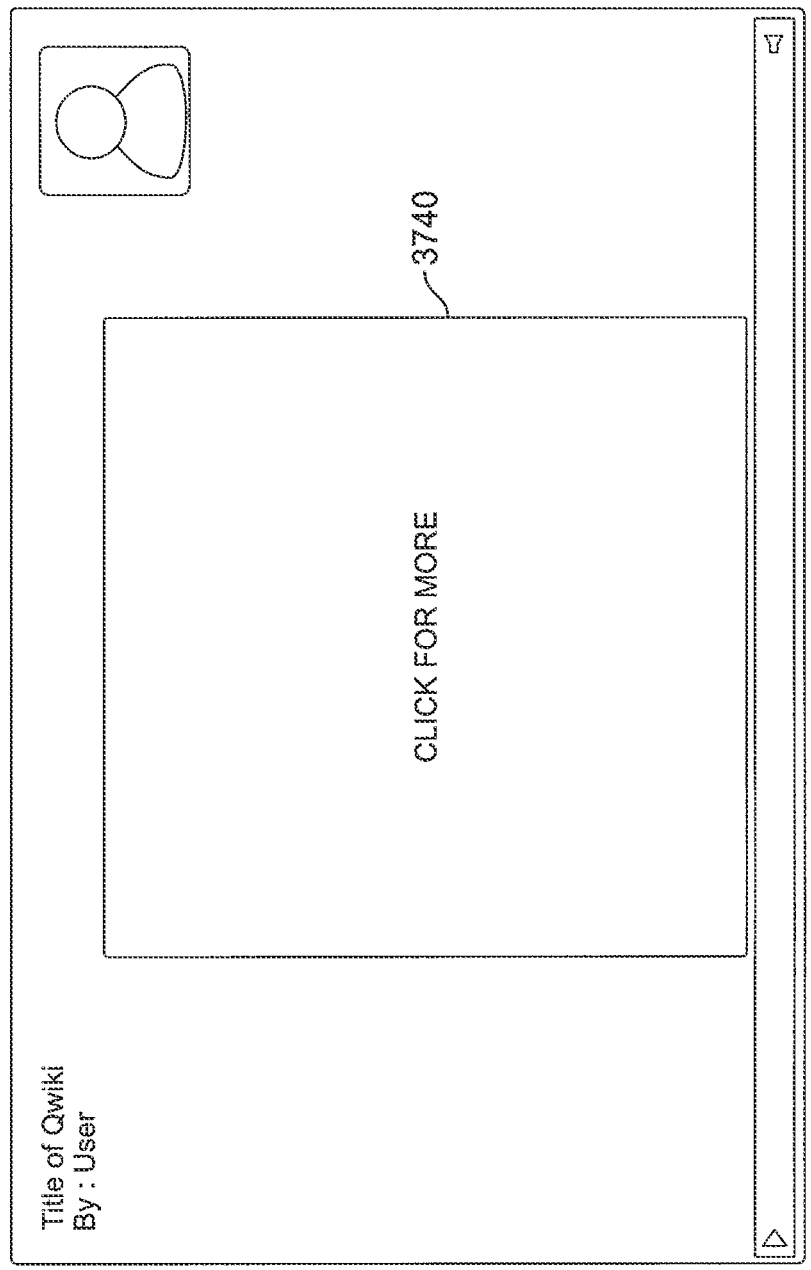
FIG. 37B is another illustration of a Mixed Media Module interface showing user ability to listen to narration of a mixed-media module according to certain aspects related to the inventions herein.

FIG. 37B illustrates a Mixed-Media Module creator interface showing user ability to navigate a mixed-media module in a non-linear manner. For example, a visual indicator 3740 (e.g., a prompted message such as "click for more") indicates to a user that a particular media element has embedded information; for example, the media element is an interactive map.

Figure 38A:
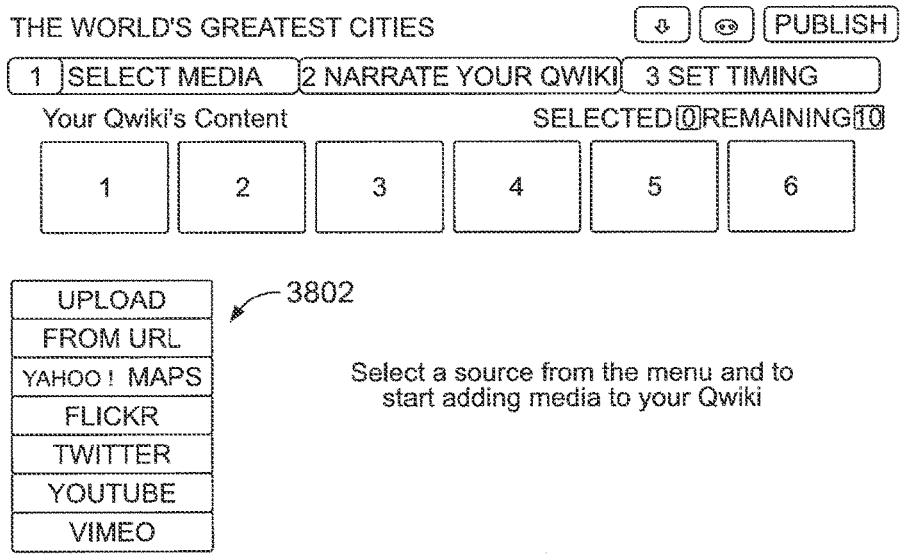
FIGS. 38A-38Z are illustrations of various Mixed-Media Module creator interfaces showing features and functionality, such as user addition of content, narration and timing to a mixed-media module according to certain aspects related to the inventions herein
Figure 38B:
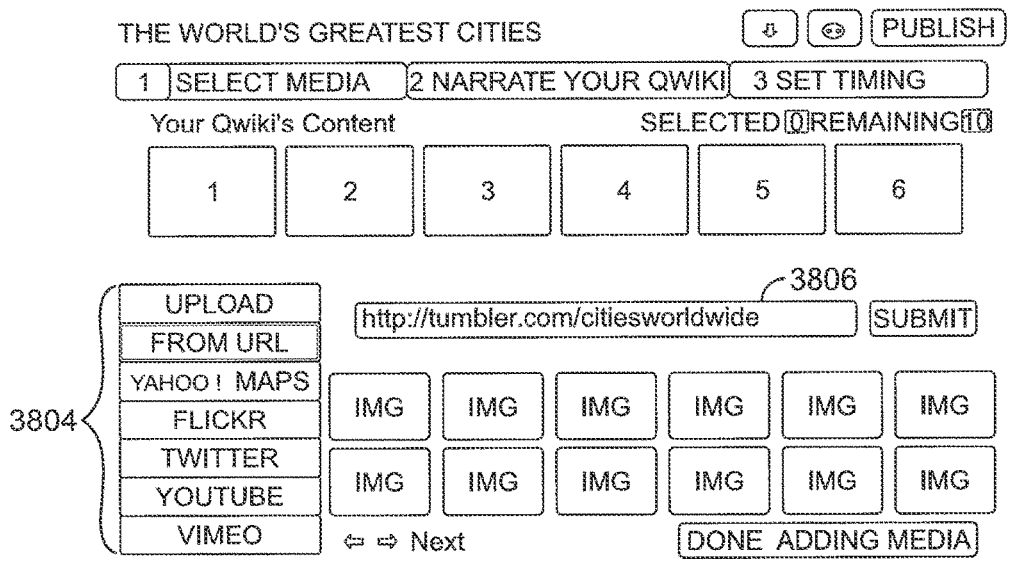
Figure 38C:
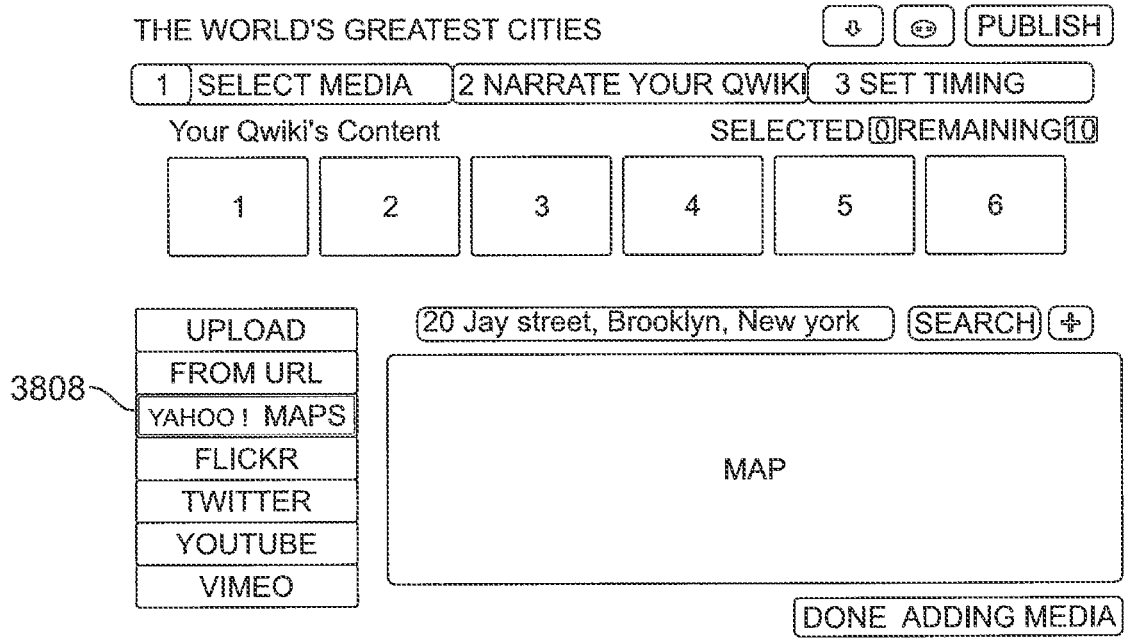
Figure 38D:
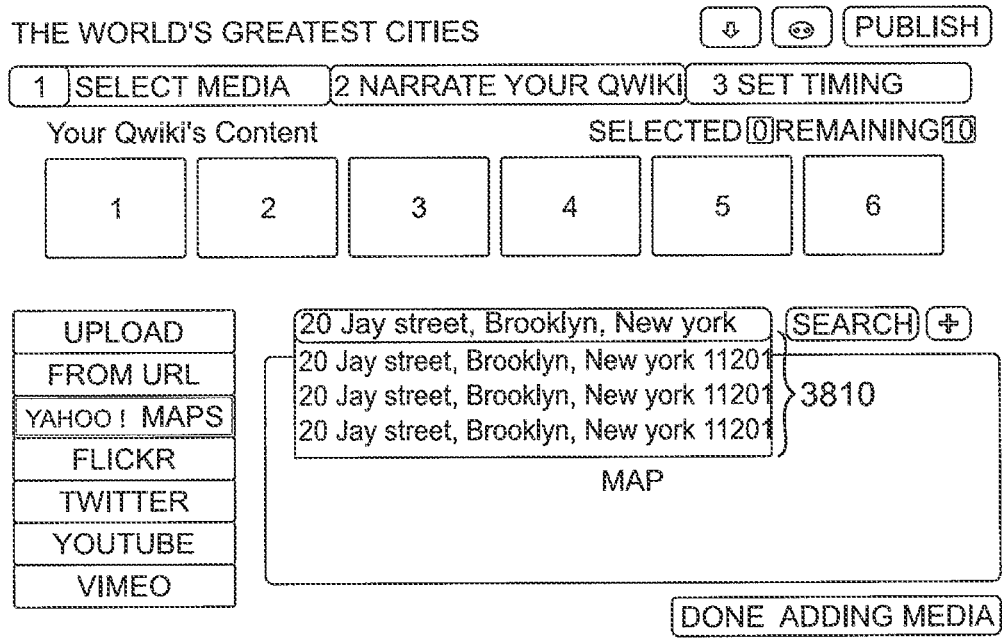
Figure 38E:
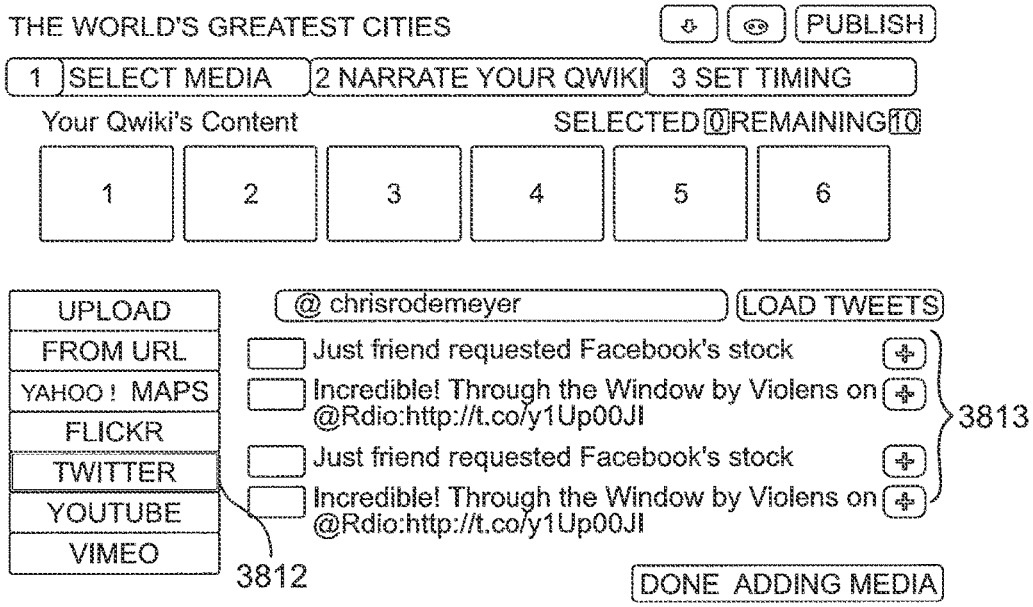
Figure 38F:
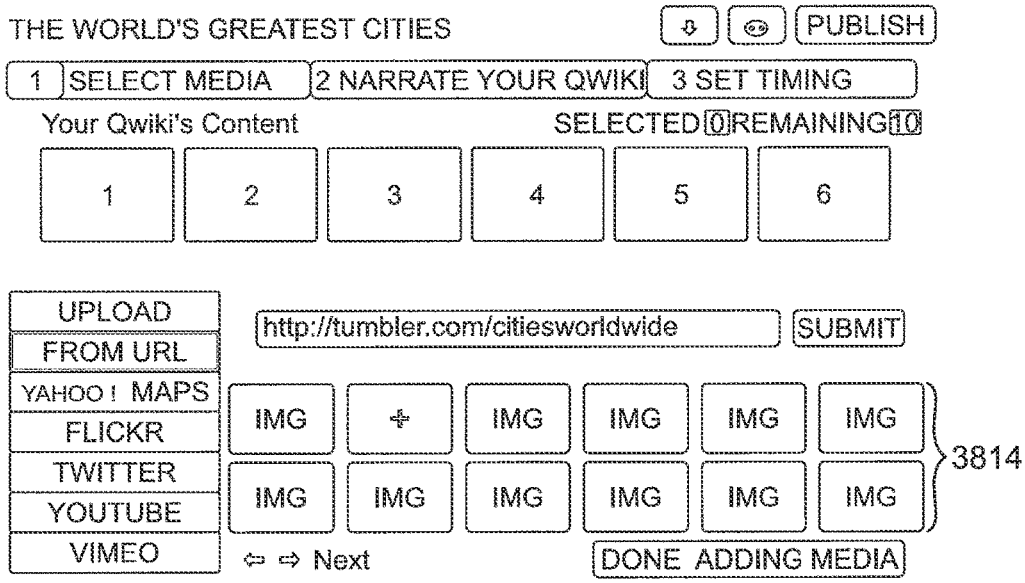
Figure 38I:
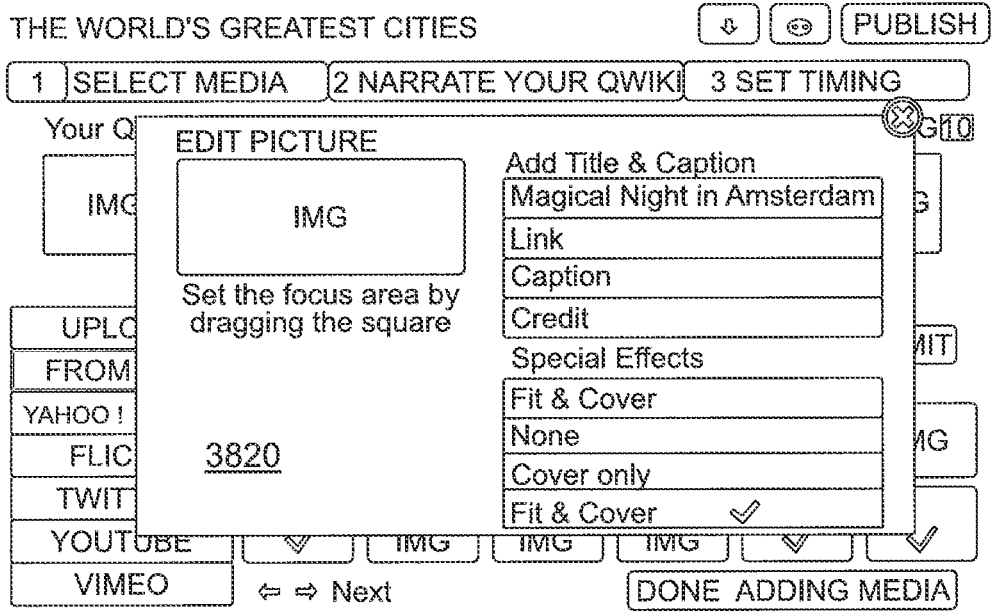
Figure 38J:
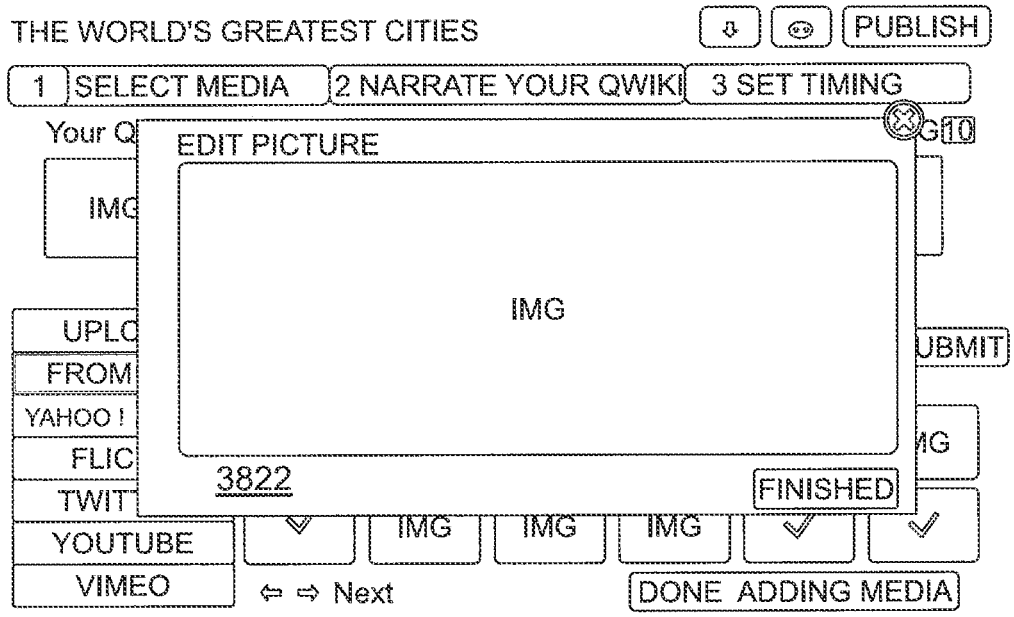
Figure 38K:
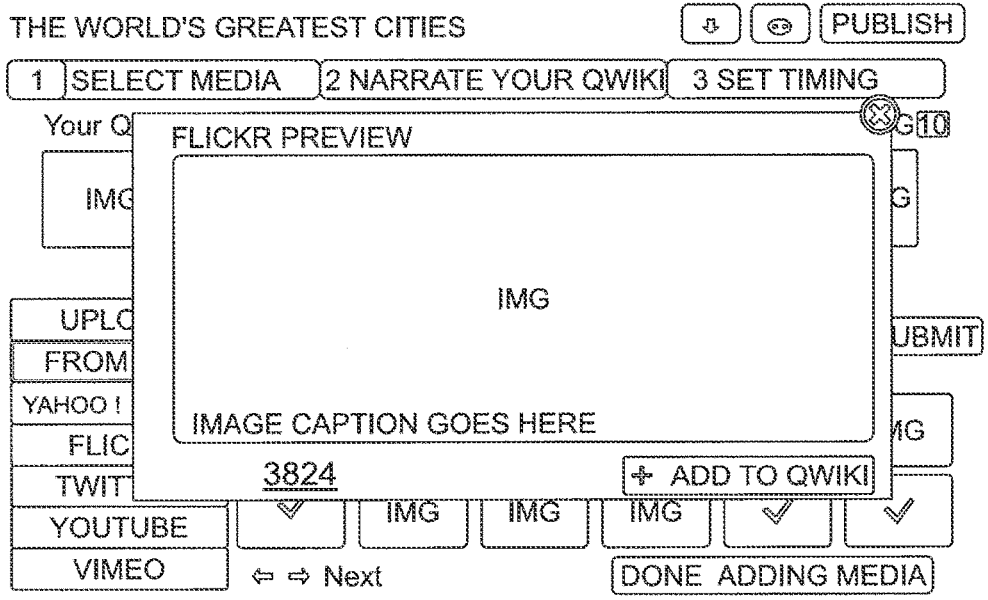
Figure 38L:
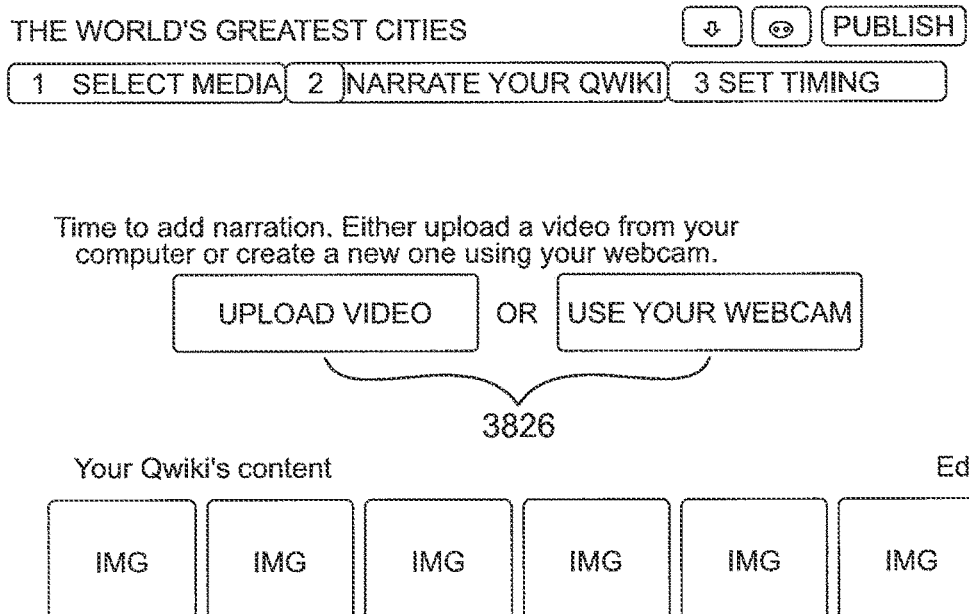
Figure 38M:
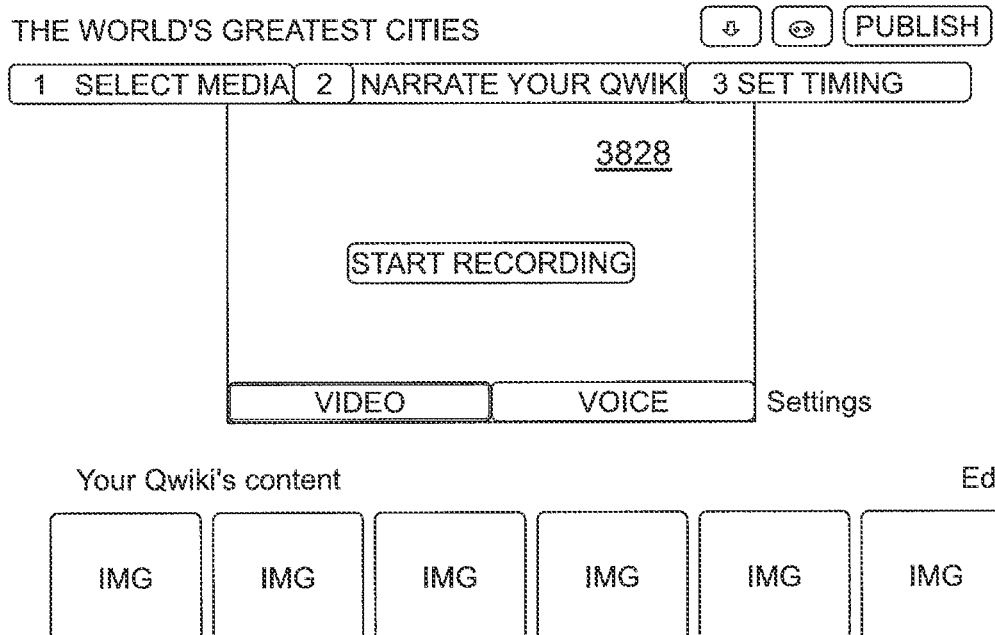
Figure 38N:
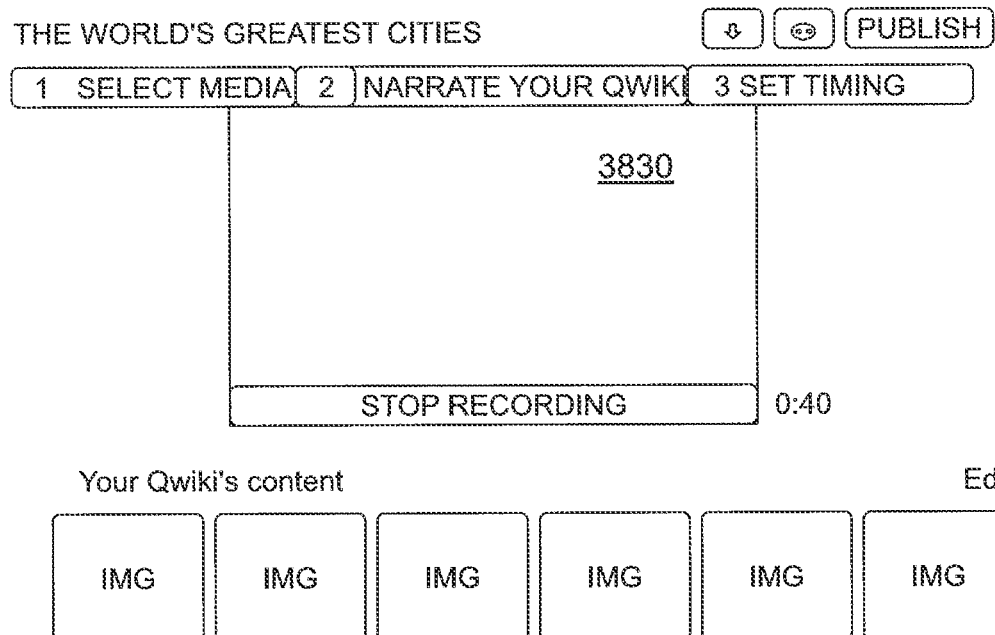
Figure 38O:
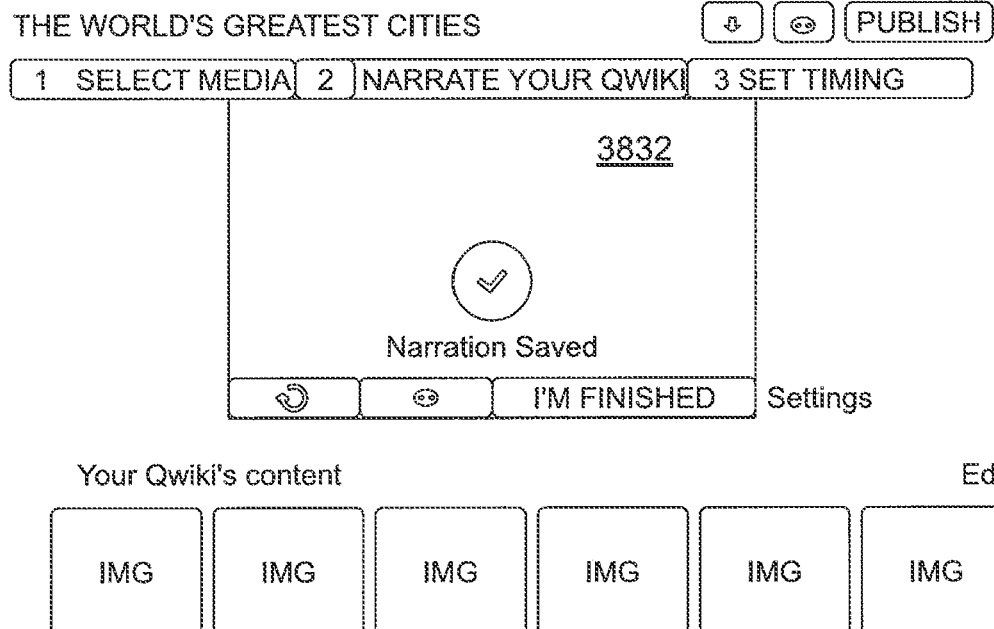
Figure 38P:
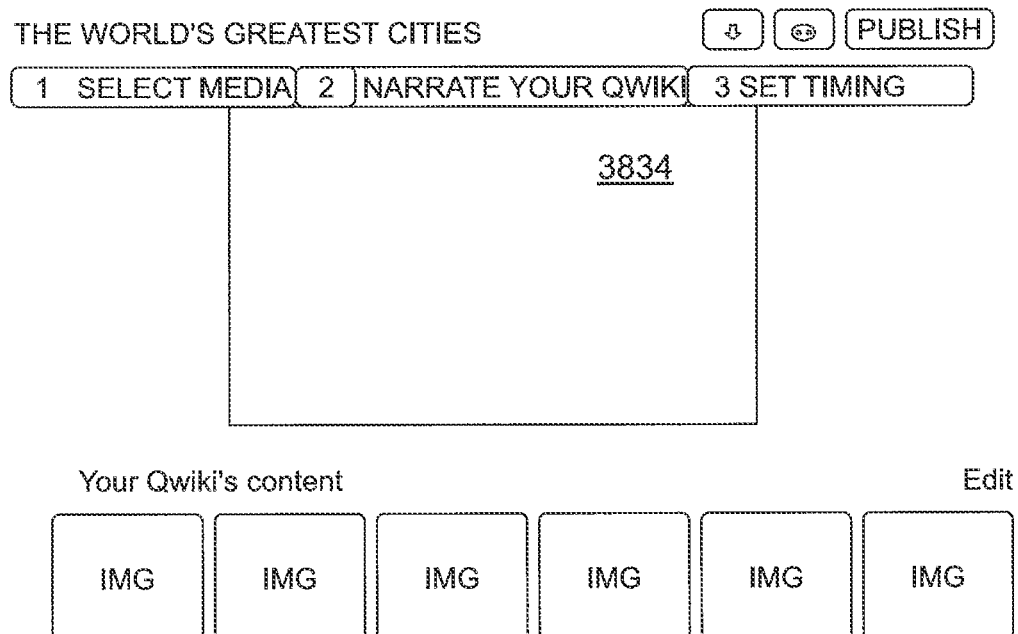
Figure 38S:
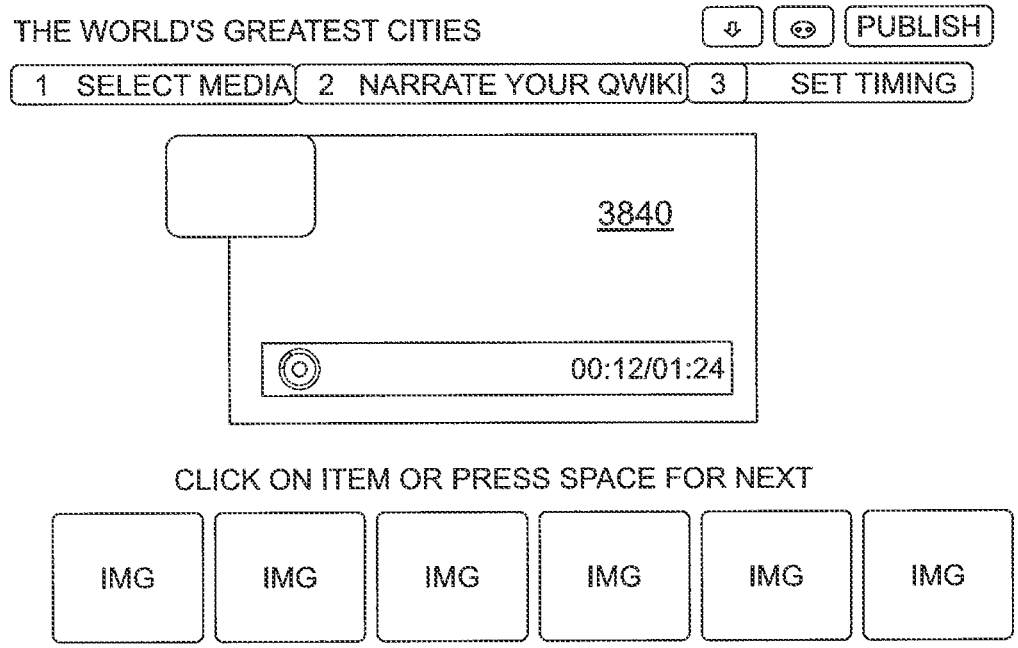
Figure 38T:
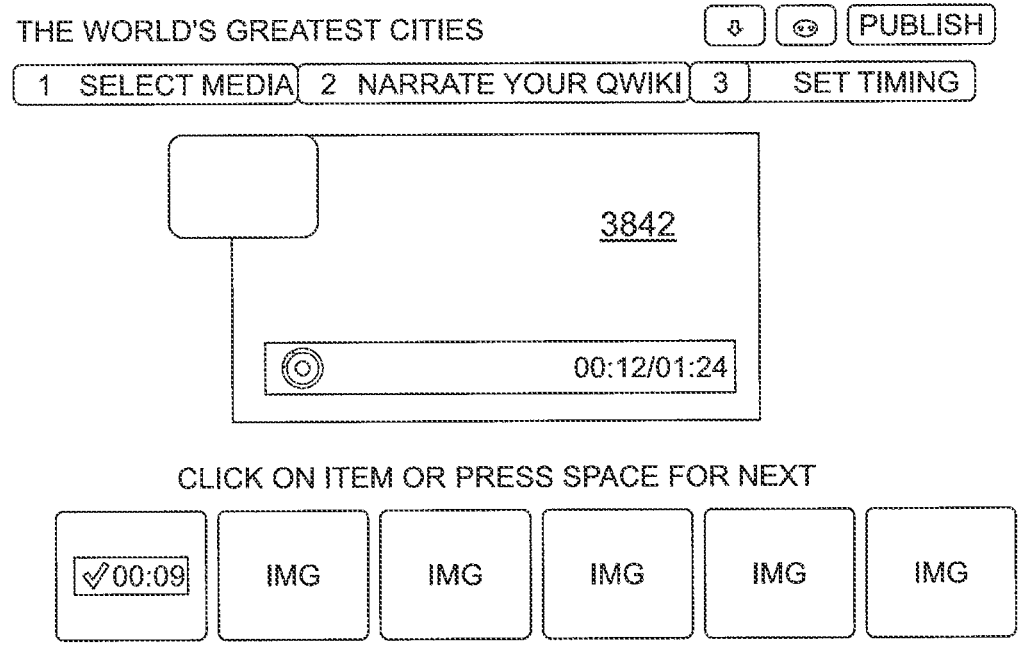
Figure 38U:
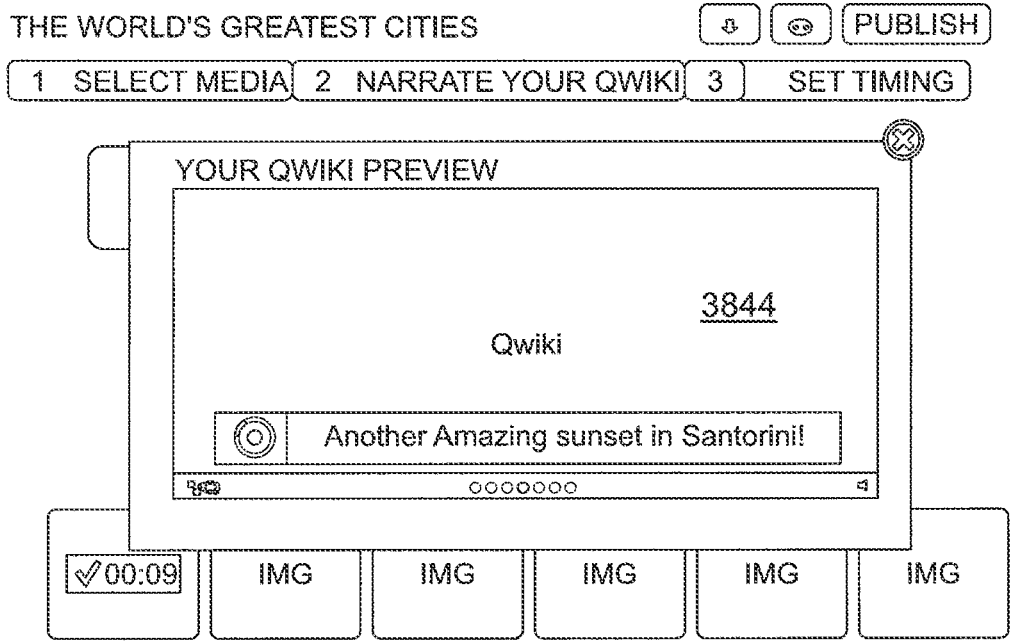
Figure 38V:
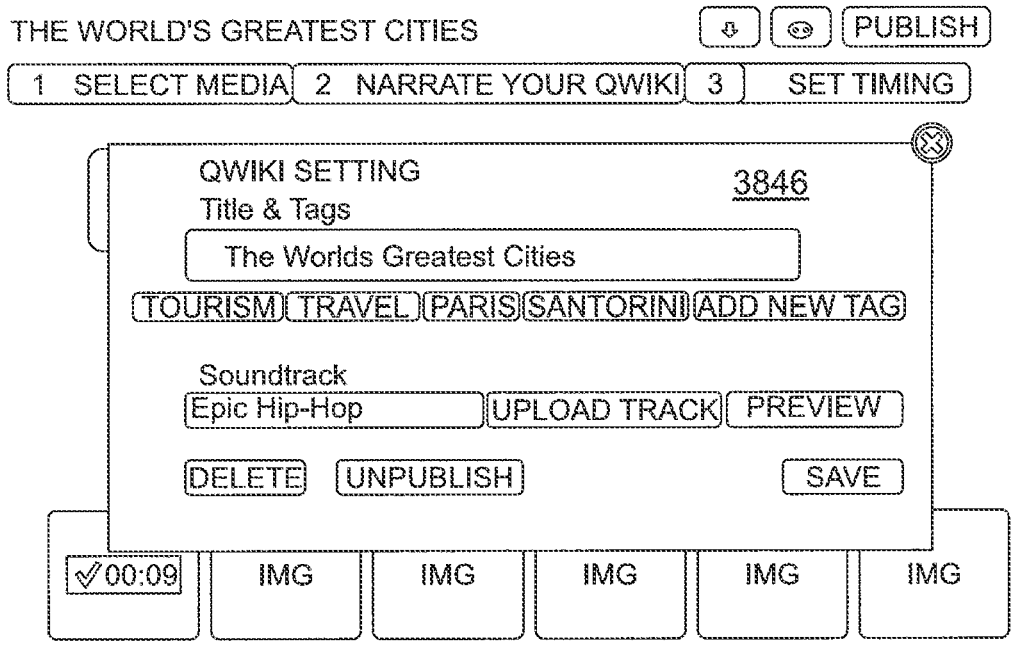
Figure 38W:
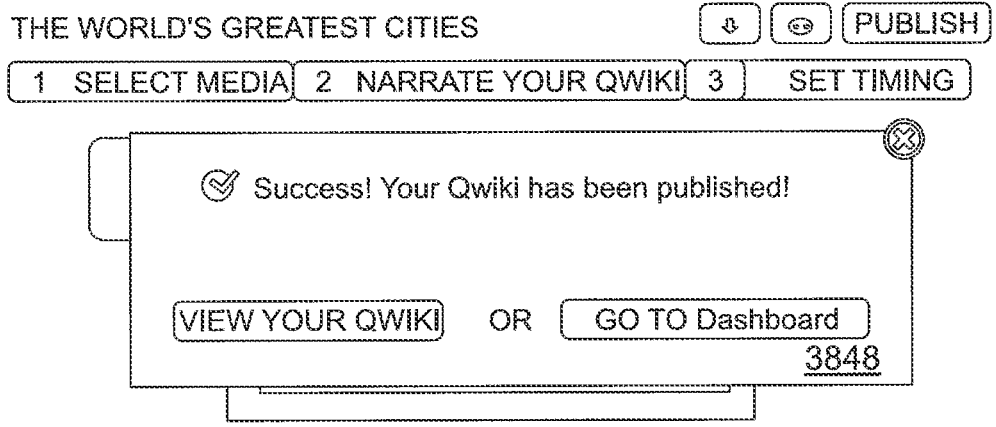
Figure 38X:
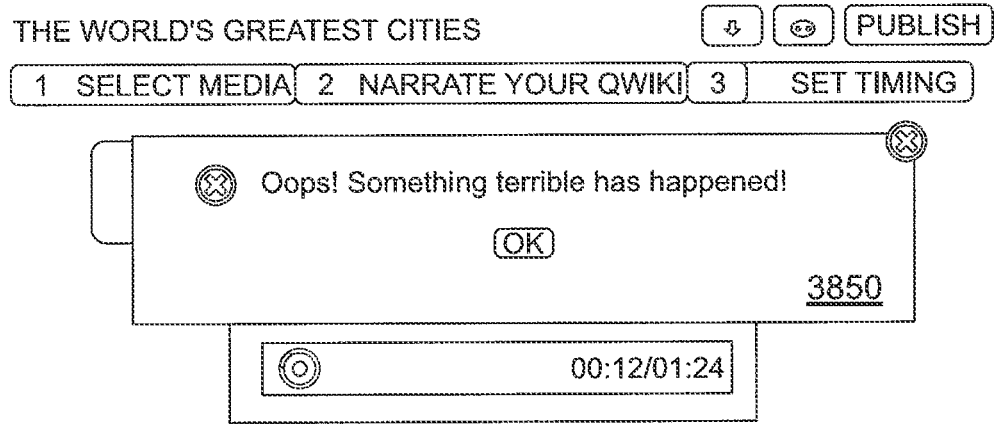
Figure 38Y:
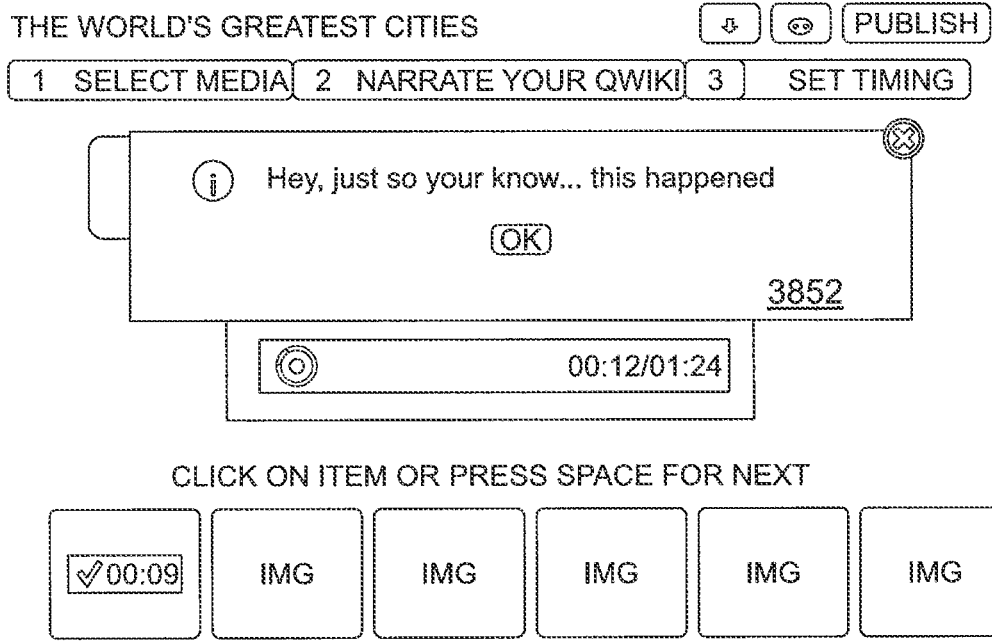
Figure 38Z:
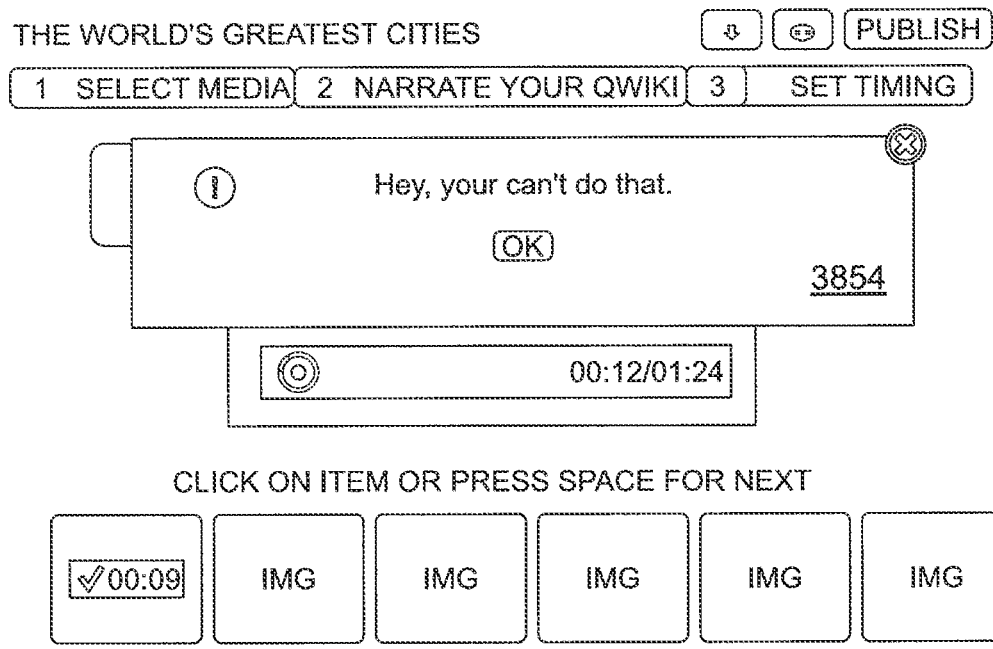

FIGS. 38A-38Z illustrate various features, innovations and functionality associated with exemplary processes of creating mixed media modules consistent with aspects of the inventions herein. FIGS. 38A-38Z are wireframe drawings, some of which are consonant with the features shown and described above, while also illustrating various other/novel features, functionality and GUI aspects. FIG. 38A illustrates commencement of a mixed media module creation routine and associated GUI features and functionality. As shown in FIGS. 38A-38Z and previously illustrated, a mixed media module creation process may be divided/organized into three phases, selecting media, narrating the module, as well as setting timing/bookkeeping aspects, among others. At the initial step/phase shown in FIG. 38A, a user may first select a source of media 3802 from a menu of sources to begin selecting and adding media from the sources into the content boxes (e.g., boxes 1, 2, 3, 4, 5 and 6) to create the mixed media module for publishing. FIG. 38B illustrates selection of the "FROM URL" button 3804 as well as a field to enter a URL to search for media and a field to display a plurality of the media elements available for inclusion into the mixed media module form a Website/URL. FIG. 38C illustrates selection of a button to add media from a geographic/locational media source such as a "Yahoo! Maps" 3808, as well as search and display GUI elements. FIG. 38D illustrates further functionality related to adding media from a geographic/locational media source such as a "Yahoo! Maps" 3812, showing GUI functionality for entering geographical/locational terms into a search field as well as search button, drop down menu and results display elements 3810. FIG. 38E illustrates selection of a button to add media from another social media account such as a "TWITTER" account 3812, and further illustrates GUI button functionality to load tweets and select one or more of the tweets for inclusion into the mixed media module, at 3813. FIG. 38F illustrates selecting (shown via "+") one of the images populated into the media addition field 3814 from, for example, a URL, such as the tumbler, cities worldwide, link shown in the figure. FIG. 38G illustrates selection of the "FROM URL" button 3816. FIG. 38H illustrates the display of pop-up window 3818 for editing an image by adding a title, captions, effect, etc. FIG. 38I illustrates selecting a "Fit & Cover" effect 3820. FIG. 38J illustrates an "edit picture" window 3822 of the image and a confirmation button. FIG. 38K illustrates a preview 3824 of the edited image and an add button. FIG. 38L illustrates a set of add narration buttons 3826 such as "Upload Video" and "Use Your Webcam". FIG. 38M illustrates a narration menu 3828 including a "start recording" button. FIG. 38N illustrates a narration menu 3830 including a "stop recording" button. FIG. 38O illustrates a narration menu 3832 including a "narration saved" icon, re-record button and "I'm finished" button. FIG. 38P illustrates a narration menu 3834 after user selection of the "I'm finished" button. FIG. 38Q illustrates a set timing menu 3836 for setting the timing of the Qwiki for each media element. FIG. 38R illustrates a countdown timer 3838 for setting the timing of the Qwiki for each media element. FIG. 38S illustrates a timer 3840 for setting the timing for a first highlighted IMG. FIG. 38T illustrates a timer 3842 for a second highlighted IMG after the timing of the first highlighted IMG is set. FIG. 38U illustrates a pop-up preview window 3844 of the Qwiki. FIG. 38V illustrates a Qwiki Settings pop-up menu 3846 for editing title, tags, soundtrack, etc. FIG. 38W illustrates a publishing confirmation message 3848 with option to view the published Qwiki or return to dashboard. FIG. 38X illustrates an error pop-up message 3850. FIG. 38Y illustrates a notification pop-up message 3852. FIG. 38Z illustrates a warning pop-up message 3854.

Figure 39:
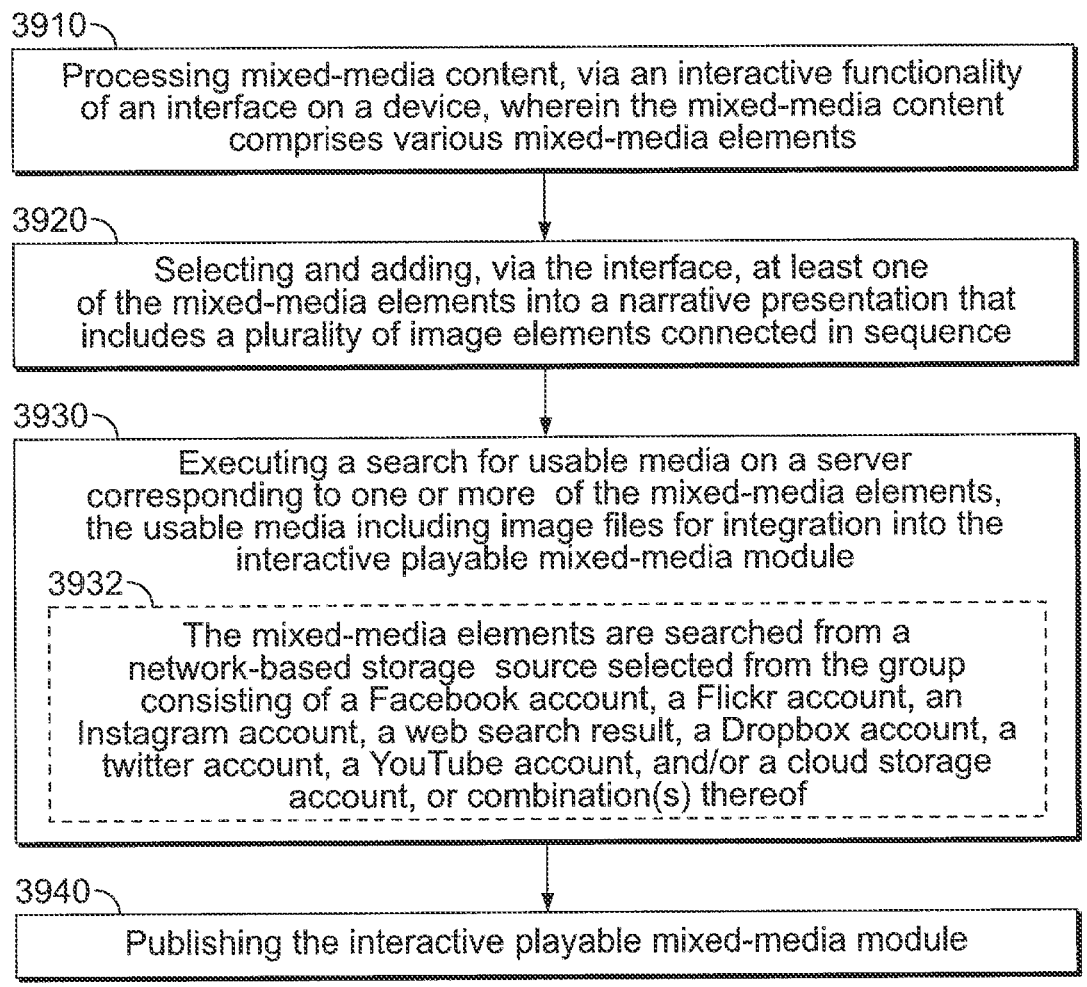
FIG. 39 is a flowchart depicting certain embodiments according to certain aspects related to the inventions herein.

FIG. 39 is a flowchart depicting certain embodiments according to certain aspects related to the inventions herein. FIG. 39 illustrates a method for creating an interactive playable mixed-media module comprised of mixed-media content including processing mixed-media content, via an interactive functionality of an interface on a device, wherein the mixed-media content comprises various mixed-media elements 3910, selecting and adding, via the interface, at least one of the mixed-media elements into a narrative presentation that includes a plurality of image elements connected in sequence 3920, executing a search for usable media on a server corresponding to one or more of the mixed-media elements, the usable media including image files for integration into the interactive playable mixed-media module 3930, optionally, here, the mixed-media elements may be searched from a network-based storage source selected from the group consisting of a Facebook account, a Flickr account, an Instagram account, a web search result, a Dropbox account, a twitter account, a YouTube account, a cloud storage account, or combination(s) thereof 3932, and publishing the interactive playable mixed-media module 3940.

According to some implementations, methods consistent with FIG. 39 may include the additional steps of searching for the mixed-media elements from a media library on a local device and/or from a cloud-based storage source. The mixed-media elements may be selected from the group including a text element, an image element, an video element, an audio element, a document element, a hyperlink element, a web page element, a pre-existing interactive playable mixed-media module, a pre-existing chapter of mixed-media elements, and a combination thereof. For example, the mixed-media elements are received from a media library on a local device selected from the group consisting of a desktop computer, a laptop computer, a cell phone, a personal digital assistant, a tablet, and a camera.

In some implementations, the mixed-media elements are searched from a network-based storage source selected from the group consisting of a Facebook account, a Flickr account, an Instagram account, a web search result, a Dropbox account, a twitter account, a YouTube account, a cloud storage account, and a combination thereof. The published interactive playable mixed-media module is stored on a cloud-based server. The server may be social-media based. The mixed-media elements are searched on a plurality of servers.

In further implementations, a narrative element is added, via an interactive functionality of the interface, to the mixed-media element. The narrative element may be coordinated in timing with the selected media element. An executable link to the mixed-media element is optionally added via an interactive functionality of the interface. The interactive playable mixed-media module is also previewable and editable.

In some implementations, a platform selection mechanism combines with the mixed-media elements, via an interactive functionality of the interface to generate the interactive playable mixed-media module, where the platform selection mechanism allows the mixed-media module to adapt to the platform of the device on which interactive playable mixed-media module is executed. The interactive playable mixed-media module is published by embedding the interactive playable mixed-media module on a website.

Figure 40:
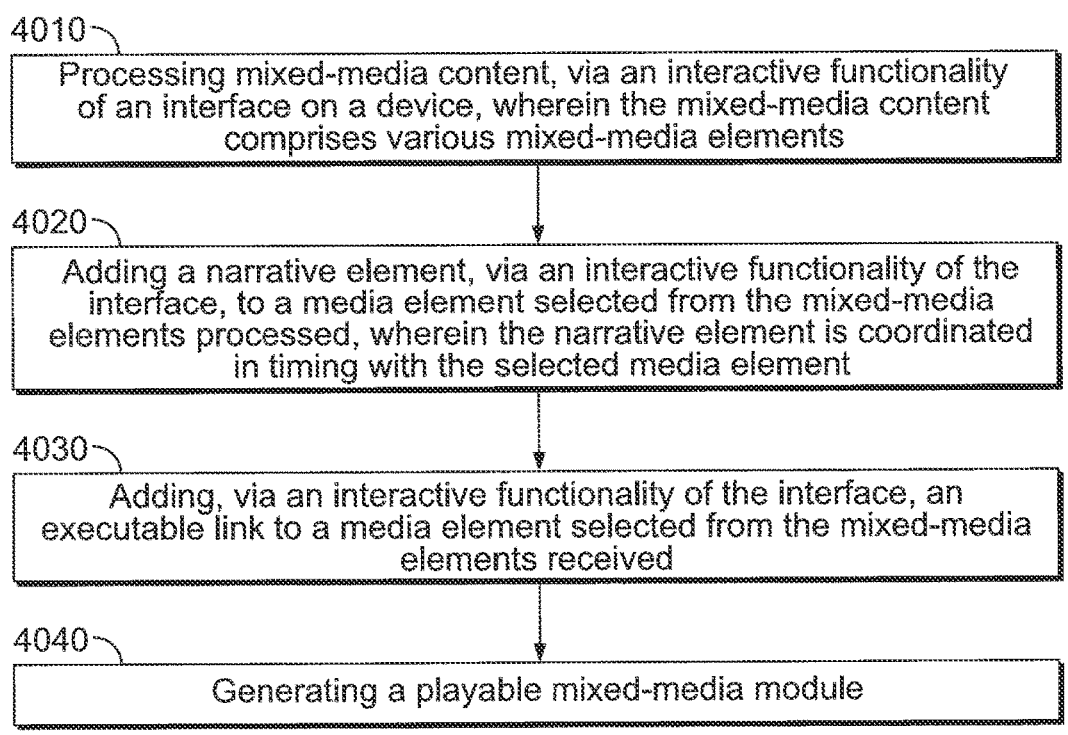
FIG. 40 is a flowchart depicting certain embodiments according to certain aspects related to the inventions herein.

Referring now to FIG. 40 is a flowchart depicting certain embodiments according to certain aspects related to the inventions herein. The flow chart includes steps processing mixed-media content, via an interactive functionality of an interface on a device, wherein the mixed-media content comprises various mixed-media elements 4010, adding a narrative element, via an interactive functionality of the interface, to a media element selected from the mixed-media elements processed, wherein the narrative element is coordinated in timing with the selected media element 4020, adding, via an interactive functionality of the interface, an executable link to a media element selected from the mixed-media elements received 4030 and generating, via an interactive functionality of the interface, an interactive playable mixed-media module comprising one or more chapters of mixed-media elements 4040.

Figure 41:
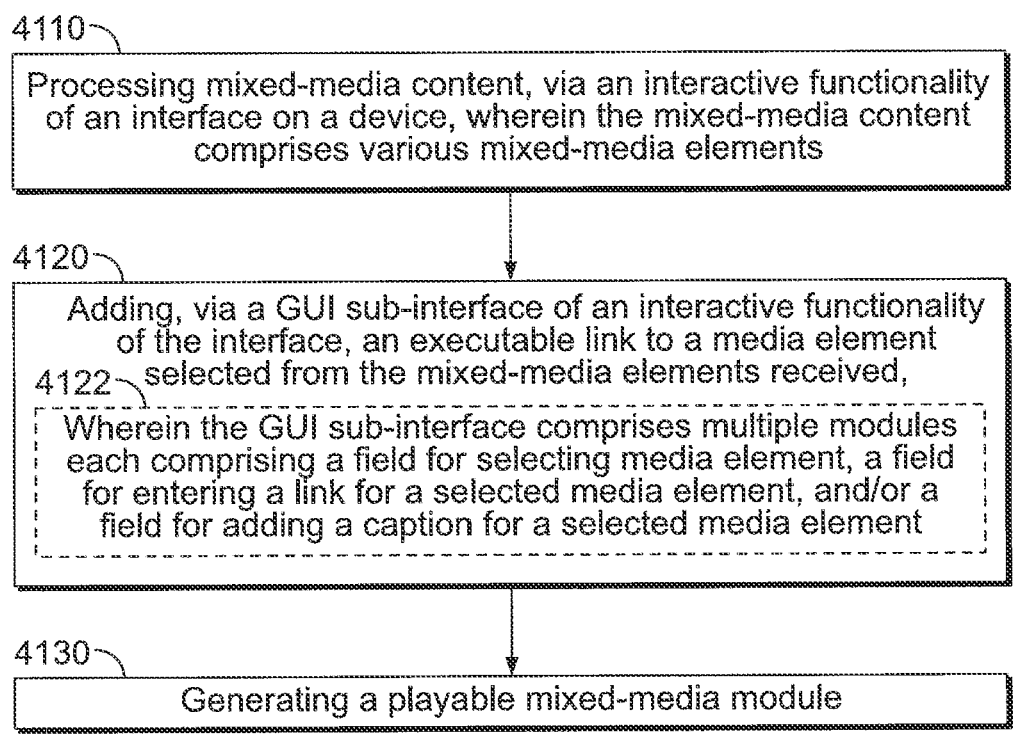
FIG. 41 is a flowchart depicting certain embodiments according to certain aspects related to the inventions herein.

FIG. 41 is a flowchart depicting certain embodiments according to certain aspects related to the inventions herein. The illustrative method may include processing mixed-media content, via an interactive functionality of an interface on a device, wherein the mixed-media content comprises various mixed-media elements 4110, adding, via a GUI sub-interface of an interactive functionality of the interface, an executable link to a media element selected from the mixed-media elements received 4120, optionally, here, the GUI sub-interface may comprise multiple modules each comprising a field for selecting media element, a field for entering a link for a selected media element and a field for adding a caption for a selected media element 4122, and generating, via an interactive functionality of the interface, an interactive playable mixed-media module comprising one or more chapters of mixed-media elements 4130. In some embodiments, the sub-interface comprises 2 or more modules, 3 or more modules, 4 or more modules, 5 or more modules, 6 or more modules, 7 or more modules, 8 or more modules, 9 or more modules, or 12 or more modules.

Figure 42:
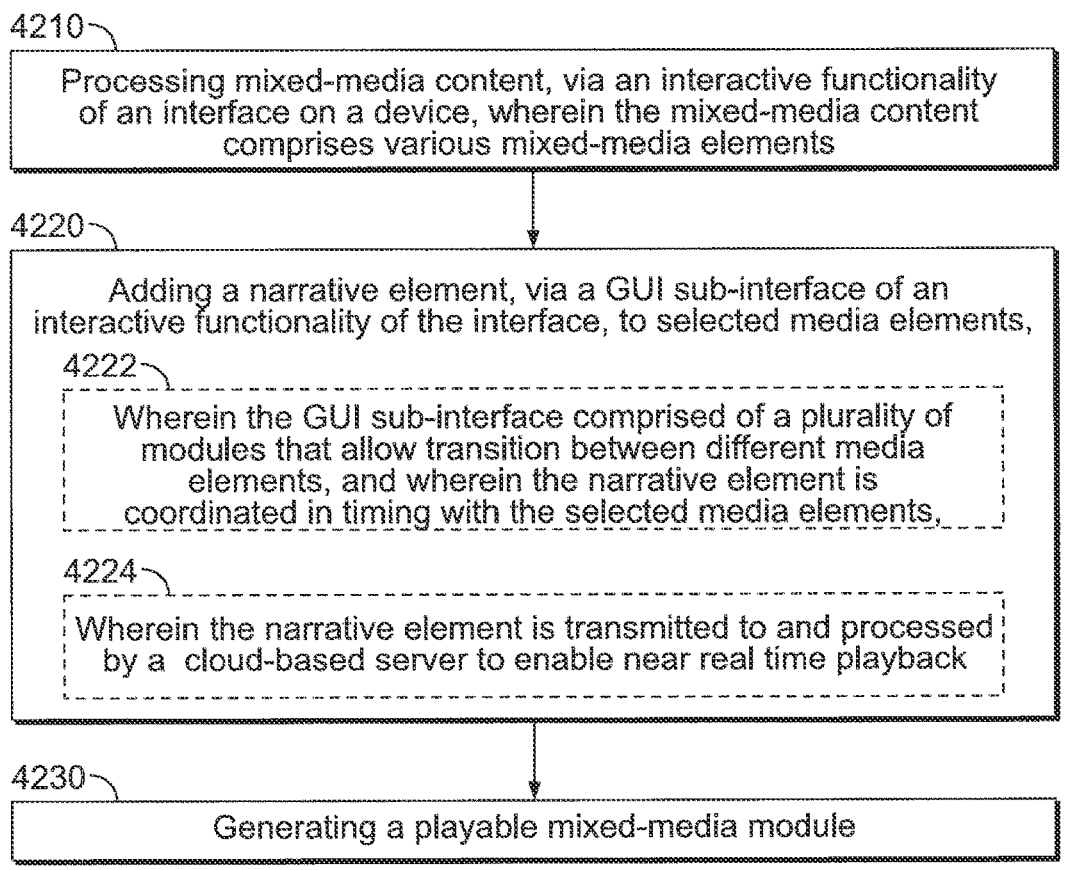
FIG. 42 is a flowchart depicting certain embodiments according to certain aspects related to the inventions herein.

FIG. 42 is a flowchart depicting certain embodiments according to certain aspects related to the inventions herein. The illustrative method may comprise processing mixed-media content, via an interactive functionality of an interface on a device, wherein the mixed-media content comprises various mixed-media elements 4210, adding a narrative element, via a GUI sub-interface of an interactive functionality of the interface, to selected media elements 4220, optionally, here, the GUI sub-interface may be comprised of a plurality of modules that allow transition between different media elements, and wherein the narrative element is coordinated in timing with the selected media elements 4222, optionally, here, the narrative element may be transmitted and processed a server to enable near real time playback 4224, and generating, via an interactive functionality of the interface, an interactive playable mixed-media module comprising one or more chapters of mixed-media elements 4230. In some embodiments, modules in the sub-interface correspond to a plurality of keys selected from an actual or virtual keyboard on the device. In some embodiments, the sub-interface correspond to the space bar, up arrow key, down arrow key, left arrow key and right arrow key.

Figure 43:
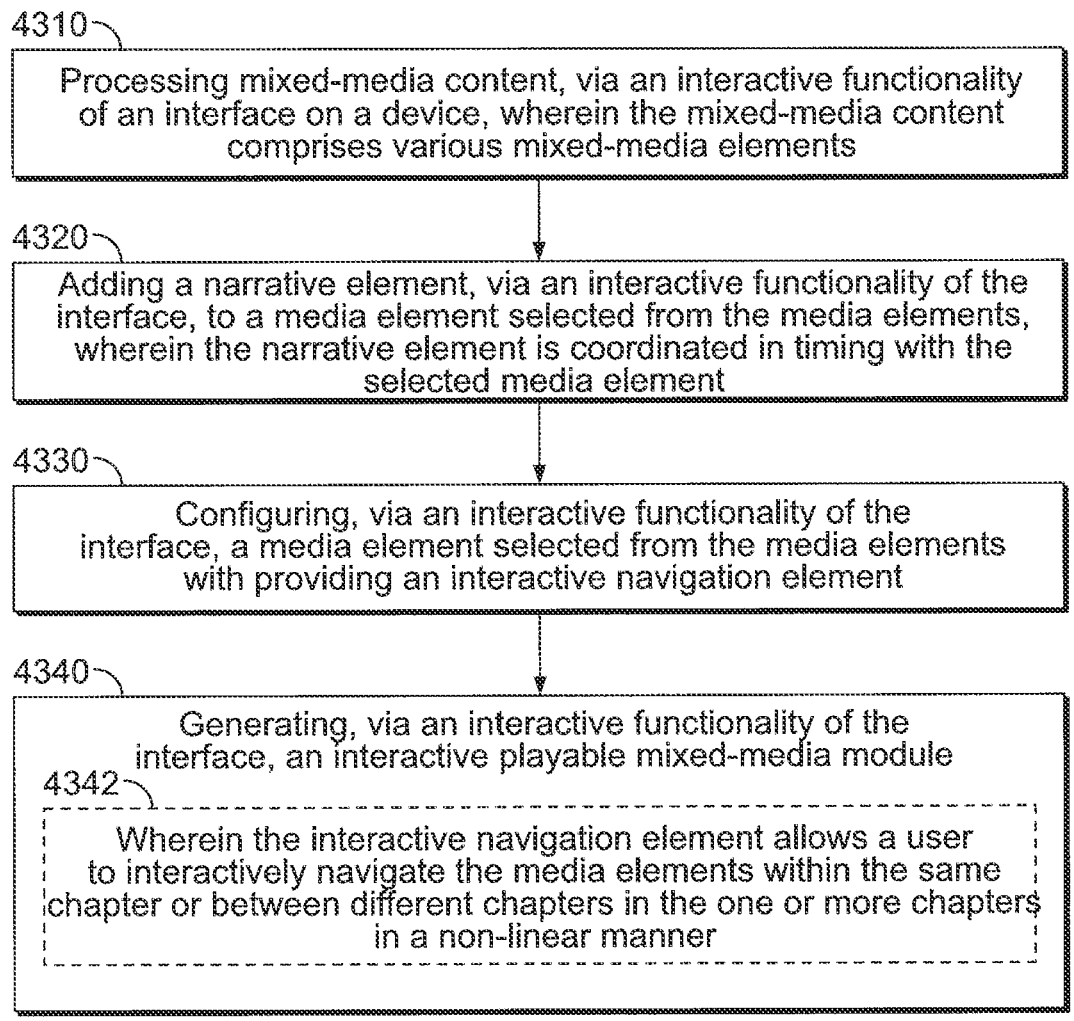
FIG. 43 is a flowchart depicting certain embodiments according to certain aspects related to the inventions herein.

FIG. 43 is a flowchart depicting certain embodiments according to certain aspects related to the inventions herein. The illustrative method may comprise processing mixed-media content, via an interactive functionality of an interface on a device, wherein the mixed-media content comprises various mixed-media elements 4310, adding a narrative element, via an interactive functionality of the interface, to a media element selected from the media elements, wherein the narrative element is coordinated in timing with the selected media element 4320, providing an interactive navigation element, via an interactive functionality of the interface, to a media element selected from the media elements 4330, generating, via an interactive functionality of the interface, an interactive playable mixed-media module comprising one or more chapters of mixed-media elements, 4340, optionally, here, the interactive navigation element may allow a user to interactively navigate the media elements within the same chapter or between different chapters in the one or more chapters in a non-linear manner 4342. In some embodiments, the interactive navigation element allows a user to jump forward to a media element further down in the timeline. In some embodiments, the interactive navigation element allows a user to move backwards to a media element earlier in the timeline with the same chapter of mixed-media elements. In some embodiments, the interactive navigation element allows a user to move between media elements in different chapters of mixed-media elements.

Figure 44:
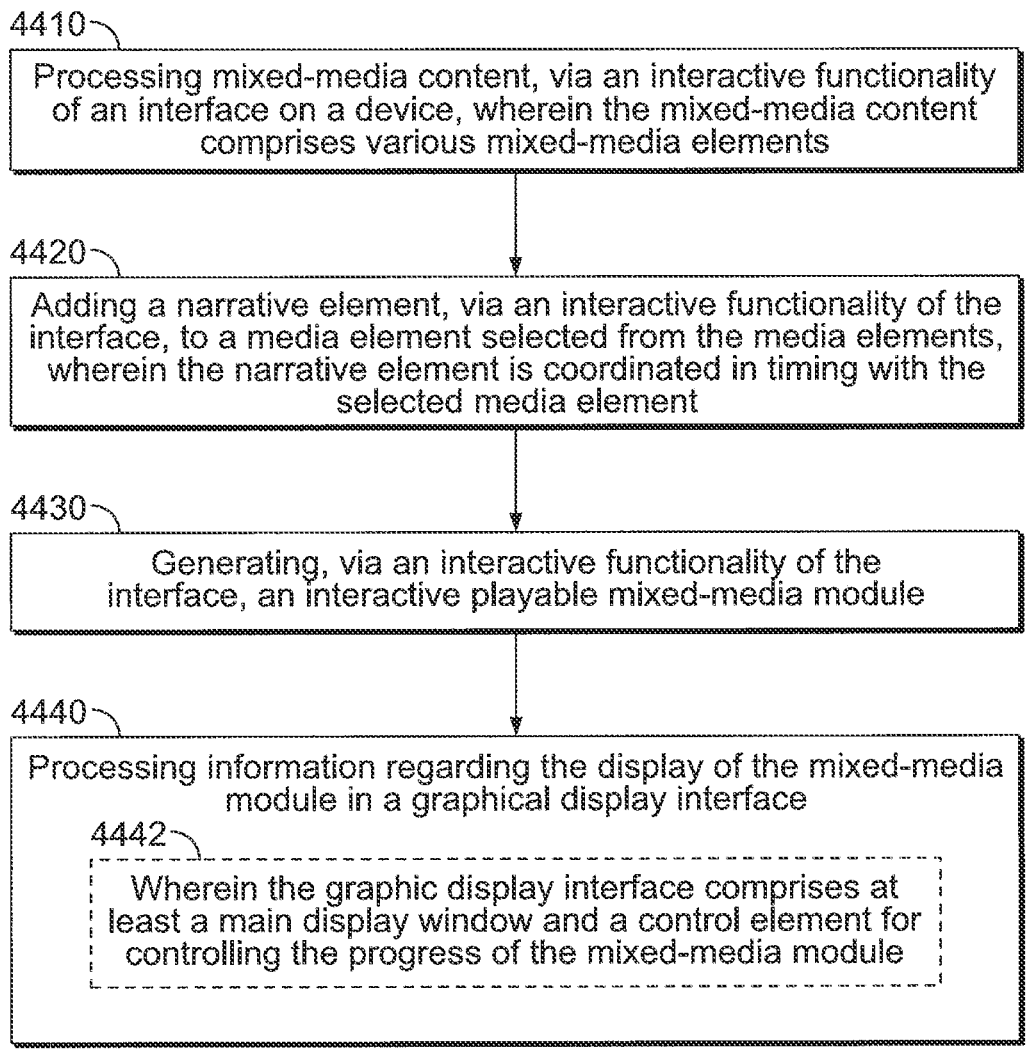
FIG. 44 is a flowchart depicting certain embodiments according to certain aspects related to the inventions herein.

FIG. 44 is a flowchart depicting certain embodiments according to certain aspects related to the inventions herein. The illustrative method may comprise processing mixed-media content, via an interactive functionality of an interface on a device, wherein the mixed-media content comprises various mixed-media elements 4410, adding a narrative element, via an interactive functionality of the interface, to a media element selected from the media elements, wherein the narrative element is coordinated in timing with the selected media element 4420, generating, via an interactive functionality of the interface, an interactive playable mixed-media module comprising one or more chapters of mixed-media elements 4430, and processing information regarding the display of one or more chapters of mixed-media elements of the mixed-media module in a graphical display interface 4440, and optionally wherein the graphic display interface comprises at least a main display window and a control element for controlling the progress of the mix-media module 4442.

Figure 45:
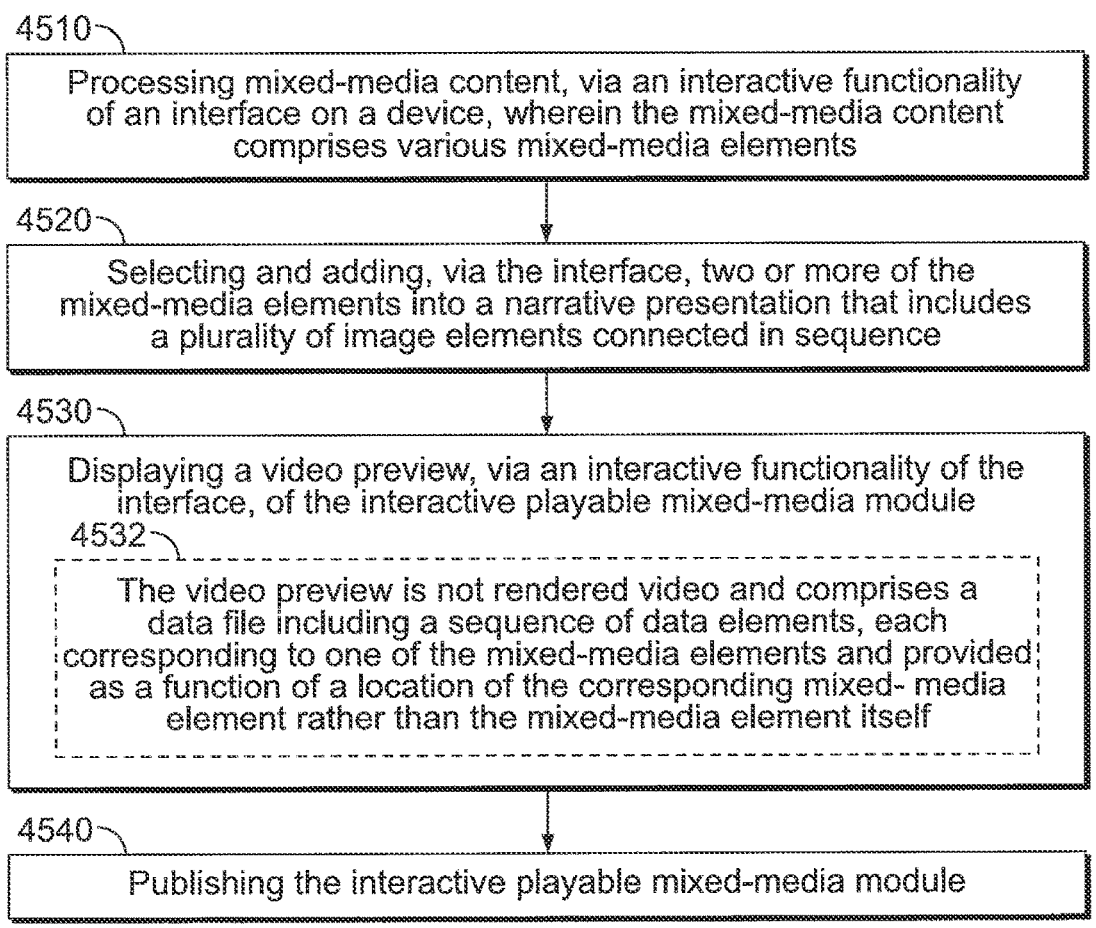
FIG. 45 is a flowchart depicting certain embodiments according to certain aspects related to the inventions herein.

FIG. 45 depicts a flowchart illustrating certain embodiments according to certain aspects related to the inventions herein. The illustrative method may comprise processing mixed-media content, via an interactive functionality of an interface on a device, wherein the mixed-media content comprises various mixed-media elements 4510, selecting and adding, via the interface, two or more of the mixed-media elements into a narrative presentation that includes a plurality of image elements connected in sequence 4520, displaying a video preview, via an interactive functionality of the interface, of the interactive playable mixed-media module comprising one or more chapters of mixed-media elements 4530, optionally, here, the video preview is not a rendered video and is a function of locations of the mixed-media elements and/or vector graphics 4532. The video preview may include a data file including a sequence of data elements, each corresponding to one of the mixed-media elements and provided as a function of a location of the corresponding mixed-media element rather than the mixed-media element itself. Further, the method may include, at 4540, publishing the interactive playable mixed-media module. In some implementations, the data file including the sequence of data elements are further provided as a function of vector graphics that are custom animations overlaying the mixed-media elements. Also, the data file including the sequence of data elements are further provided as a function of vector graphics that describe a set of visualization elements within the interactive playable mixed-media module. The locations of the mixed-media elements are located on at least one server over a communication network and/or on the local device. The received mixed-media content are the locations of the mixed-media elements. The data file including the sequence of data elements are further provided as a function of vector graphics generated on at least one server. The interactive playable mixed-media module may also be edited and/or published following the video preview. The video preview is also resizable within a preview area.

FIG. 46 depicts a flowchart illustrating certain embodiments according to certain aspects related to the inventions herein. The illustrative method may comprise adding or selecting mixed-media content, via an interactive functionality of an interface on a device, wherein the mixed-media content comprises various mixed-media elements 4610, optionally, the mixed-media elements may include data obtained directly from a non-local network storage source (e.g., Facebook, Flickr, Instagram, a web search result, Dropbox, twitter, YouTube, email, or a cloud storage) 4620, optionally the data may be obtained via a call to a routine on a server and the data are not stored locally on the device 4630, optionally the data may be integrated into a narrative presentation that includes a plurality of image elements connected in sequence 4640, and generating an interactive playable mixed-media module comprising mixed-media elements 4650.

With regard to certain aspects of the innovations herein, another way that implementations herein are an improvement over the traditional information conveyance, especially from online video, is that that the mixed-media modules are specifically configured such that the end user is not required to experience the module in a linear fashion. A user can readily jump to different collections of media once a quick scan assures them the present set of options do not include anything they wish to see further, know more about, etc. Modules may also be configured such that users can also choose their path through the content by clicking on hyperlinks (meta-data) within the mixed-media module. This allows the end-user to explore the information that is of the most interest to them, in greater detail and in their preferred format (i.e. text, photos, or video). Innovations herein also work across multiple platforms. For example, mixed-media module interactive components herein can run inside a standard web browser and its player software can be integrated into mobile devices, TV devices, video game units, etc. Further, such mixed-media module(s) may be configured as a universal component across all media and devices.

In the description here, it is to be understood that both mouse/cursor enabled computing devices, and those without cursors, but use touch screen technologies are both fully supported. To that, the terms "click" or "tap" or "touch" can be used synonymously and interchangeably. Thus, a click-through is the same as a tap-through or any other term with the equivalent meaning. The mobile wireless devices can be touch screen enabled, using a stylus or finger or other such thing to interact with the screen, and objects on the screen. The touch screen enabled technologies also allow for pinching in or out to zoom in or out or enlarge or shrink an object or the display. Sliding a touch can scroll either in vertical or horizontal directions, or any other direction supported by the system. The touch screens can also detect a prolonged tap, opening further functionality when a prolonged tap and hold occurs on an object. In devices that do not support a touch screen, such functionality can be accomplished by a cursor or pointer of some sort, typically controlled by a mouse, pointer stick, roller ball, etc. There may be additional functionality embedded into the display objects to allow for some of the functionality such as a scroll bar or zoom buttons, etc. These functionalities are also fully supported here and can be used interchangeably with the touch screen enabled technologies.

In the present description, the terms component, module, device, etc. may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) within or associated with the computing elements, sensors, receivers, etc. disclosed above, e.g., to be read by a processing unit to implement the functions of the innovations herein. Or, the modules can comprise programming instructions transmitted to a general purpose computer or to processing hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, implementations and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the location estimate features, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied to include, but are not limited to, non-volatile storage media in various forms (e.g., optical, magnetic or semiconductor storage media), though do not include transitory media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other implementations of the invention will be apparent to those skilled in the art from consideration of the specification and practice of the invention disclosed herein. It is intended that the specification and examples be considered as exemplary only, with a true scope and spirit of the invention being indicated by the disclosure above in combination with the following paragraphs describing the scope of one or more implementations of the following invention.

We claim:

1. A method comprising:
   displaying, via an interface on a computing device, a library of mixed-media elements, the library of mixed-media elements comprising files uploaded by a user;
   organizing, via interactive functionality of the interface, a plurality of the mixed-media elements into a plurality of chapters in response to a user dragging each of the plurality of mixed-media elements into a respective chapter;
   adding, via the interface, a narrative element to a chapter in the plurality of chapters, the narrative element being coordinated in timing with the mixed-media elements included within the chapter, the narrative element comprising video narration and comprising narrations from multiple users; and
   generating, via the interface, an interactive playable mixed-media module comprising the plurality of chapters and the narrative element.

2. The method of claim 1, further comprising adding an executable link to the media element.

3. The method of claim 1, wherein the narrative element comprises a plurality of image elements connected in sequence.

4. The method of claim 1, wherein the mixed-media element comprises two or more types of media elements selected from a group of media elements consisting of a text element, an image element, a video element, an audio element, a document element, a web page element, a pre-existing interactive playable mixed-media module, and a pre-existing chapter of mixed-media elements.

5. The method of claim 1, further comprising executing, by the computing device, a search for usable media corresponding to one or more mixed-media elements in the plurality, the usable media comprising image files for integration into the interactive playable mixed-media module.

6. The method of claim 1, further comprising publishing the interactive playable mixed-media module.

7. The method of claim 1, wherein the generating of the interactive playable mixed-media module further comprises generating an interactive navigation element, the interactive navigation element enabling the user to interactively navigate within one chapter or between different chapters of the one or more chapters of mixed-media elements in a non-linear manner.

8. The method of claim 1, further comprising communicating, by the computing device, the interactive playable mixed-media module to a client device.

9. The method of claim 1, wherein the narrative element further comprises at least one of text narration or audio narration.

10. The method of claim 1, further comprising displaying a video preview, via the interface, of the interactive playable mixed-media module.

11. The method of claim 1, further comprising creating the one or more chapters, wherein the one or more chapters comprises a cover element selected from one of the plurality of mixed-media elements.

12. The method of claim 11, wherein the adding of the narrative element further comprises adding a narrative element that is coordinated in timing with the cover element or a content element.

13. A computing device comprising:
a processor;
a storage medium for tangibly storing thereon program logic for execution by the processor, the program logic comprising:
displaying logic for displaying, via an interface on a computing device, a library of mixed-media elements, the library of mixed-media elements comprising files uploaded by a user;
organizing logic for organizing, via interactive functionality of the interface, a plurality of the mixed-media elements into a plurality of chapters in response to a user dragging each of the plurality of mixed-media elements into a respective chapter;
adding logic executed by the processor for adding, via the interface, a narrative element to a chapter in the plurality of chapters, the narrative element being coordinated in timing with the mixed-media elements included within the chapter, the narrative element comprising video narration and comprising narrations from multiple users; and
generating logic executed by the processor for generating, via the interface, an interactive playable mixed-media module comprising the plurality of chapters and the narrative element.

14. The computing device of claim 13, further comprising second adding logic executed by the processor for adding an executable link to the media element.

15. The computing device of claim 13, wherein the narrative presentation comprises a plurality of image elements connected in sequence.

16. The computing device of claim 13, wherein the mixed-media element comprises two or more types of media elements selected from a group of media elements consisting of a text element, an image element, a video element, an audio element, a document element, a web page element, a pre-existing interactive playable mixed-media module, and a pre-existing chapter of mixed-media elements.

17. The computing device of claim 13, wherein the generating logic for generating the interactive playable mixed-media module further comprises generating logic for generating an interactive navigation element, the interactive navigation element enabling the user to interactively navigate within one chapter or between different chapters of the one or more chapters of mixed-media elements in a non-linear manner.

18. The computing device of claim 13, wherein the narrative element further comprises at least one of text narration or audio narration.

19. The computing device of claim 13, further comprising creating logic executed by the processor for creating the one or more chapters, wherein the one or more chapters comprises a cover element selected from one of the plurality of mixed-media elements.

20. A non-transitory computer readable storage medium for tangibly storing computer program instructions capable of being executed by a computer processor, the computer program instructions defining the steps of:
displaying, via an interface on a computing device, a library of mixed-media elements, the library of mixed-media elements comprising files uploaded by a user;
organizing, via interactive functionality of the interface, a plurality of the mixed-media elements into a plurality of chapters in response to a user dragging each of the plurality of mixed-media elements into a respective chapter;
adding, via the interface, a narrative element to a chapter in the plurality of chapters, the narrative element being coordinated in timing with the mixed-media elements included within the chapter, the narrative element comprising video narration and comprising narrations from multiple users; and
generating, via the interface, an interactive playable mixed-media module comprising the plurality of chapters and the narrative element.

* * * * *